US008707180B2

(12) United States Patent
Butler et al.

(10) Patent No.: US 8,707,180 B2
(45) Date of Patent: Apr. 22, 2014

(54) SYSTEM FOR CYBER INVESTIGATION AND DATA MANAGEMENT

(75) Inventors: Randy L. Butler, Deland, IL (US); L. Bradlee Sheafe, Monticello, IL (US); Von Welch, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 824 days.

(21) Appl. No.: 12/857,979

(22) Filed: Aug. 17, 2010

(65) Prior Publication Data
US 2011/0041058 A1    Feb. 17, 2011

Related U.S. Application Data

(60) Provisional application No. 61/234,509, filed on Aug. 17, 2009.

(51) Int. Cl.
*G06F 3/14* (2006.01)

(52) U.S. Cl.
USPC ............ 715/709; 715/705; 714/2; 726/1; 726/6; 726/22; 726/25; 705/1; 709/204; 709/206; 709/224; 709/229

(58) Field of Classification Search
USPC ............ 715/200–277, 700–867; 345/30–111; 709/201–229; 705/50–79; 726/6, 1, 22, 726/25; 714/2
See application file for complete search history.

(56) References Cited

U.S. PATENT DOCUMENTS

| 7,865,828 | B1 * | 1/2011 | Hanson et al. ............... 715/705 |
| 8,244,815 | B1 * | 8/2012 | Panzer ......................... 709/206 |
| 8,291,026 | B2 * | 10/2012 | Collins et al. ............... 709/206 |
| 8,417,776 | B2 * | 4/2013 | Womack et al. ............. 709/204 |
| 2006/0224750 | A1 * | 10/2006 | Davies et al. ............... 709/229 |
| 2007/0067450 | A1 * | 3/2007 | Malloy et al. ............... 709/224 |
| 2007/0244710 | A1 * | 10/2007 | Persinger ....................... 705/1 |
| 2008/0301757 | A1 * | 12/2008 | Demarest et al. ............ 726/1 |
| 2009/0178125 | A1 * | 7/2009 | Barber et al. ................. 726/6 |
| 2010/0031354 | A1 * | 2/2010 | Hudis et al. ................. 726/22 |
| 2010/0042868 | A1 * | 2/2010 | Apelbaum et al. ............ 714/2 |
| 2012/0179816 | A1 * | 7/2012 | Malloy et al. ............... 709/224 |
| 2012/0192280 | A1 * | 7/2012 | Venkatakrishnan et al. ... 726/25 |

OTHER PUBLICATIONS

Butler, Randy, "NCSA: Overview of Live Computer System Capture and Triage Tool (CCTT)," 16 pages, Oct. 29, 2008.

(Continued)

*Primary Examiner* — Ruay Ho
(74) *Attorney, Agent, or Firm* — Nathan O. Greene; Brinks Gilson & Lione

(57) ABSTRACT

A system for executing a cyber investigation by a non-expert user, including a computer having a processor, a memory, and a display; a computer-readable medium having stored thereon instructions for execution of a wizard application, the processor adapted to execute the instructions when the computer-readable medium is inserted into the computer, the processor programmed to: receive case information; receive a type of activity being investigated in response to user inputs to select the activity type from a list of possible activity types; guide the user through capturing data related to the selected activity type through steps presented to the user through one or more screens shown in the display, the steps presented such that a non-expert user can follow them; receive user inputs through a screens to obtain information needed to continue capturing the data related to the selected activity; and store the captured data in a removable data storage device or medium for analysis and use in the cyber investigation.

31 Claims, 56 Drawing Sheets

(56) References Cited

OTHER PUBLICATIONS

Welch, Von, "NCSA: Applying High-Tech Science and Engineering Solutions to Collaborative Cyber Crime Investigations," 51 pages, Jan. 8, 2009.

"A Minute with Von Welch and Randy Butler," University of Illinois Interview, Aug. 19, 2008.

WDWS Newsmakers Podcast with Von Welch and Randy Butler, Aug. 25, 2008, available at http://www.wdws.com/podcasts/newsmakers/2008/08/221436.

* cited by examiner

1. Friend Page 4402

2. Wall Page 4404

3. Photos Page 4408

4. Mini-Feed Page 4410

SYSTEM FOR CYBER INVESTIGATION AND DATA MANAGEMENT

REFERENCE TO EARLIER FILED APPLICATION

This application claims the benefit under 35 U.S.C. §119(e) of U.S. Provisional Patent Application No. 61/234,509, filed Aug. 17, 2009, which is incorporated herein, in its entirety, by this reference.

FEDERALLY SPONSORED RESEARCH

This invention was made with Government support under Contract Number DOJ 2007-DN-BX-K186 by the U.S. Department of Justice. The United States Government has certain rights in the invention.

TECHNICAL FIELD

The present disclosure relates to cyber investigation, and more particularly, to a device useable within a networked computer system that provides a user-friendly wizard for law enforcement personnel and other users to employ on a target computer to gather and analyze, on-site, evidence and information from the computer system and from remote servers of service providers.

BACKGROUND

In August, 2008, federal authorities announced the largest computer hacking case ever processed by the Justice Department: the indictments of 11 people who allegedly stole more than 40 million credit-card and debit-card numbers from at least nine major U.S. retailers. Local law-enforcement agencies frequently are the first responders when individuals and organizations report credit-card fraud and identity theft.

It is an all-too-common situation, however, that a law enforcement officer receives a complaint from a victim of Internet fraud or harassment, and while the officer does his best to capture the details, valuable information on the victim's computer goes uncaptured and never gets to those with the expertise to decipher it. When faced with this scenario, many law enforcement first responders (LEFRs) are confused as to what to do, usually unable to do anything but take down the most basic information. This is because, in part, LEFRs are not sufficiently trained, do not have sufficient computer knowledge, and may lack the computer hardware and software tools that can capture this valuable information. The same can be said of other investigators that may not be considered "law enforcement." Once a computer is turned off or power removed from a computer, e.g., for transport to a police station or investigator's office, any data that is stored in volatile memory is lost, and can never be captured. Some of this data may include cached information, internet-related browsing data and related temporary files, among other data.

With criminals becoming more sophisticated and with more crimes that take place in or through cyber space, i.e. cybercrime, it is becoming increasingly important that LEFRs be more prepared to capture and analyze digital computer evidence from potential evidentiary or target systems, including volatile data and Web-based service information. This prevents the loss of investigation-critical data that could not only lead to capture of the perpetrator or criminal, but also help build a legal case against the perpetrator or criminal.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIG. 48 is a screen of the exemplary data browser of FIG. 48, showing a list of friends ranked according to a level of interaction with the POI.

DETAILED DESCRIPTION

Figure 1:
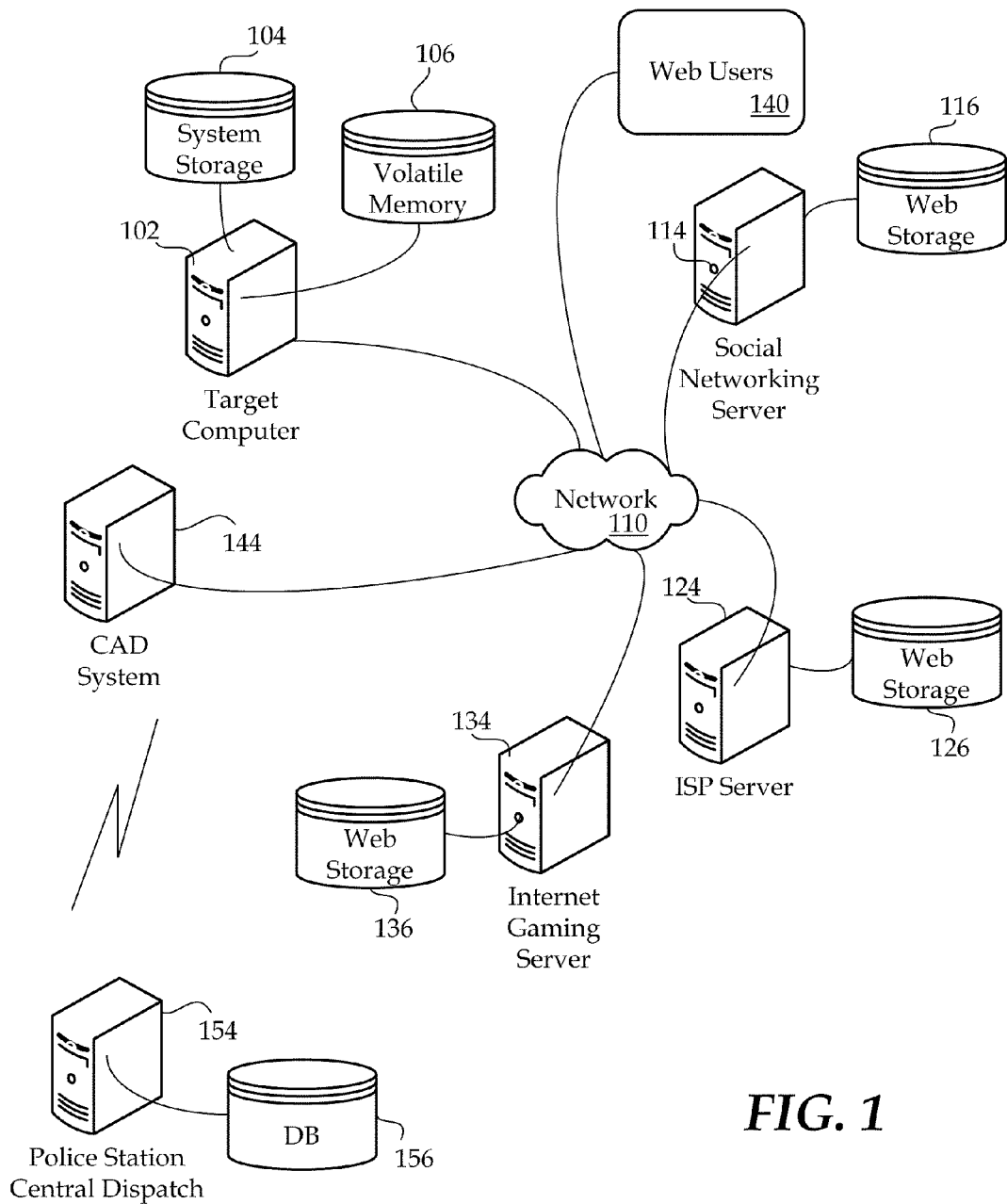
FIG. 1 is a system diagram of an evidentiary or target computer—owned by a person of interest (POI)—within a networked system that includes social networking sites and Internet service provider servers.

By way of introduction, the present disclosure introduces a system programmed to execute instructions—including a Cyber-investigation Law Enforcement Wizard (CLEW)—that guides a law enforcement first responder (LEFR) or other investigator in the initial investigation of a target computer owned by a person of interest (POI). A wizard is a user interface element that presents a user with a sequence of dialog boxes that lead the user through a series of well-defined steps. The wizard includes instructions on a computer-readable medium that are executed on a computer or other computing device having a display. Tasks that are complex, infrequently performed, or unfamiliar may be easier to perform using a wizard.

The LEFRs or other law enforcement investigators (hereinafter "LEFRs") are not presumed to be experts in computer or networking technologies, yet regularly encounter computer systems in the course of their duties in the field. Other users may also use the CLEW, such as parents, educators, or employers, for example, that may have need to investigate improper—including criminal—use of a computer. Accordingly, the term "user" as used herein may encompass a variety of potential CLEW users. The CLEW provides the capacity and interactive guidance to allow these non-experts to quickly, easily, and accurately gather evidence and information from a digital system and supports on-site examination of the relevant data. The CLEW provides the detective or investigator back at the police station or office with a consistent and accurate collection of relevant data that they need to carry the investigation forward. The investigation may include, but is not limited to, investigating cybercrimes, employee Internet abuse, or criminal activity such as fraud, cyber-stalking, and missing persons.

The CLEW may be introduced through an external media, such as a USB or other removable storage device, including a CD-ROM or DVD, and the evidence captured may be stored onto an external, removable storage device, such as the USB device, a mass storage device such as an external hard drive, or on a writable CD-ROM or DVD if the evidentiary or target computer system has that capability. In some embodiments, the data may be transmitted via a communication system, such as a Computer Aided Dispatch system, back to the police station or office. The CLEW is a force multiplier that gives every officer or investigator the ability to respond to computer-based crimes. The CLEW has many functions, which include, but are not limited to: 1) capturing volatile information on the computer; 2) assisting the LEFR, while still at the investigation site, through an initial investigation; and 3) presenting the captured evidence and notes in a straight-forward way to the assigned detective or investigator. The volatile information may include data cached in volatile memory by a Web browser or other application on the computer system. Additionally, the CLEW can, of course, enable retrieval of data stored in nonvolatile storage as well.

FIG. 1 is a system diagram of a networked system 100 within which operates an evidentiary (or target) computer 102, which may contain data relevant to a cybercrime. The target computer 102 includes system storage 104 and volatile memory 106, which will be discussed in more detail below. The system 100 further includes a network 110 such as the Internet, or the World Wide Web ("Web"), an intranet, a local and/or wide area network (LAN or WAN), or any combination of these networks and any other network, such as an ad-hoc network. The network 110 may include many different pieces of computer hardware, including routers, switches, hubs, etc., but are not shown for simplicity. The target computer 102 may be coupled with the network 110 to communicate over the network 110 with various other devices, machines, and servers as will be explained. Herein, the phrase "coupled with" is defined to mean directly connected to or indirectly connected through one or more intermediate components. Such intermediate components may include both hardware and software based components, including the network 110.

The system 100 may further include one or more social networking servers 114 coupled with the network 110, and which has its own web storage 116. The web storage 116 may store social networking information, including information associated with the user of the target computer. This information may also be cached locally on the target computer 102. The user may also be referred to herein as a person of interest (POI) with regards to an investigation undertaken using CLEW.

The system 100 may further include one or more Internet service provider (ISP) servers 124 coupled with the network 110, and which has its own web storage 126. The web storage 126 may include network copies of emails, trails or storage of instant messaging sessions, and other personal and contact information of the user of the target computer. Some of this data may be cached locally on the target computer 102. The system 100 may further include one or more Internet gaming servers 134 coupled with the network 110, and which has its own web storage 136. The web storage 136 may include gaming information, including communication trails between online players of games provided by the Internet gaming server 134 that includes the user of the target computer.

A plurality of other web users 140 may interact with the user of the target computer (and with each other) over the network 110 via websites and/or networked connections provided by the social networking server 114, the ISP server 124, and the Internet gaming server 134. The web storages 116, 126, and 136 may also include copies of their policies and procedures and other agreements to which users thereof agree when signing up for their respective services.

The system 100 may further include a communications system, such as a Computer Aided Dispatch (CAD) system 144, for instance, provided within police (or squad) cars that communicate via radio frequency networks with a police station central dispatch computer 154 having a database 156. Accordingly, any information gathered by the LEFR may be communicated directly and quickly to the police station in response to which investigators may analyze and take appropriate action, without delay.

Figure 2:
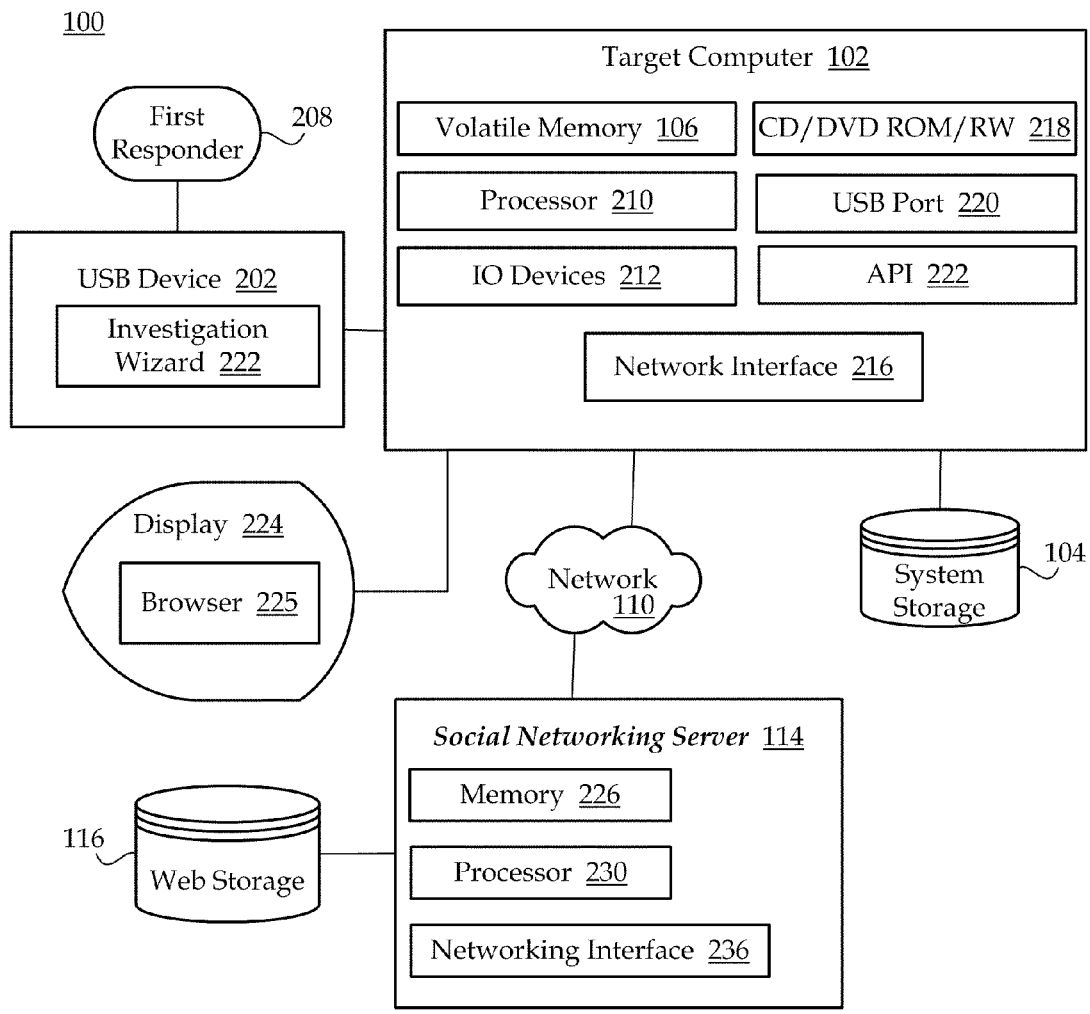
FIG. 2 is a system diagram of the evidentiary or target computer and a USB device useable by a law enforcement first responder (LEFR) or other investigator user to gather and analyze digital evidence from the target computer.

FIG. 2 is a system diagram of the evidentiary or target computer 102 and a universal serial bus (USB) device 202 useable by a law enforcement or other first responder user 208 (or other investigator) to gather and analyze digital evidence from the evidentiary or target computer 102. The target computer 102 may further include a processor 210, input/output (10) devices 212 such as mice, keyboards, printers, etc., a network interface 216, a CD/DVD ROM read/write (RW) drive 218, and a USB port 220. The target computer may include various other memory or network storage devices (not shown) in addition to the system storage 104 and volatile memory 106. The target computer 102 may also include an application programming interface (API) 222, which may represent any API needed for interface with an HTML website, with a networked software application such as Facebook, or with another software application used by email or instant messaging service providers. The target computer 102 may further be coupled with a display device 224 which may run network applications such as an interne browser 225.

The USB device 202 may be a thumb drive that includes software containing a cyber investigation law enforcement wizard (CLEW) 222 application. The CLEW may be executed on the target computer 102 after connecting the USB device 202 to a USB port 220 of the target computer. As discussed previously, another device may be used to introduce the CLEW, such as a CD, DVD or other disk storage medium, or CLEW may be introduced over the network 110 where an avenue is achieved for doing so (such as via email, instant messaging, or direct network access).

The social networking server 114 may further include a memory 226, a processor 230, and a networking interface 236 in addition to the web storage 116. Furthermore, the ISP server 124 and the Internet gaming server 134 may include the same or similar hardware components. The web storage of the servers 114, 124, and 134 may include both volatile and nonvolatile memory, and information thereof related to a POI of the target computer 102 may be accessible over a web or Internet connection through the network interfaces 216, 236. Furthermore, at least some of the information or data stored on the servers 114, 124, and 134 related to the POI may be cached locally on the target computer 102.

Digital data representing potential evidence and/or actionable lead information exists in many forms, including live volatile data resident in the memory of the target computer, nonvolatile data found on the storage devices or disks, including the system storage 104, data cached within applications, and, increasingly, data found at remote websites accessed by the target computer. The data found at remote websites, such as those employed by the social networking server 114, the ISP server 124, and the Internet gaming server 134, may be stored in their respective web storages, or data may be saved in relation to the browser 225 in the form of cookies, instant messaging text, images, files, or other attachments being passed to and from the server and the target computer 102.

Currently, there are a number of tools designed to collect the data found in system memory, application caches, and storage devices; however, identifying and collecting data from web-based sources presents challenges for the non-expert first responder, other investigator or user. Email, instant messaging, social networks, on-line gaming, and virtual worlds are part of the growing trend away from maintaining application data on the local system in favor of maintaining a state on remote Internet systems dispersed around the globe. Therefore, the relevant data available to the user on the system found at the scene is often restricted to data cached by the browser. While this cached data may be important, the information technically available at the remote website may be much more plentiful and relevant, limiting the user's effectiveness while at the initial scene if this data cannot be reached. Collecting data and providing it to a departmental expert for subsequent examination is only an interim solution to the problem. What is needed is a way to increase the user's effectiveness during computer-related incidents common in a digital age. Methods are urgently needed that enable the non-expert first responder to face the daunting challenge of identifying leads concealed within the array of data scattered across an on-line presence of an individual such as a user (POI) of the target computer 102.

Accordingly, the system 100 has been configured to function with the CLEW as a low-cost investigation tool targeted for use by a non-expert first responder or other investigators, including those with little or no digital investigation expertise. Although LEFRs are referred to herein as a major user for application of the CLEW, other computer investigators, including parents and employers—all generally referred to as "users"—may use the CLEW with equal effectiveness and utility. Accordingly, reference to LEFRs and the CLEW are but exemplary in terms of the system 100 presently disclosed. The CLEW tool within the system 100 guides users through the identification and collection of the available online data, and helps them understand it sufficiently to discern actionable leads. In addition to live volatile evidence, email and instant messaging evidence that the CLEW collects, there is support for data capture from social networking sites, such as Facebook. Additionally, CLEW supports analysis by the user to facilitate the identification of actionable leads while still at the investigation site. In addition, in some embodiments, the CLEW may include integration capability with intra-organizational communications, such as a police department CAD, system 144, so that captured data may be sent in real-time back to the organization.

The target computer 102 may execute the CLEW program to capture information on potentially-relevant items such as processes that are running, registry entries related to instant-messaging clients, software that is installed on the computer, and open network connections. The information may or may not be relevant to each individual case, but the cross correlation with other information that is gathered could be quite valuable in the investigation, building a more coherent, useful case. Investigative entities have only one opportunity to get that information, so they need to get it early.

The CLEW application may be run as a standalone application from the USB device, from within the evidentiary or target computer 102, or CLEW may be run from an entirely separate system to access remote "web-based" data. CLEW can be integrated with one of a number of other tools that are available, such as with Microsoft Office Computer Online Forensic Evidence Extractor (COFEE) of Microsoft Corporation of Redmond, Wash. The CLEW application provides a graphical user interface that provides direction both by text and by graphical examples. The programming languages employed include JAVA™ and Visual Basic, but others may be used, and the present disclosure is not limited to a type of programming language or operating system, or other third party tools with which it is integrated.

The CLEW provides law enforcement first responders with assistance, while on-site, in capturing and analyzing information from social networking sites such as Facebook which can help the LEFRs determine the next steps to take. The CLEW includes support for data collection from social networking sites, including gaming and other ISP sites, enabling analysis of that evidence by the user while still on-site, and transmittal of the captured information via a communication system, such as CAD 144 found in the squad car, back to the police department lab.

The CLEW is executed once inserted into or downloaded to a running computer, such as the target computer 102. The user may execute the CLEW once it is available within the computer 102, either on a computer-readable medium or by way of a download. Additionally, or in the alternative, the CLEW may automatically execute once introduced to the computer 102. More generally, the CLEW may be installed and run on the target computer 102 through execution of an executable file on a computer-readable medium where the CLEW is stored, whether by virtue of user inputs or automated computer execution.

A graphical interface wizard is presented that asks the user what type of situation they are investigating, and then walks the user through the process of gathering information, such as email messages, and saves them to the USB device. In this way, the CLEW performs the job of a computer forensics expert, with the help of the user using the wizard. In addition to the collection of evidence, the CLEW guides the user through an investigation of the computer via a selection of case scenarios, and provides a summary analysis of the available evidence with the goal of providing immediate, actionable steps to the user. The CLEW further enables the capture and tamper-resistant storage of live data; automatically documents the steps of the user for configuring the target system to better capture future or additional evidence; suggests follow-up steps for configuring the target system to better capture future evidence; and provides upload and/or download capability for analysis by other investigators. The data that is stored may be made tamper resistant by using a cryptographic hash. Doing so helps maintain the integrity of the data as evidence in a case being built against a perpetrator or criminal based on information located on or through the computer 102.

Figure 3:
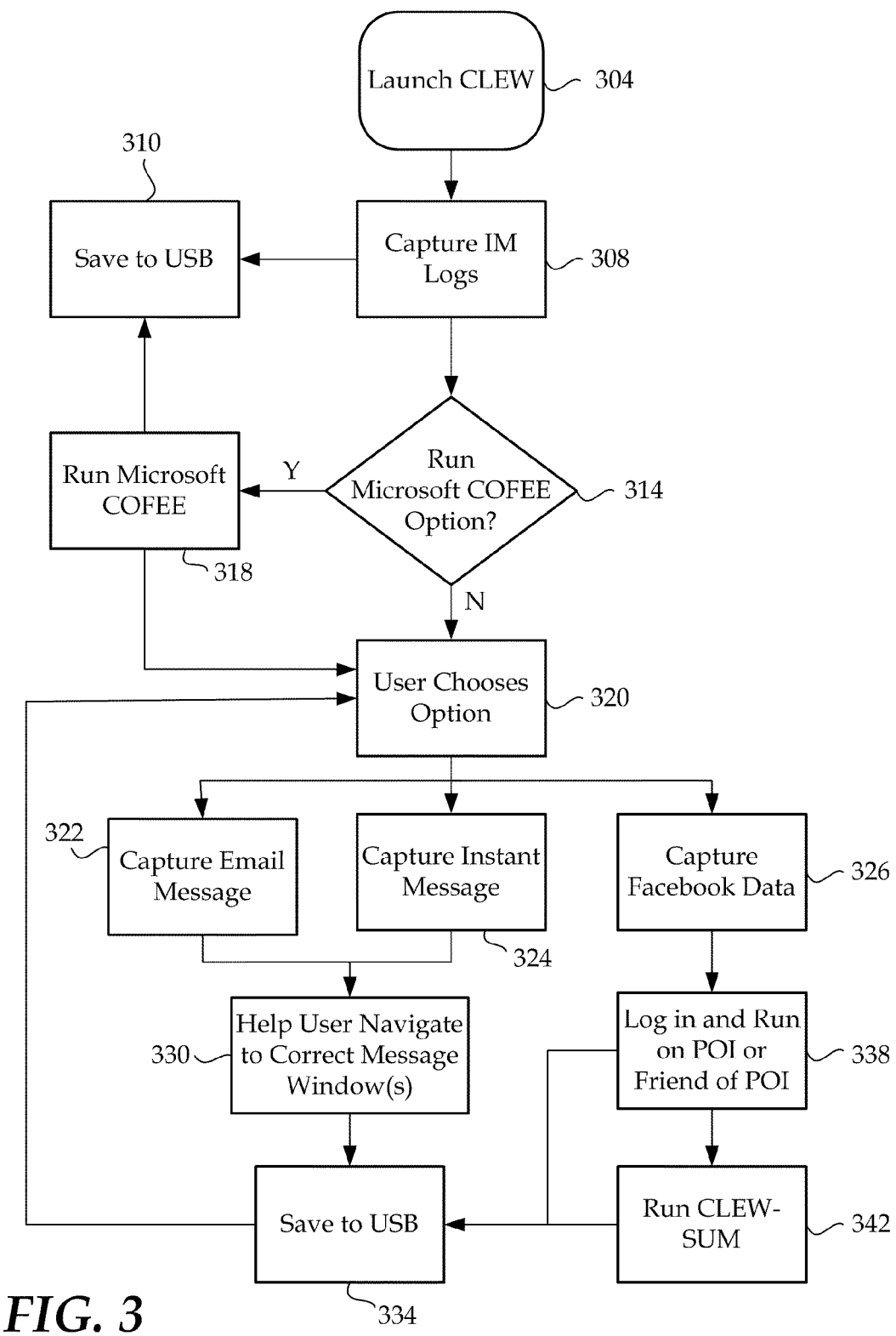
FIG. 3 is a high-level flow chart of instructions executable on the target computer of FIG. 2 for aiding the user in gathering and preserving evidence through a cyber-investigation law enforcement wizard (CLEW).

FIG. 3 is a high-level flow chart of instructions executable on the target computer of FIG. 2 for aiding the LEFR or other user in gathering and preserving evidence through the execution of the CLEW. At block 304, the target computer 102 launches CLEW from the USB or other device or after having been downloaded over the network 110. At block 308, the computer 102 captures instant messaging (IM) logs, and saves them to the USB (or other data storage) device at block 310. At block 314, the computer 102 inquires whether the user wants to run the integrated Microsoft COFEE tool. If the user responds in the affirmative, then the computer 102 runs Microsoft COFEE and, at block 310, saves the results to the USB (or other data storage) device. After COFEE completes, or if the user responds in the negative, the computer 102 provides a list of options at block 320 from which the user may choose.

Figure 7:
FIG. 7 is a screen shot of an action selection screen of the CLEW of FIG. 3, the selections to be made by a LEFR (or other user) based on the nature of the complaint.

As shown in FIG. 7, these options include to capture one or more email messages at block 322, to capture one or more instant messages (IM) at block 324, and to capture Facebook (or other social networking) data at block 326. Note that while Facebook is used as a specific example of a social networking service provider because of its popularity, other social networking providers are envisioned. If the user chooses to capture email or IM messages, the computer 102 through the CLEW helps the user to navigate to the correct message window(s) as will be explained in more detail later. If the user selects the Facebook data capture option, the computer 102 provides a login screen at block 338 for logging in as the POI or as a friend of the POI, which may include a family member. Capturing Facebook data may include a series of steps, discussed in more detail later, and the data may be stored in the USB (or other storage) device at block 334. At block 342, the computer 102 may execute a summary program (CLEW-SUM) to display reports or otherwise to display summarized results of the captured data that are organized according to class of data, which will be explained in more detail later. Screen shots of some of these reports or summarized results may be saved to the USB (or other storage) device at block 334. These reports or summary screens may enable the user to analyze and develop a course of action with regards to the POI while at the scene of a cybercrime or other event of interest to the investigator involving the computer 102.

Figure 4:
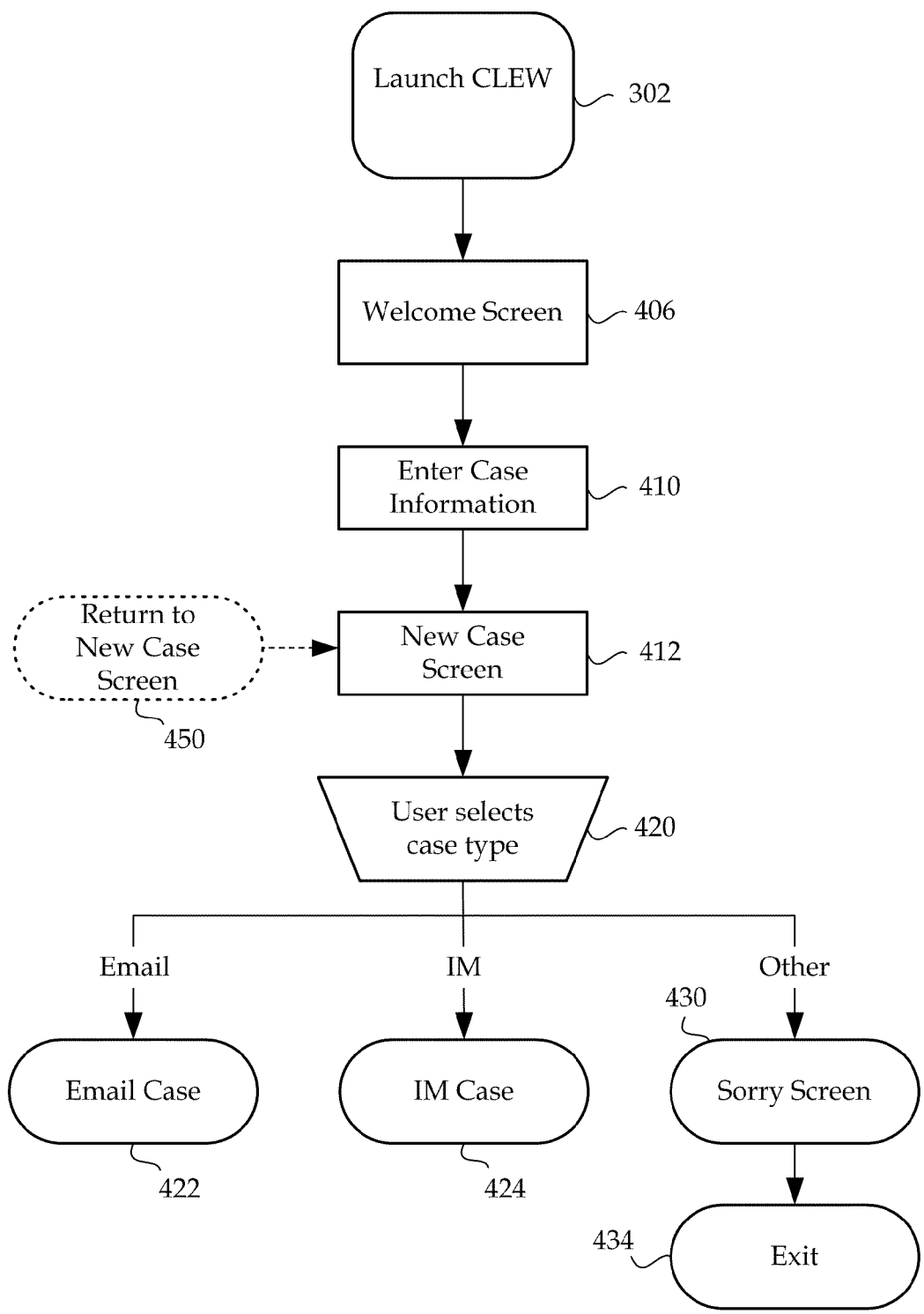
FIG. 4 is a flow chart of the initiation of the CLEW of FIG. 3 on the target computer for one or more new cases.
Figure 5:
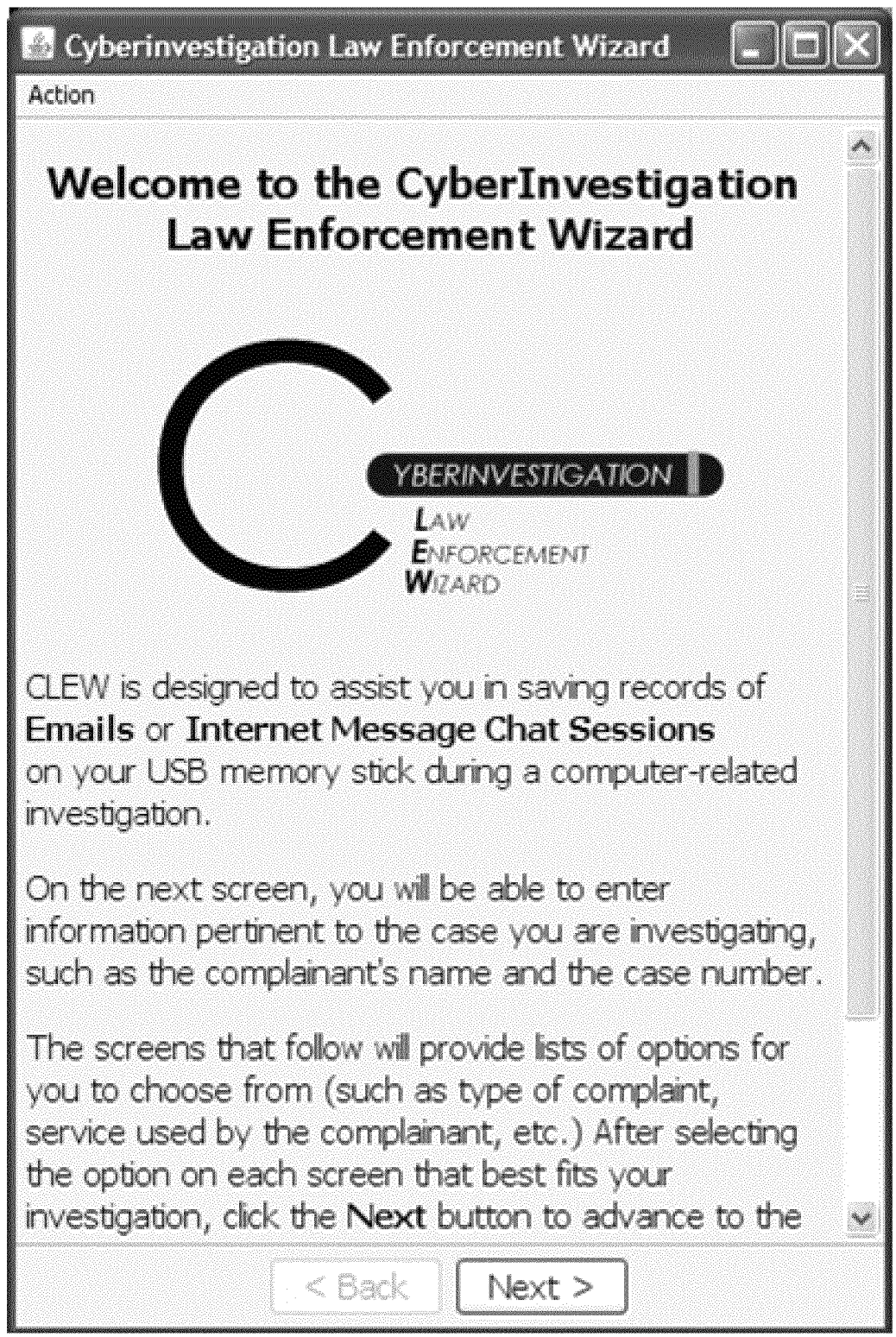
FIG. 5 is a screen shot of a welcome information screen for the CLEW of FIG. 3.
Figure 6:
FIG. 6 is a case information entry screen for the CLEW of FIG. 3.

FIG. 4 is a flow chart of the initiation of the CLEW of FIG. 3 on the target computer 102 for one or more new cases. After launching CLEW on the target computer at block 302, the target computer 102 may display a welcome screen such as that shown in FIG. 5 to the user, at block 406. The welcome screen may provide an overview of the purpose of the CLEW, and may begin providing instructions such as what may be expected of the user during the data gathering session. Again, the user may be fairly computer illiterate and thus the screens of the CLEW may provide very detailed instructions or provide additional steps that may not be required if the user were an expert. At block 412, the computer 102 may display a new case screen to the user such as that shown in FIG. 6, for gathering the officer's name, badge number, case number, date, time, the name of the complainant, the name of the perpetrator (or POI), the name of the internet service provider (ISP), and a short description of the case.

At block 420, the computer 102 may present to the user a list of choices from which to select to start gathering data from the computer 102. At block 422, the user may select to start an email case; at block 424, the user may select to start an IM case; and, at block 430, the computer 102 may display to the user a "sorry screen," apologizing to the user that no other option is currently available. At block 450, a link from elsewhere in CLEW, especially at later steps in the data-gathering process, may link back to block 412 to begin a new case or to further seek additional evidence.

In one example, FIG. 7 displays an action selection screen of the CLEW of FIG. 3, the selections to be made by a LEFR (or other user) based on the nature of the complaint. The complaint may involve one or more of an email message, an instant message (IM), a Facebook post or the like, or some other information. Such messages or posts may include threatening or inappropriate language or may include malicious code such as a virus or the like.

Figure 8:
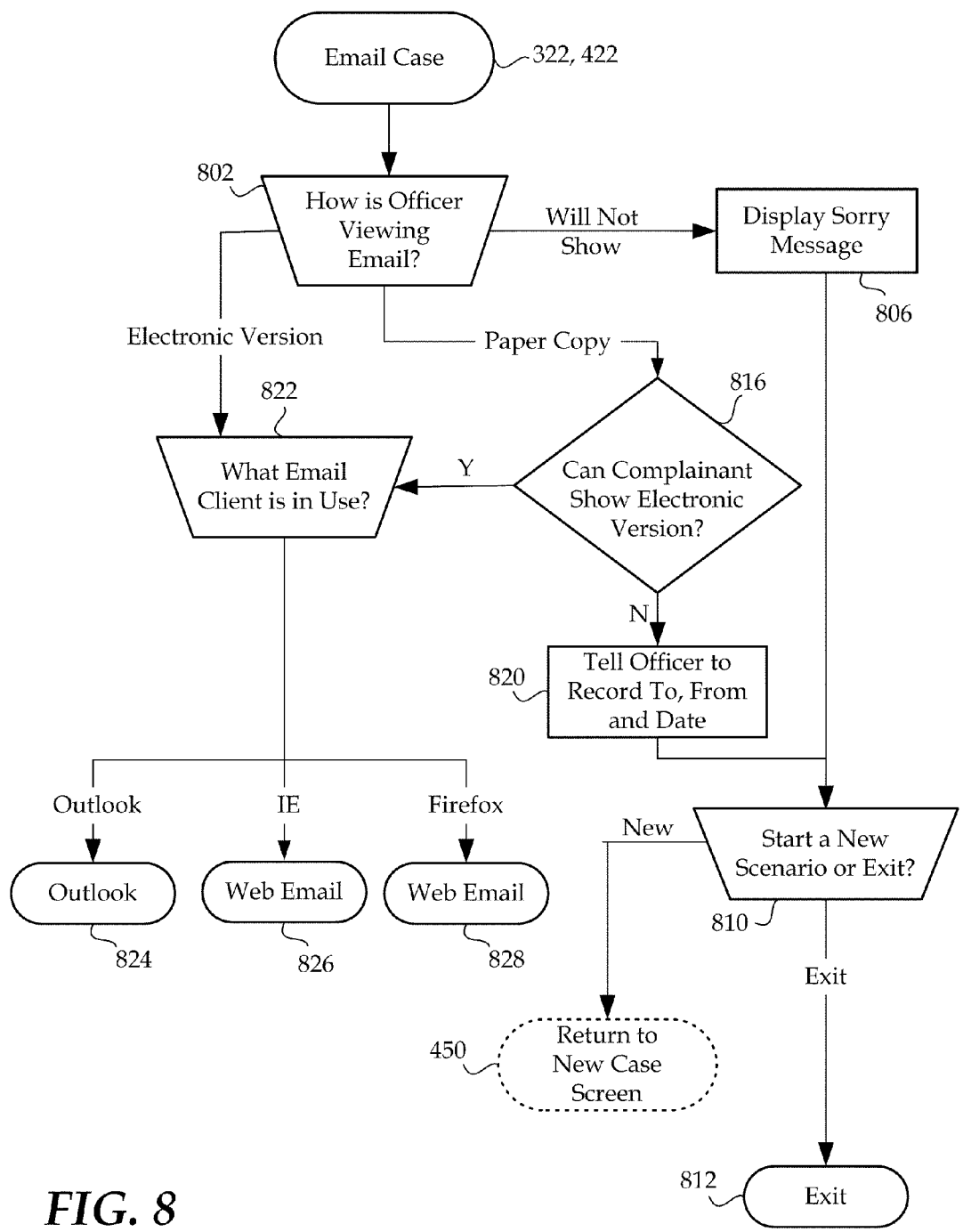
FIG. 8 is a detailed flow chart for action options to be taken based on selection of email in FIG. 7.
Figure 9:
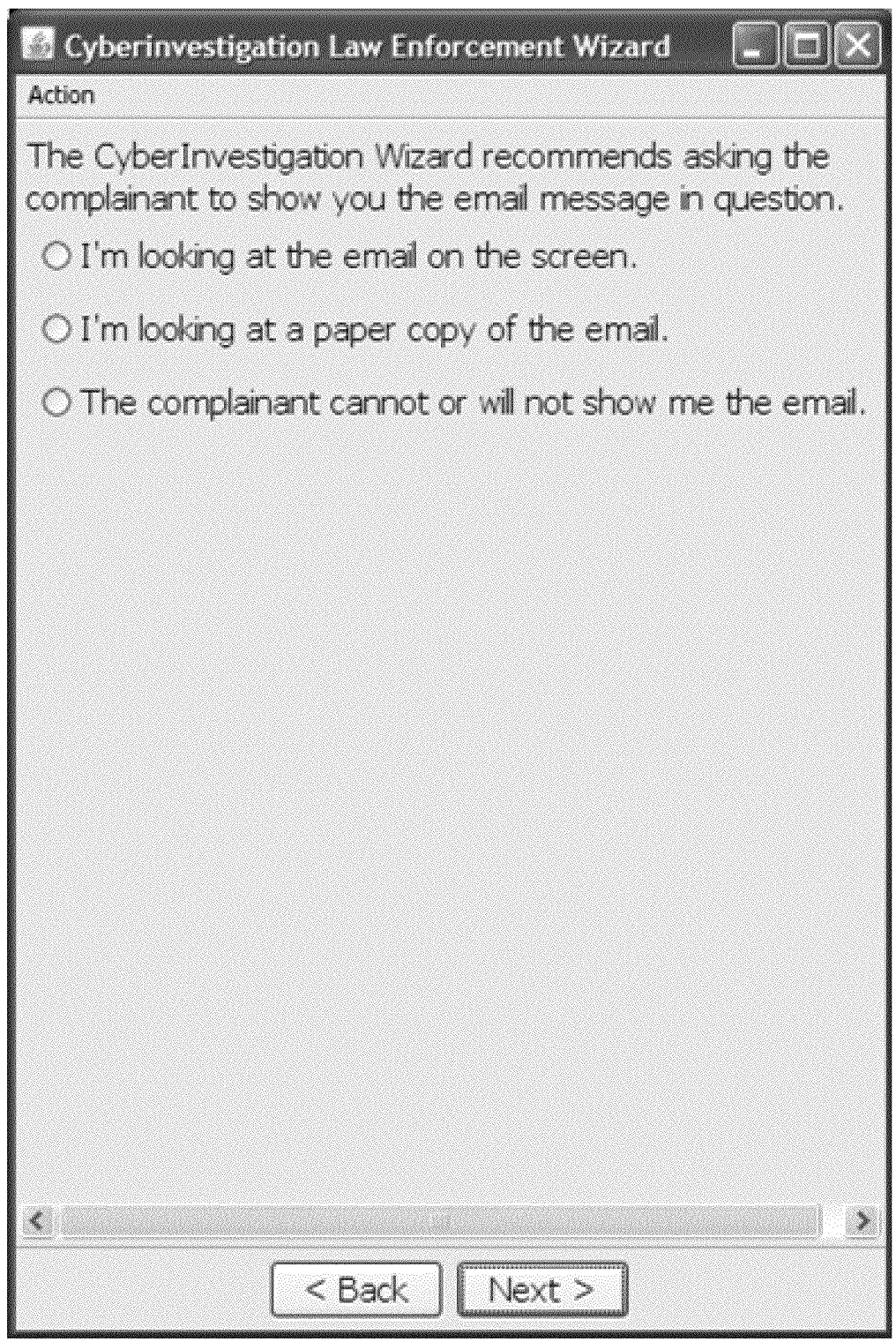
FIG. 9 is a screen shot of an action selection screen to elicit how the user is viewing the email for the flow chart in FIG. 8.

FIG. 8 is a detailed flow chart for action options to be taken based on selection of email in FIG. 7. If email is chosen at blocks 322 or 422, the target computer 102 may ask the user, at block 802, how the user is viewing the email. The options may include, for instance, an electronic version, a paper copy, or that "the complainant cannot or will not show me the email" as displayed in FIG. 9. If the user selects that the complainant cannot show the email, there is likely some technical error and the computer 102, at block 806, may display a "Sorry Message," to apologize and to redirect the user to another screen. In one example, at block 810, the computer 102 may prompt the user to select a new scenario or to exit. If the user chooses to start a new scenario, the computer 102 may redirect the user to the new case screen via block 450 (FIG. 4). If the user chooses to exit, the computer 102 may exit the CLEW application at block 812.

If, at block 802, the user selects paper copy, the computer 102 may display an inquiry to the user such as, "can the complainant show an electronic version?" to ensure that there is no electronic version available. If the user responds in the negative, the computer 102 may prompt the user to, at block 820, to record the to/from information of the email as well as the date of the email. If the user responds in the affirmative, the computer 102 may ask the user, at block 822, which email client program is being used. The options may include Microsoft Outlook at block 824, Web Email in Internet Explorer (IE) at block 826, or Web Email in Firefox at block 828. Different or additional email clients may be included. For instance, the screen shot in FIG. 10 displays a list of email client program options from which the user may select, including IE, Mozilla Firefox, Microsoft Outlook or Outlook Express. The screen shot in FIG. 10 provides a hint as to where to look to find which program it is, and it may also direct the user to look under the "About" option in the Help menu of the CLEW application.

Figure 10:
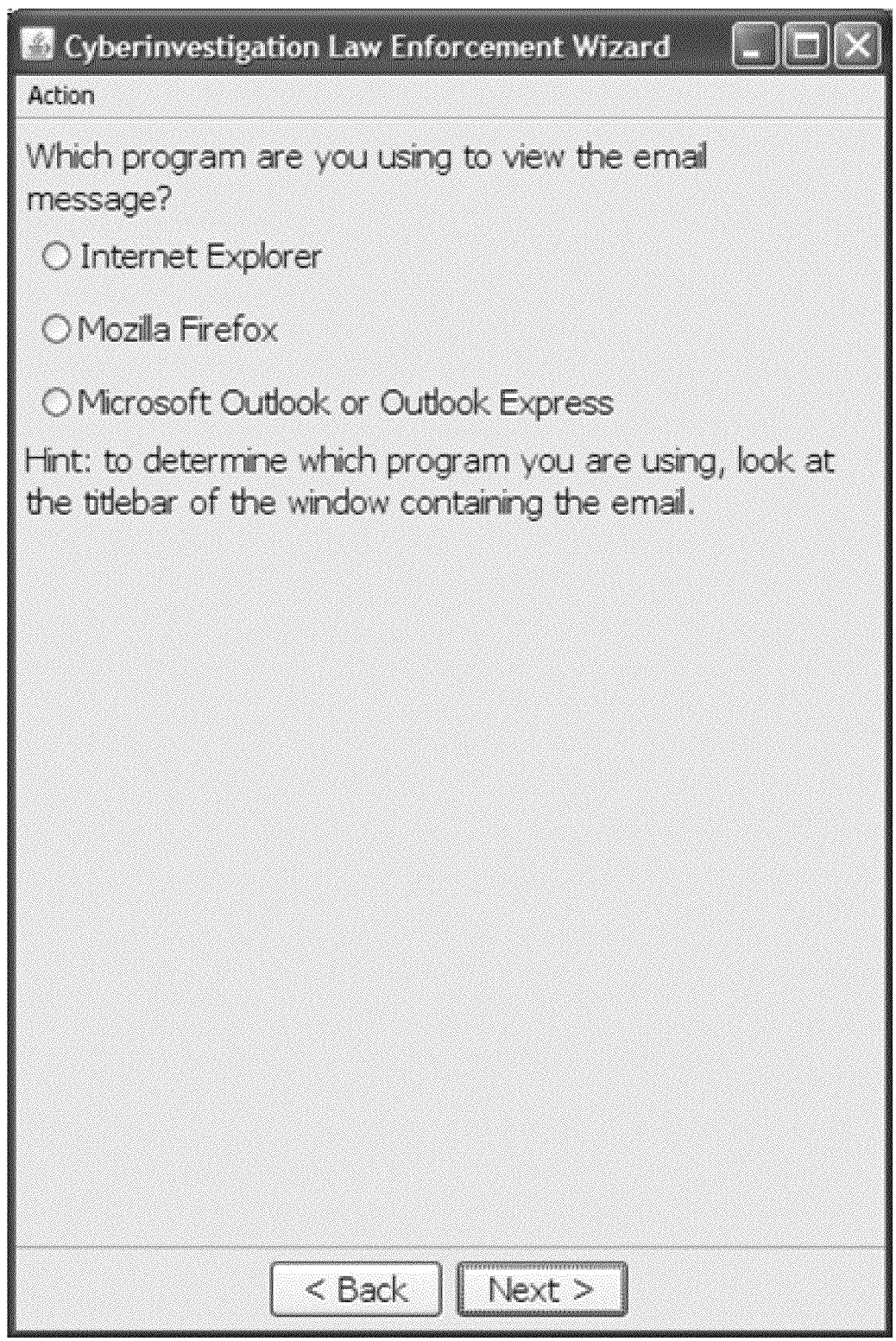
FIG. 10 is a screen shot of an action selection screen to elicit the email program in which the user is viewing the email of FIG. 7.
Figure 11:
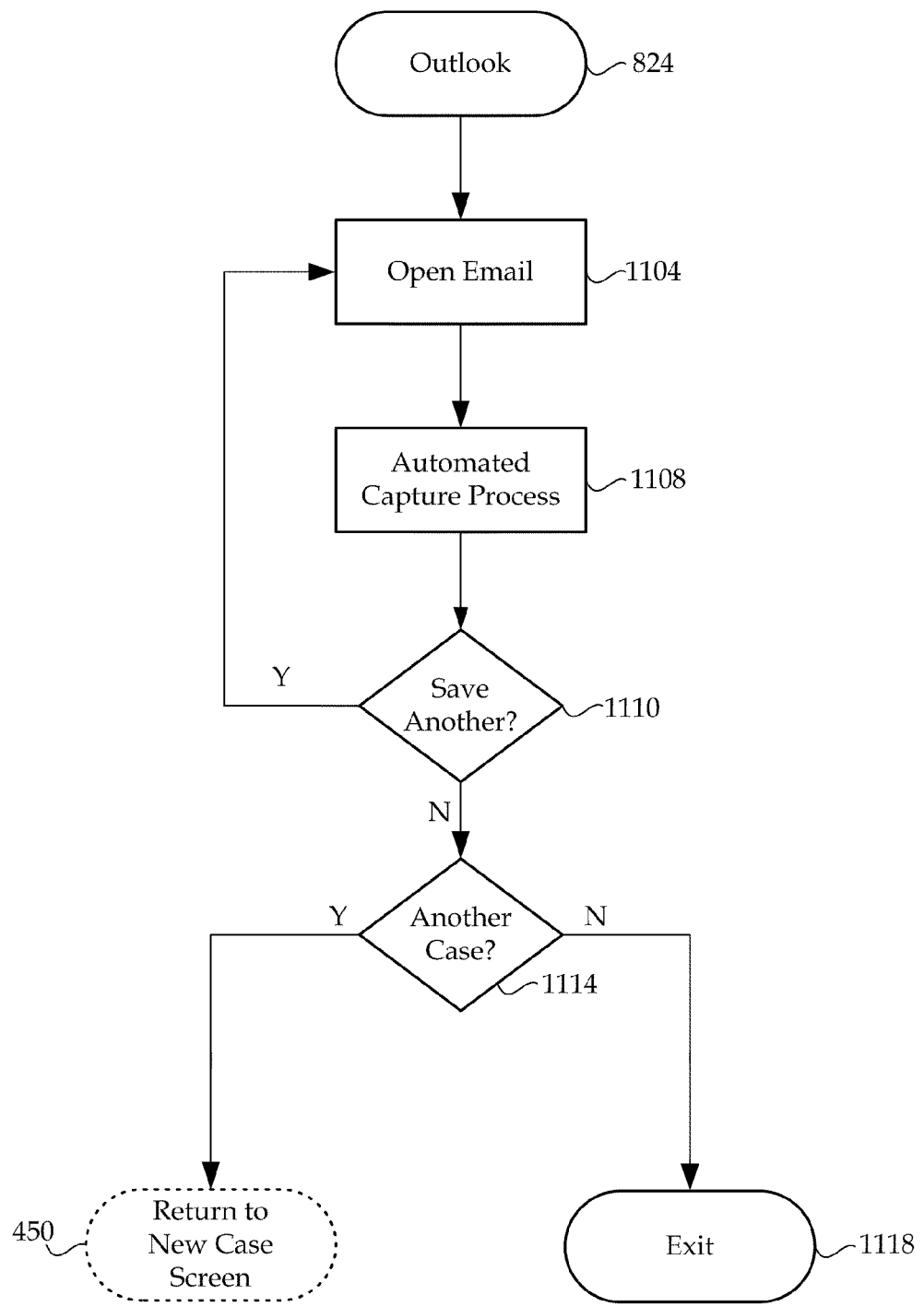
FIG. 11 is a flow chart for capturing and saving emails from Outlook if selected in FIGS. 8 and 10.

FIG. 11 is a flow chart for capturing and saving emails from Outlook if selected in FIGS. 8 and 10. After the user selects Outlook or Outlook Express at block 824 (FIG. 10), the target computer 102 may open the email at block 1104. The email may be opened in response to the user clicking on the email inside of Outlook. At block 1108, the computer 102 may then automate the capture of the email, saving it to the USB (or other data storage) device. At block 1110, the computer 102 prompts the user whether the user wants to save another email. If yes, the computer 102 may return to block 1104 to open another email and to repeat the capture process. If no, the computer 102 may continue on to block 1114, and ask the user whether the user wants to start another case. If the user responds in the affirmative, the computer 102 links back through block 450 to return to the new case screen in FIG. 4. If the user responds in the negative, the computer 102 may exit the CLEW application at block 1118.

Figure 12:
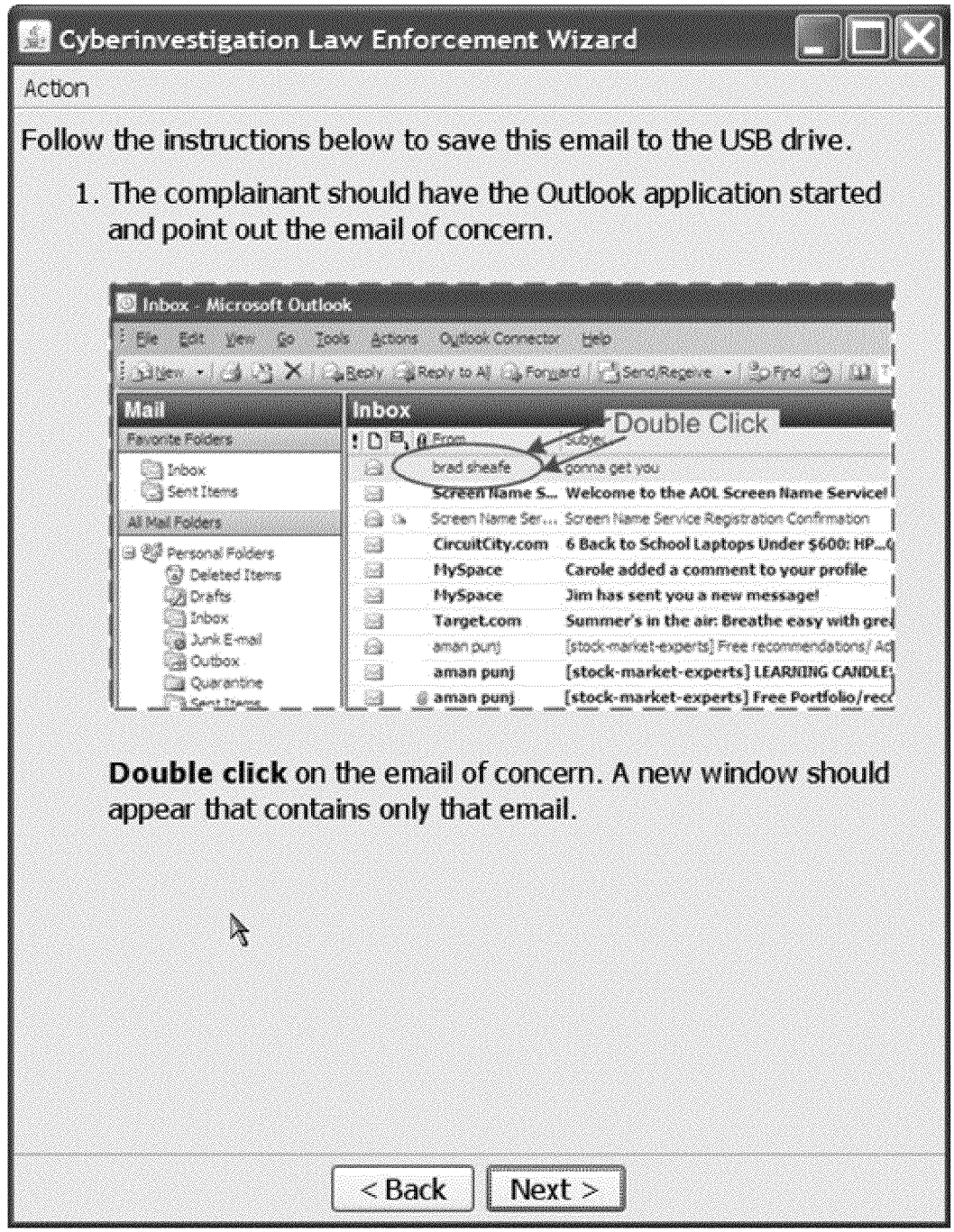
FIG. 12 is a screen shot of an example inbox in Outlook in which the user may select an email of concern, related to FIG. 11.

FIG. 12 is a screen shot of an example inbox in Outlook in which the user may select an email of concern, related to FIG. 11. Note that the screen highlights the email of concern and instructs the user to "double click" the email to capture it. This will isolate that email in a window of its own, after which the computer 102 may direct the user to do a "Save-As" or to drag and drop the email in the USB (or other storage) device, to save the email. Other capture methods are envisioned.

Figure 13:
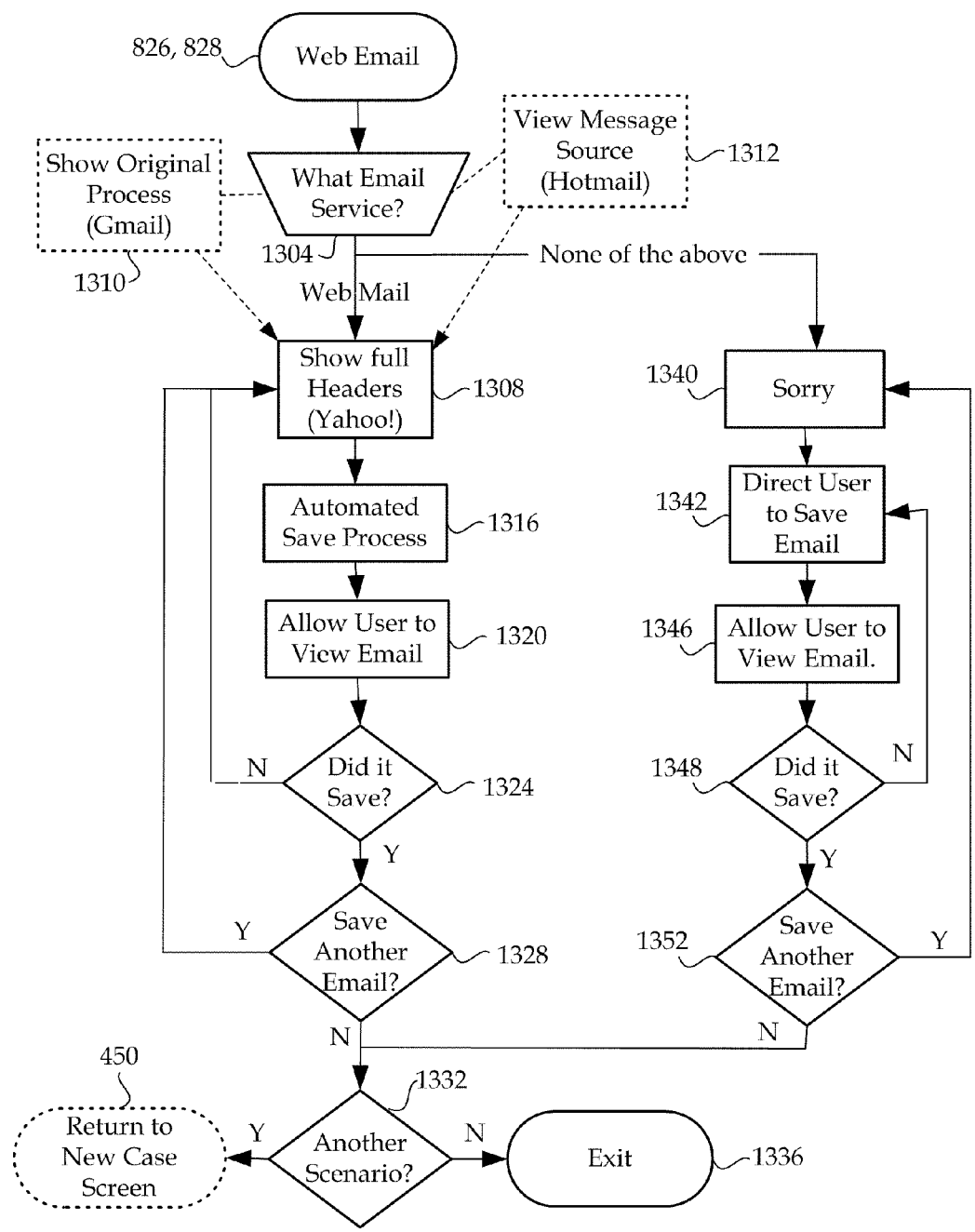
FIG. 13 is a flow chart for capturing and saving emails from a Web-based provider if selected in FIGS. 8 and 10.
Figure 14:
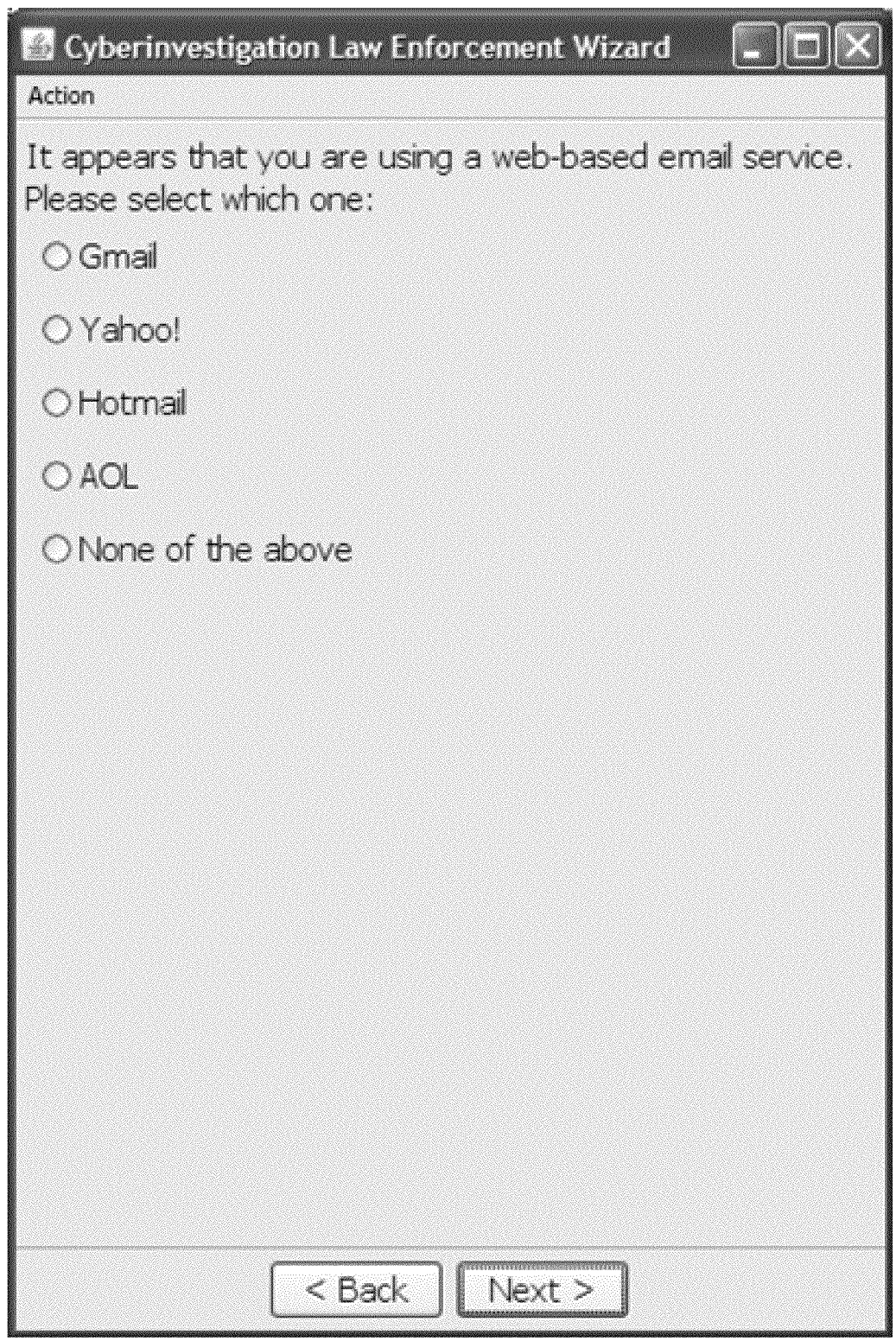
FIG. 14 is a screen shot of an action selection screen for the user to select which Web-based service provider is being accessed in FIG. 13.

FIG. 13 is a flow chart for capturing and saving emails from a Web-based provider if selected in FIGS. 8 and 10. If the user chose Web email at blocks 826 or 828 of FIG. 8, the target computer 102 may inquire what email service is being used at block 1304. Such email services may include, but are not limited to Yahoo!, Gmail, Hotmail, AOL, etc., as displayed in the selection screen of FIG. 14. At block 1308, the computer 102 may show the full headers if Yahoo! was selected. If Gmail was selected, the computer 102 may show the original process for saving the email at block 1310. If Hotmail was selected, for instance, the computer 102 may allow viewing the original message source at block 1312. Each webmail service provider may provide access to different types of information, and the user may need to expose that information before saving the email as will be described in more detail later. Regardless of the service provider, the rest of the email capture process may be substantially similar.

For instance, at block 1316, the computer 102 may automate saving the email. At block 1320, the computer 102 may allow the user to view the saved email, and at block 1324, determine whether the email was properly saved. If the email did not save, the computer 102 may return to block 1308 to try again. If the email did save, the computer 102, at block 1324, may ask whether the user wants to save another email. If yes, the computer 102 may circle back to block 1308 to start the process of saving another email. At block 1332, the computer 102 may ask the user if the user wants to start another case scenario. If the user answers yes, the computer may link through block 450 to the new case screen (FIG. 4). If the user answers no, the computer 102 may exit from the CLEW application at block 1336.

If the user responds that none of the listed email service providers match the service provider of the email of concern, the computer 102 may, at block 1340, display a "Sorry screen" to apologize for the lack of instructions. The computer 102 may still, at block 1342, direct the user to save the email; however, the instructions presented to the user for doing so may be limited. At block 1346, the computer 102 may allow the user to view the captured email. At block 1348, ask the user if the computer 102 properly saved the email, and continue giving the user a chance to save the email at block 1342 if the email was not saved. If saving the email worked, the computer 102 may allow the user to view the email at block 1348. At block 1352, the computer 102 may ask the user if the user wants to save another email. If the user wants to continue saving email in the unknown email client, the computer 102 may direct the user back to the sorry screen at block 1340 and continue the email capture process from that point.

Figure 15:
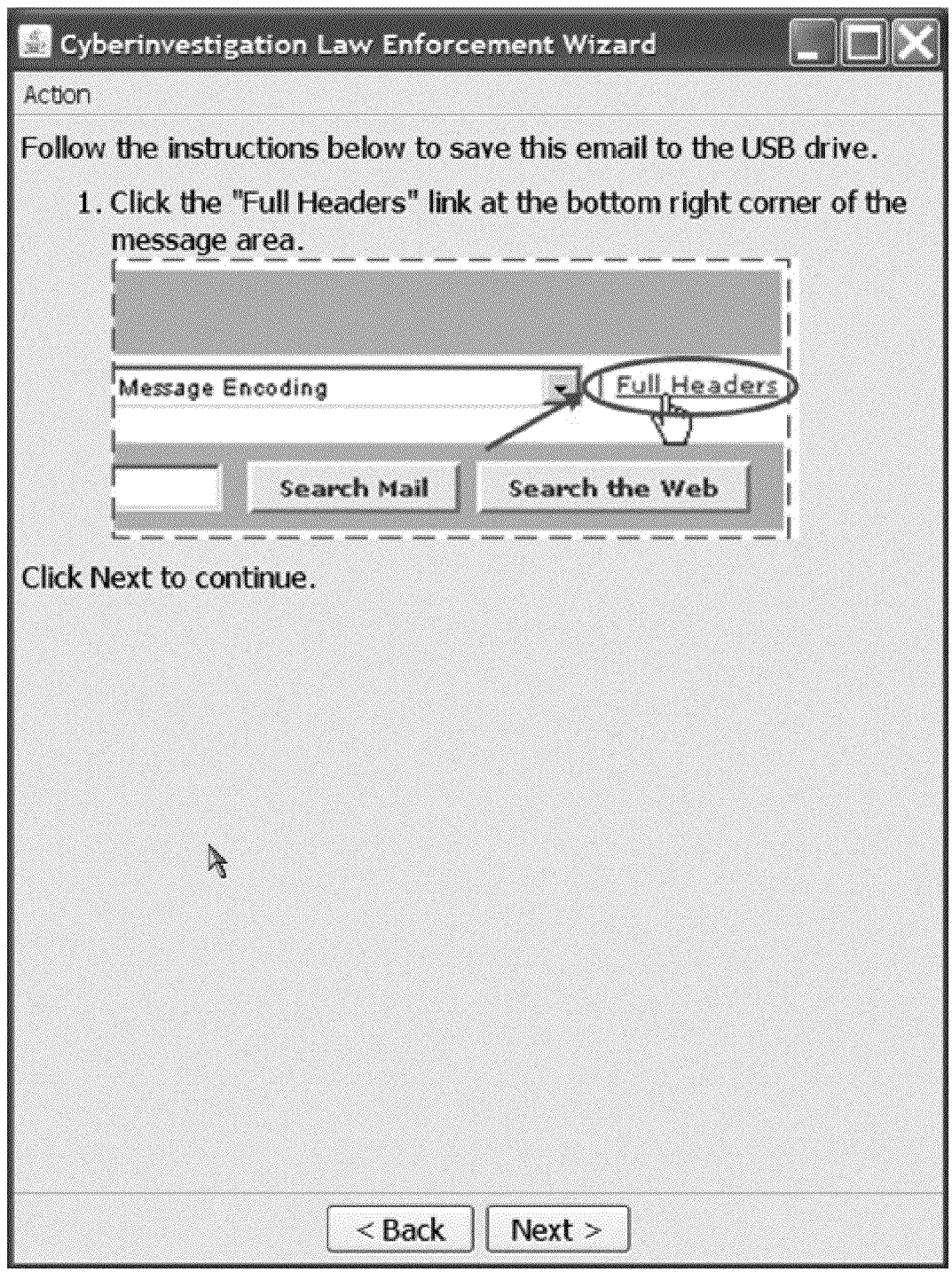
FIG. 15 is a screen shot of an example instruction screen for saving an email from Yahoo!, to expose the full headers of the emails.
Figure 16:
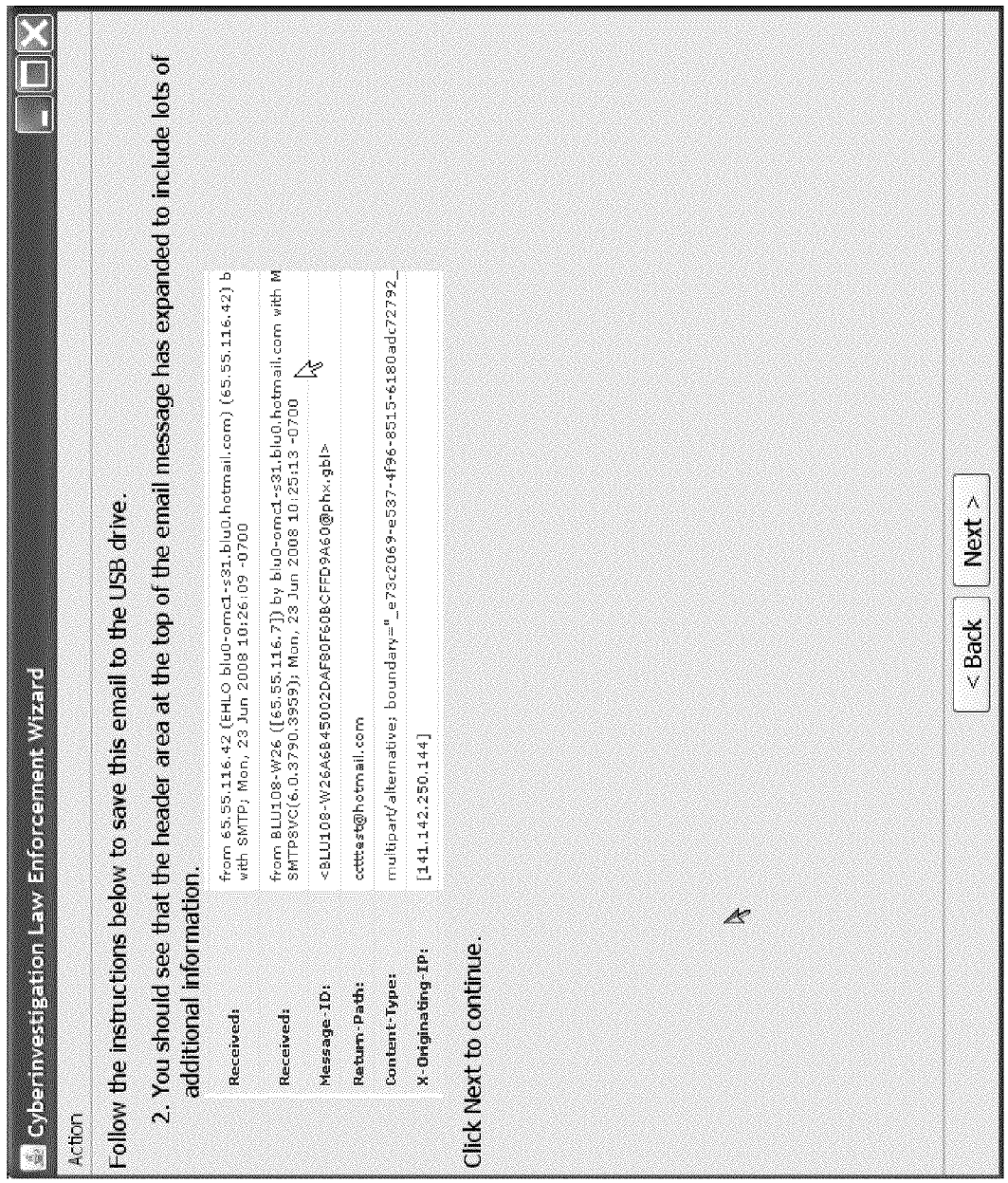
FIG. 16 is a screen shot with example instructions to the user for saving an email from Yahoo!, including the header, to the USB device.

FIG. 15 is a screen shot of an example instruction screen for saving an email from Yahoo!, to expose the full headers of the emails. After the headers are fully exposed, as performed at block 1308 of FIG. 13, the email is ready to be saved while displaying the most affiliated data possible. FIG. 16 is a screen shot with example instructions to the user for saving an email from Yahoo!, including the header, to the USB (or other storage) device.

Figure 17:
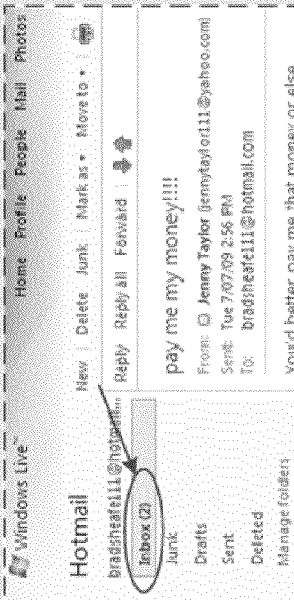
FIG. 17 is a screen shot of an example instruction screen for saving an email from Hotmail, to first locate the inbox.
Figure 18:
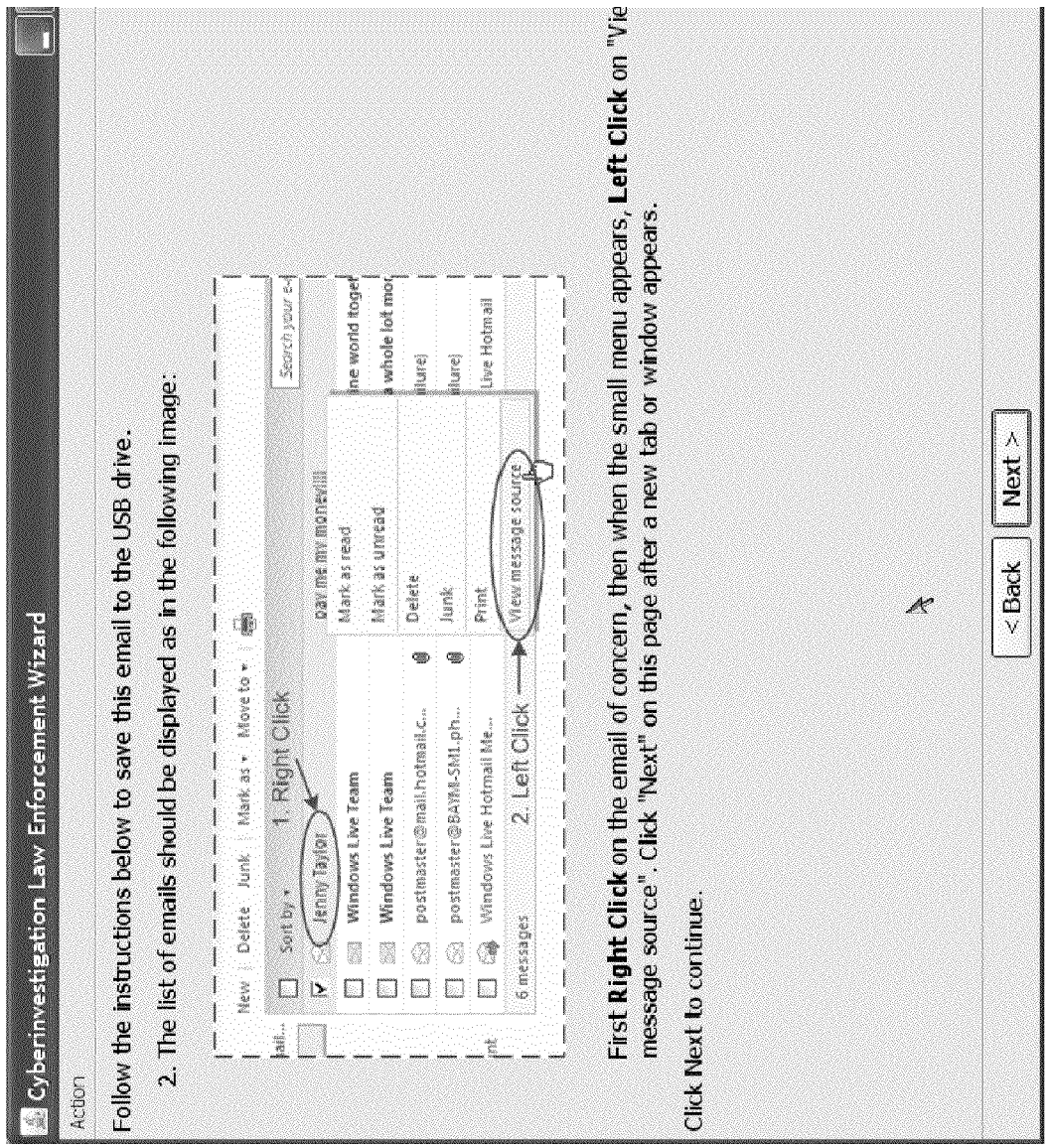
FIG. 18 is a screen shot with instructions to the user for saving an email from Hotmail, including viewing the message source.
Figure 19:
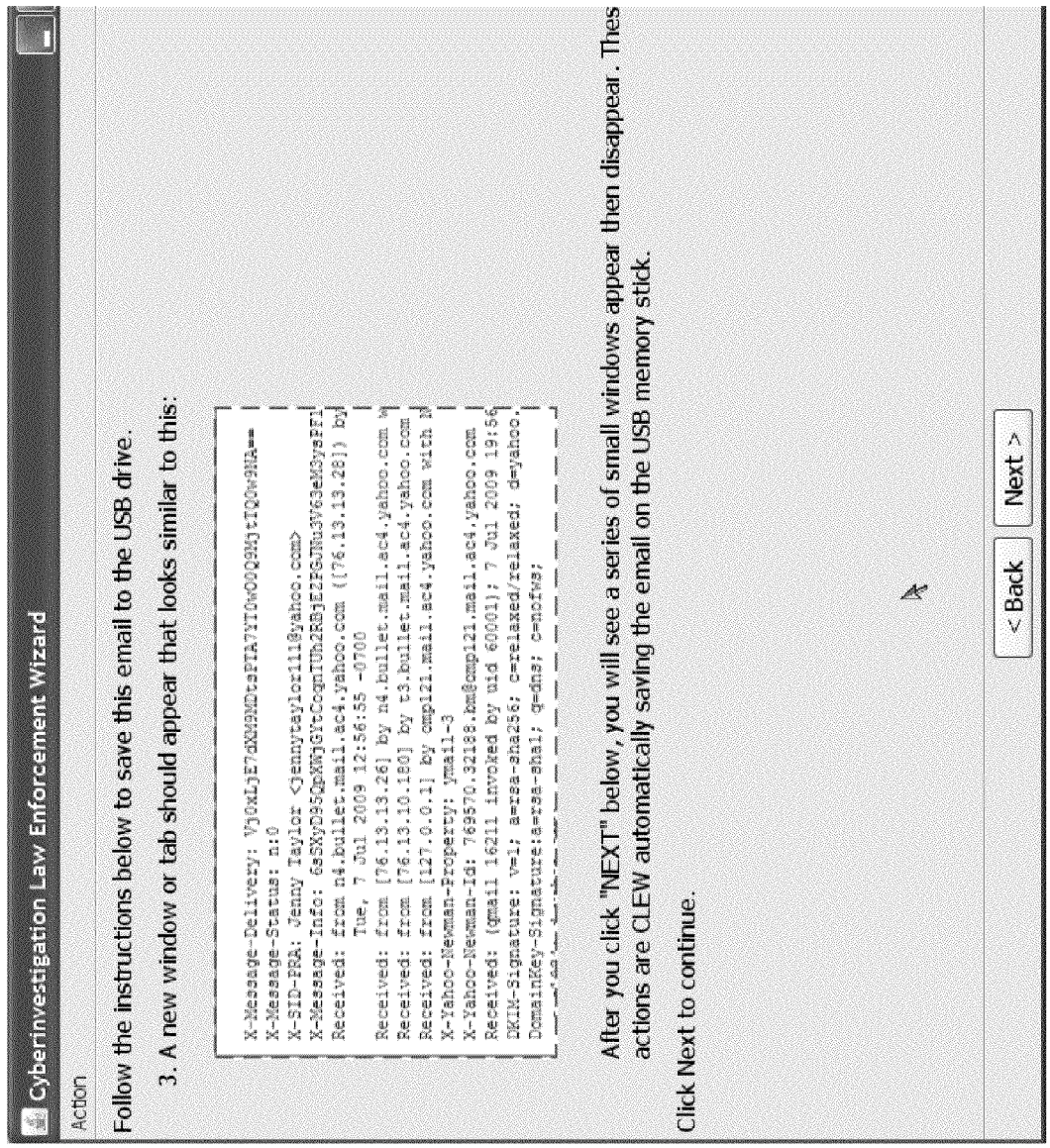
FIG. 19 is a screen shot with instructions to the user for saving an email from Hotmail, including header information, to the USB device.

FIG. 17 is a screen shot of an example instruction screen for saving an email from Hotmail, including first locating the inbox. FIG. 18 is a screen shot with instructions to the user for saving an email from Hotmail, including viewing the full message text, including headers. The screen shot of FIG. 18 also inserts comments within the Hotmail program view telling the user whether to "Right Click" or "Left Click" certain message sources to save them to the USB device. FIG. 19 is a screen shot with instructions to the user for saving an email from Hotmail, including header information, to the USB (or other storage) device. The instruction screen of FIG. 19 shows how the email will be saved and explains to the user that they may see a series of small windows that appear and disappear in the process of automatically saving the email.

Figure 20:
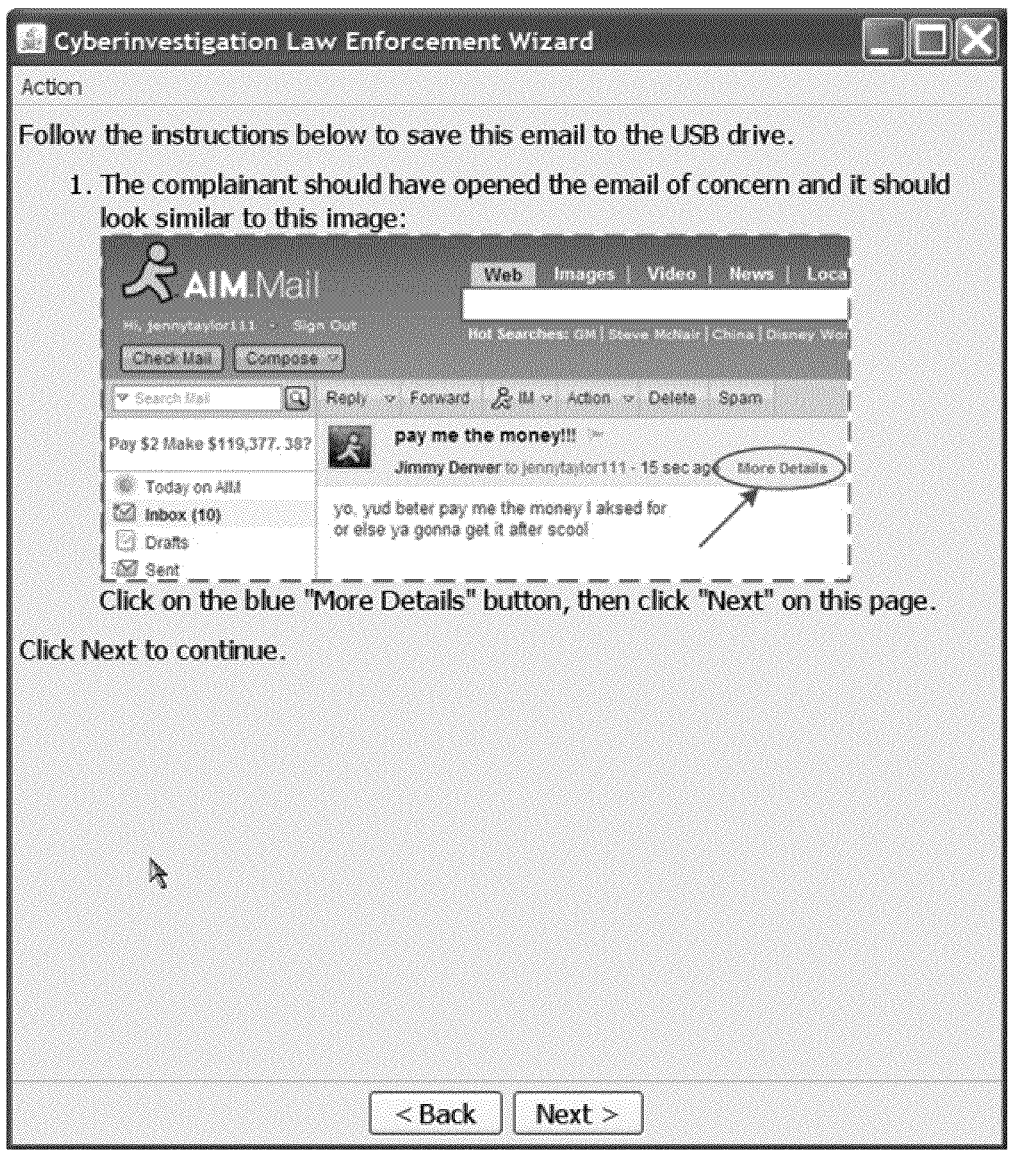
FIG. 20 is a screen shot of an example instruction screen for saving an email from AOL, to first see more details of the email.
Figure 21:
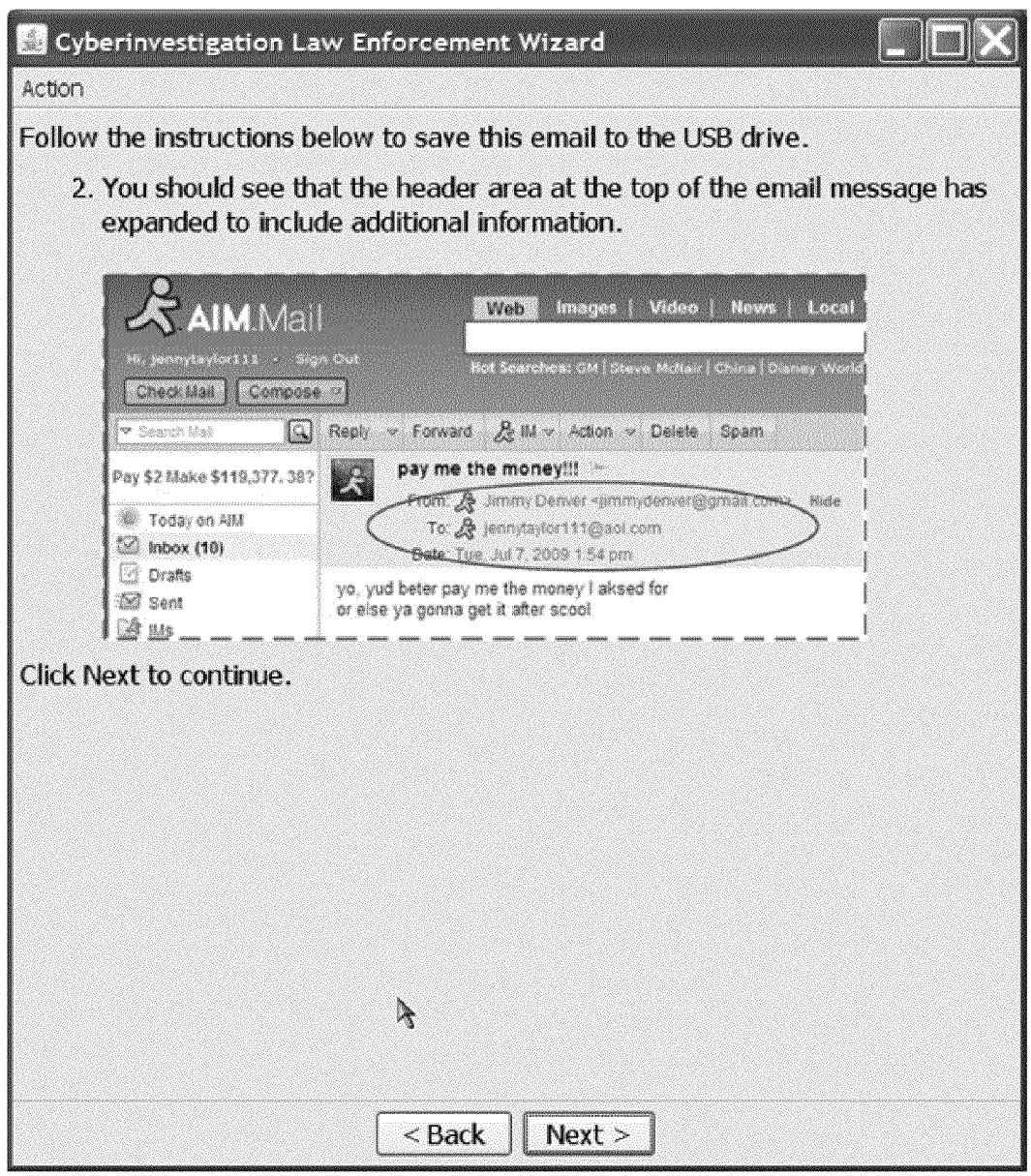
FIG. 21 is a screen shot of an example email to be saved from AOL on the USB drive after expansion of header detail in FIG. 20.

FIG. 20 is a screen shot of an example instruction screen for saving an email from AOL, to first see more details of the email. This is similar to the Yahoo! screen where the user was prompted to expose the header. FIG. 21 is a screen shot of an example email to be saved from AOL on the USB drive after expansion of header detail in FIG. 20.

Figure 22:
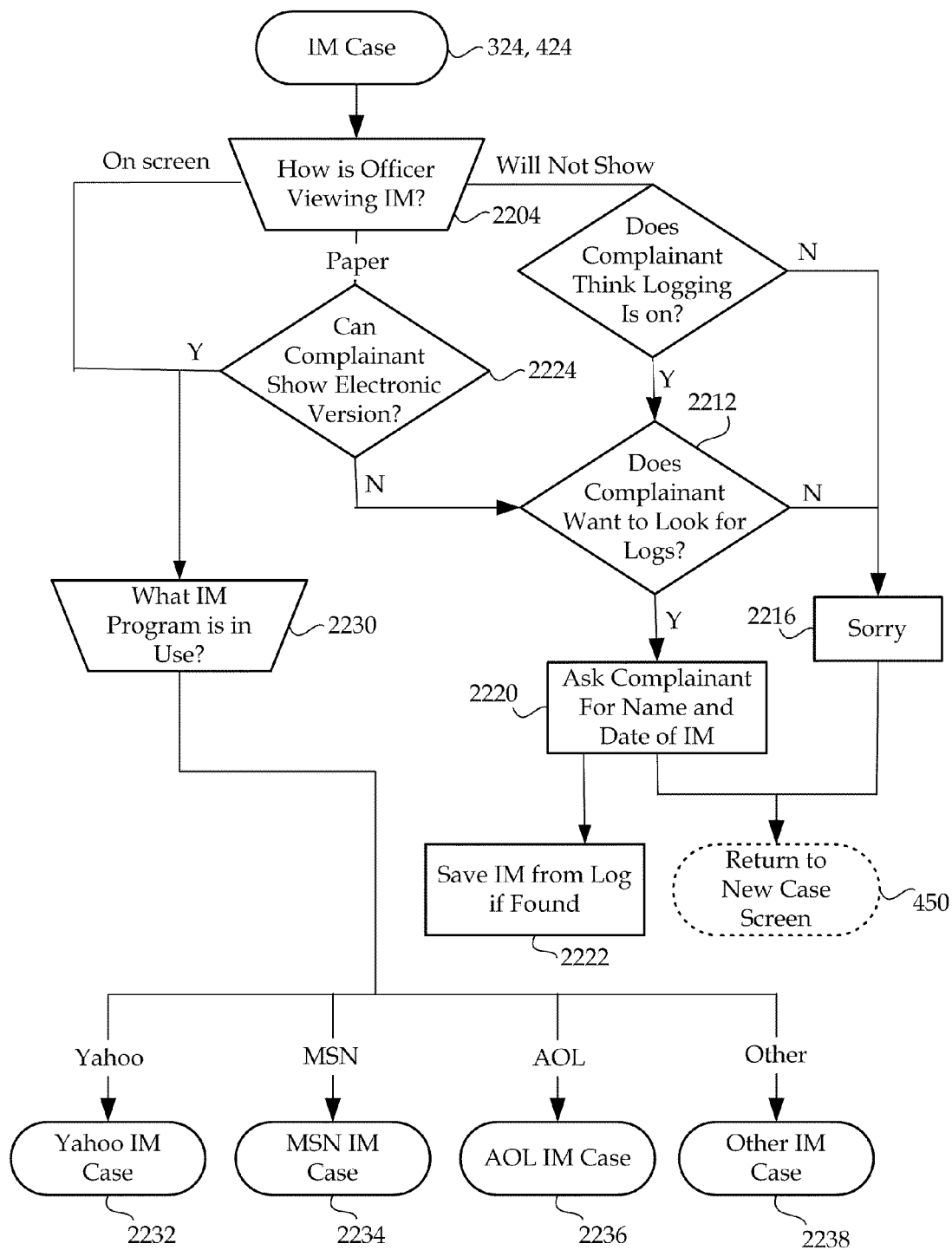
FIG. 22 is a flow chart that may be executed after the user selects an instant message (IM) to be saved in FIGS. 3-4 and 7.
Figure 23:
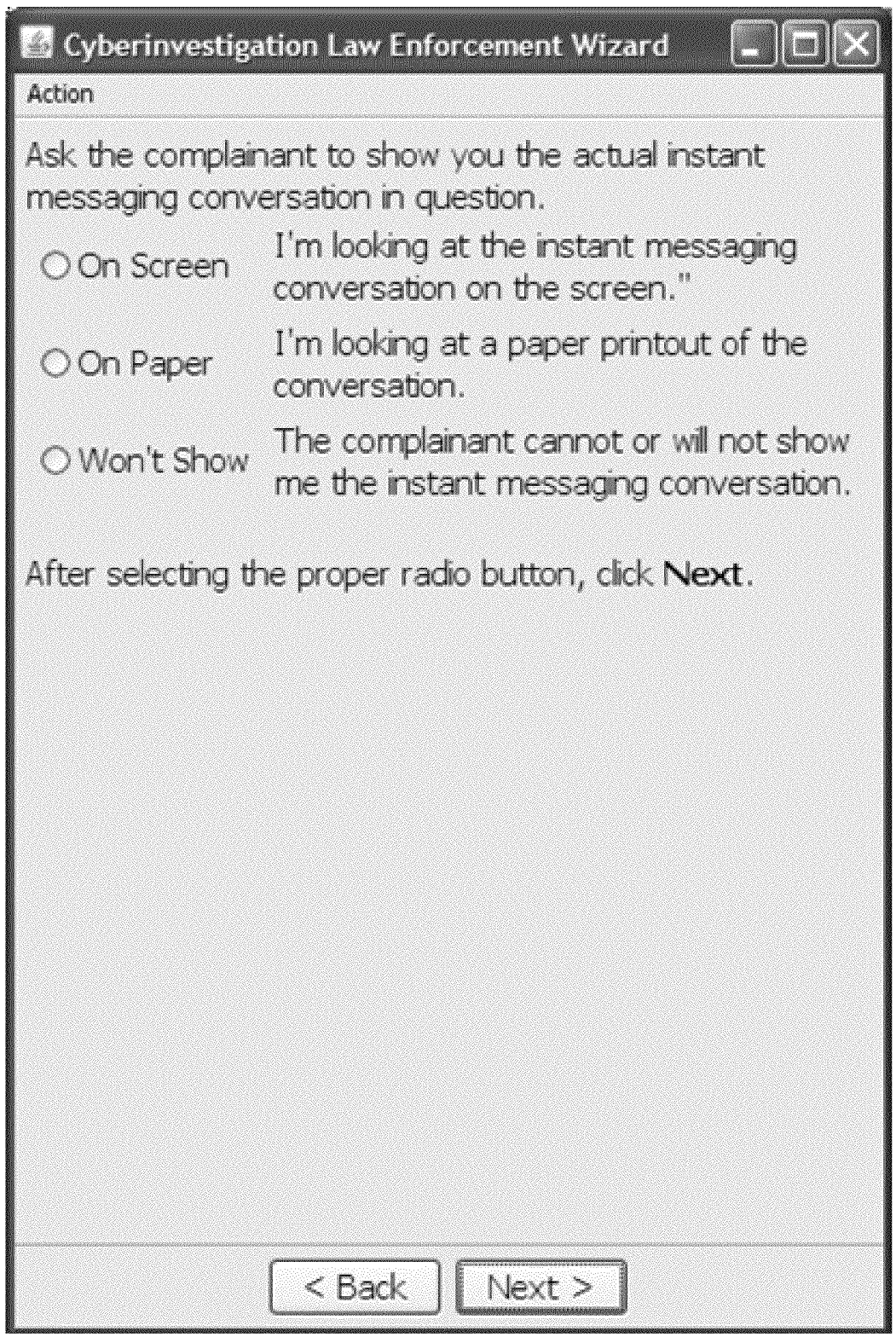
FIG. 23 is a screen shot of an action selection screen to elicit from the user how the user is viewing the IM to be saved.

FIG. 22 is a flow chart that may be executed after the user selects an instant message (IM) conversation (or just "IM") to be saved in FIGS. 3-4 and 7 at blocks 324 or 424. At block 2204, the computer 102 may inquire how the user is viewing the IM, an example selection screen show in FIG. 23. If the user responds that the IM cannot be viewed, the computer 102 may ask, at block 2208, whether the complainant thinks that IM logging is on. If the answer is no, the computer 102 may display a "sorry screen" at block 2216 to apologize for a lack of instructions and return to the new case screen through block 450. If the answer is yes, the computer 102 may further inquire whether the user wants to look for IM logs. If the answer is yes, the computer 102 may ask the complainant (or user) for the name and date of the IM to try to find it in the IM logs at block 2220. At block 2222, the computer 102 may save the IM if located in the IM logs.

Figure 24:
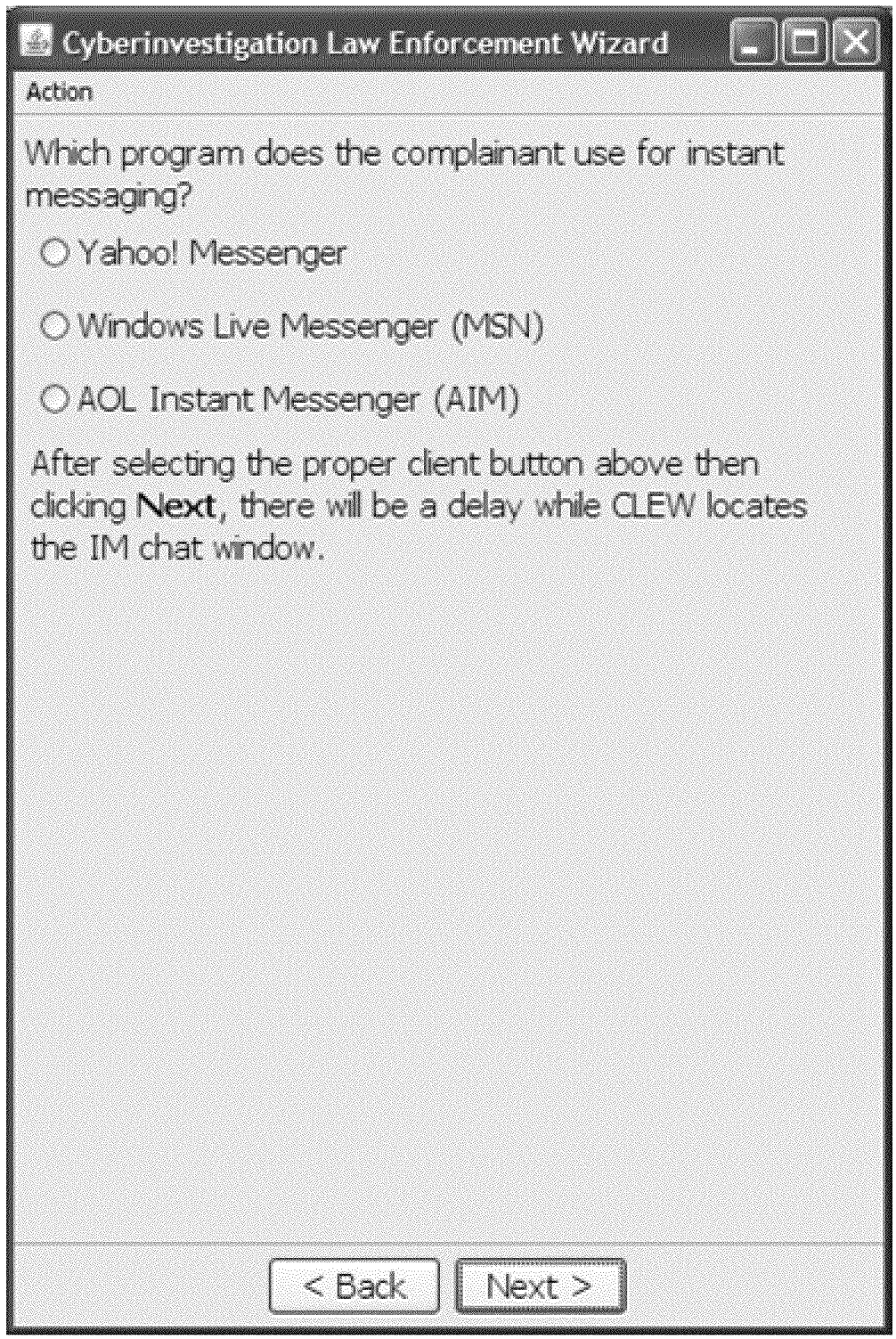
FIG. 24 is a screen shot of an action selection screen to determine from which IM provider the IM is to be saved.

If the user responds at block 2204 that the IM is in paper form, the computer 102 may, at block 2224, ask whether the complainant can show an electronic version of the IM. If no, the computer 102 may take the user to block 2212 in which it asks the user whether or not the user wants to look for the IM in a log. If yes, the computer 102 may take the user to block 2230, and ask the user what IM program is used for the IM of concern. FIG. 24 is a screen shot of an action selection screen to determine from which IM provider the IM is to be saved. Examples include, but are not limited to, selection of a Yahoo! IM case at block 2232, selection of a MSN IM case at block 2234, selection of an AOL IM case at lock 2236, and selection of any Other IM program case at block 2238. Depending on which IM program is selected for an IM case, the steps may vary to some degree because different IM programs allow a different degree of automation of IM message capture.

Figure 25:
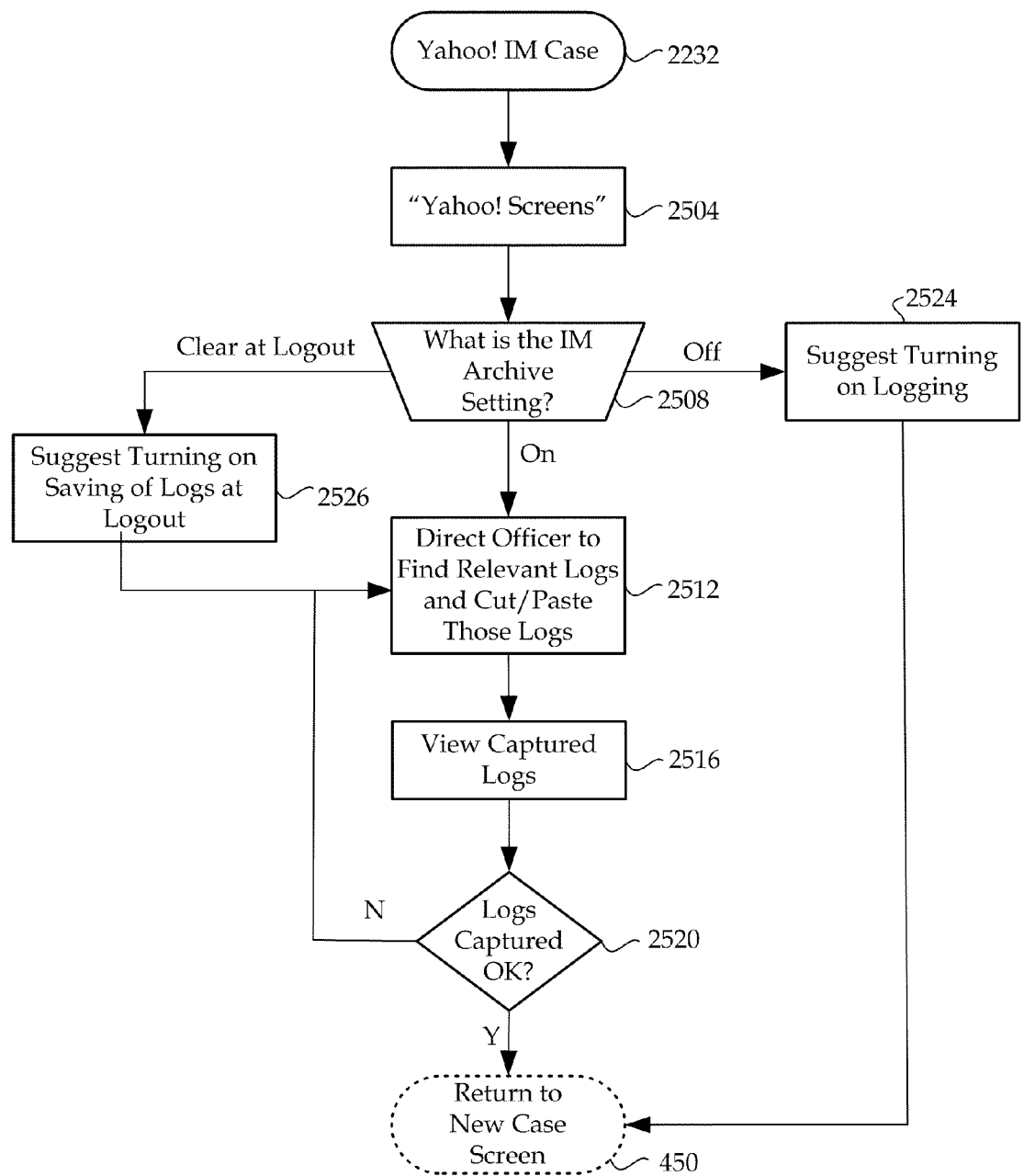
FIG. 25 is a flow chart for leading the user through capturing Yahoo! IM chat logs.

FIG. 25 is a flow chart for leading the user through capturing Yahoo! IM chat logs. If the user selected a Yahoo! IM case at block 2232, the computer 102 may take the user to a "Yahoo! Screen" window at block 2504 to direct the user through the rest of the Yahoo! IM capture. At block 2508, the computer 102 may ask the user for the current IM archive setting. If the response is that IM archive is set to "on," then the computer 102 may, at block 2512, direct the user to find relevant logs and cut and paste those logs into a predetermined CLEW text window in the display 224 that is automatically saved to the USB (or other storage) device. At block 2516, the computer 102 may allow the user to view the saved logs in the predetermined window, and at block 2520, ask the user whether the logs were saved correctly. If logs were correctly saved, the computer may return the user to the new case screen through block 450 (FIG. 4). If the logs were not correctly saved, the computer 102 may send the user back to block 2512 to try saving the logs again.

If the user responds that the archive setting is "off," the computer may suggest to the user at block 2524 to turn on logging, which is explained in more detail later with reference to FIGS. 30-31. If the user responds that the archive setting is "Clear at Logout," then the computer 102 may suggest to the user to turn on saving of logs at logout, which is an option show in FIG. 31.

Figure 26:
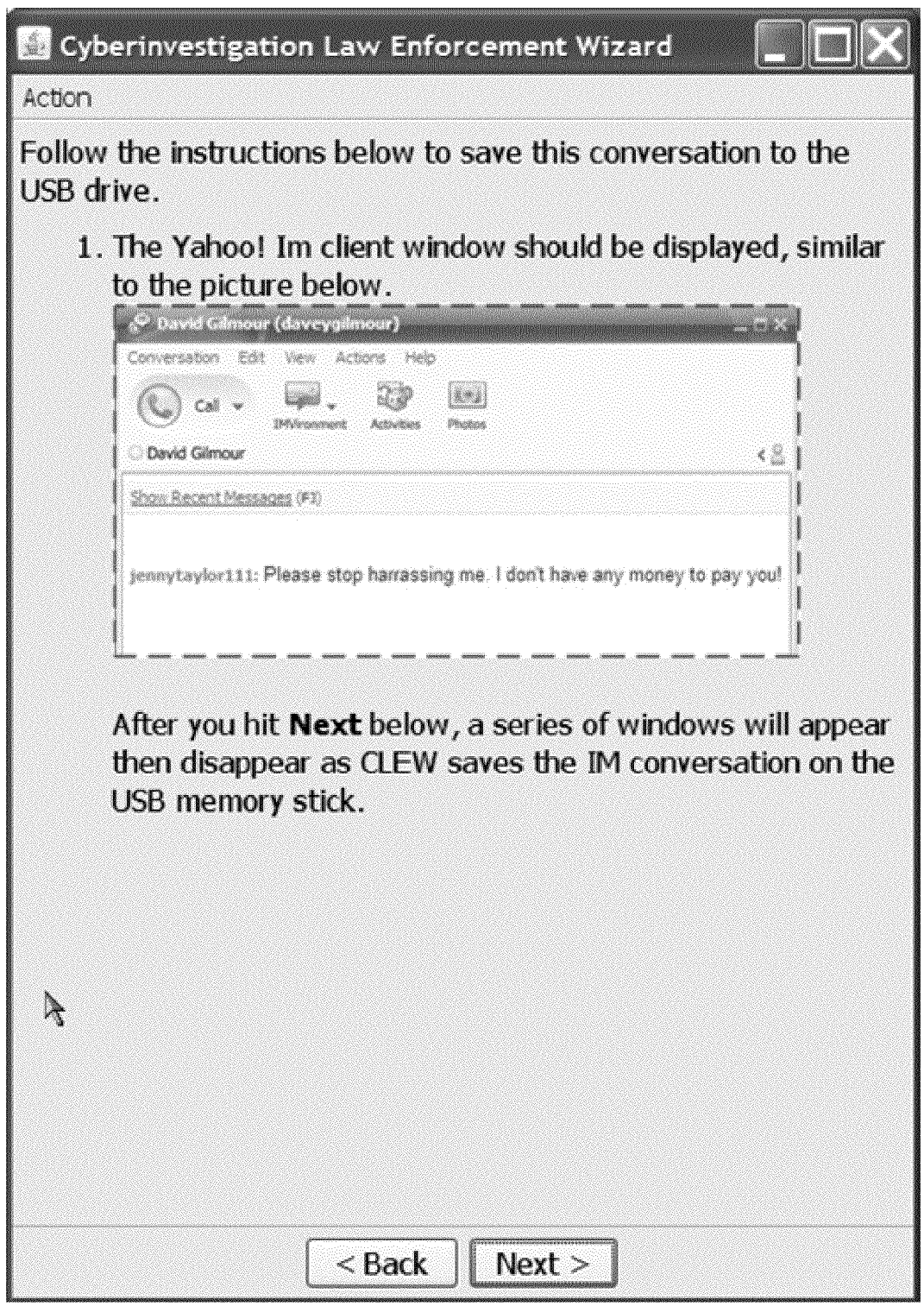
FIG. 26 is a screen shot of an example Yahoo! IM screen having an IM message currently available for capture.

FIG. 26 is a screen shot of an example Yahoo! IM screen having an IM message currently available for capture. The computer 102 may display in the screen instructions for selecting the IM message and automatically capturing the IM message, thus saving it in the USB (or other storage) device.

Figure 27:
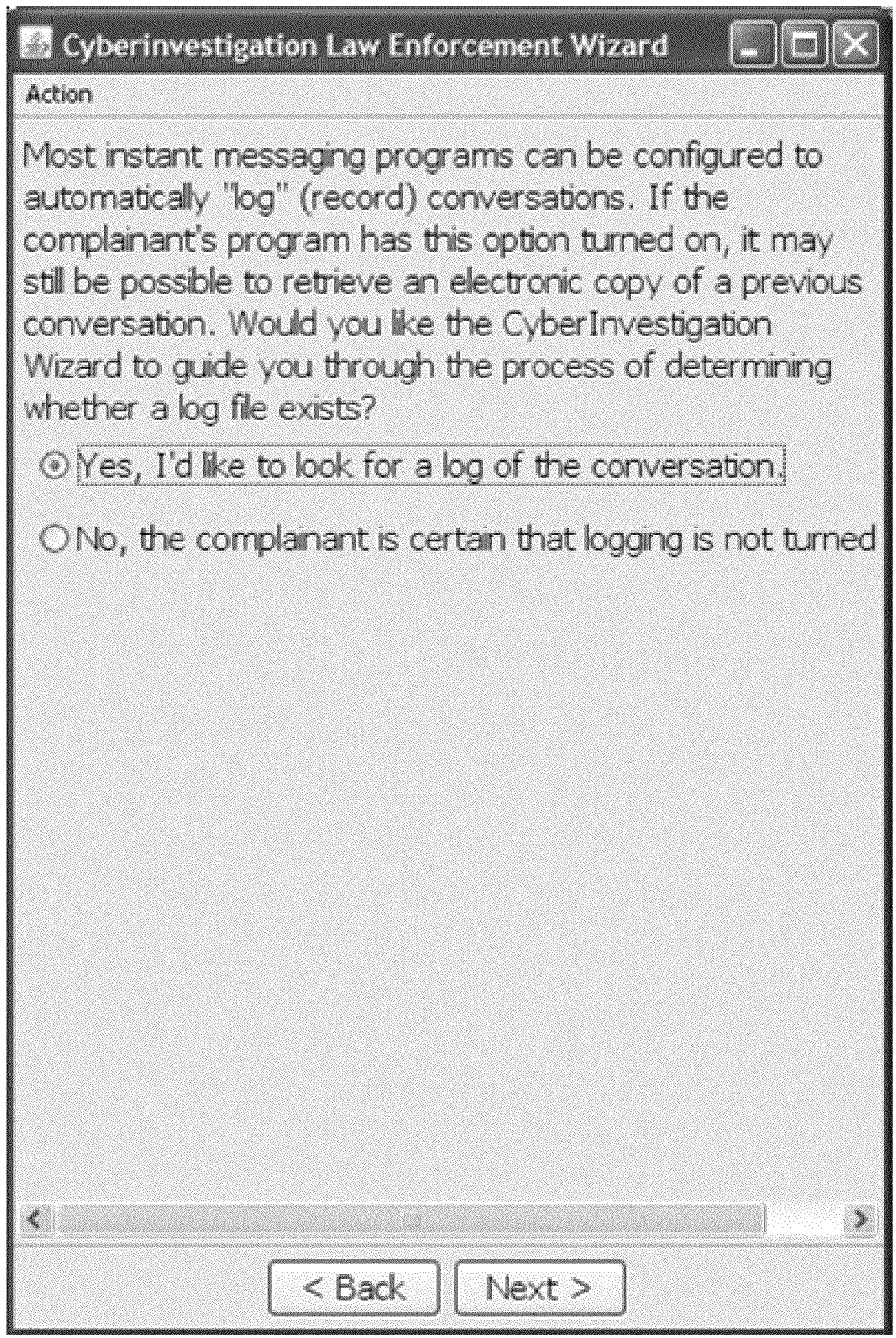
FIGS. 27-31 are a series of screens shots showing an example of how to step the user through capturing Yahoo! archived IM message logs, and if no logging is available, to prompt the user to turn on logging.
Figure 28:
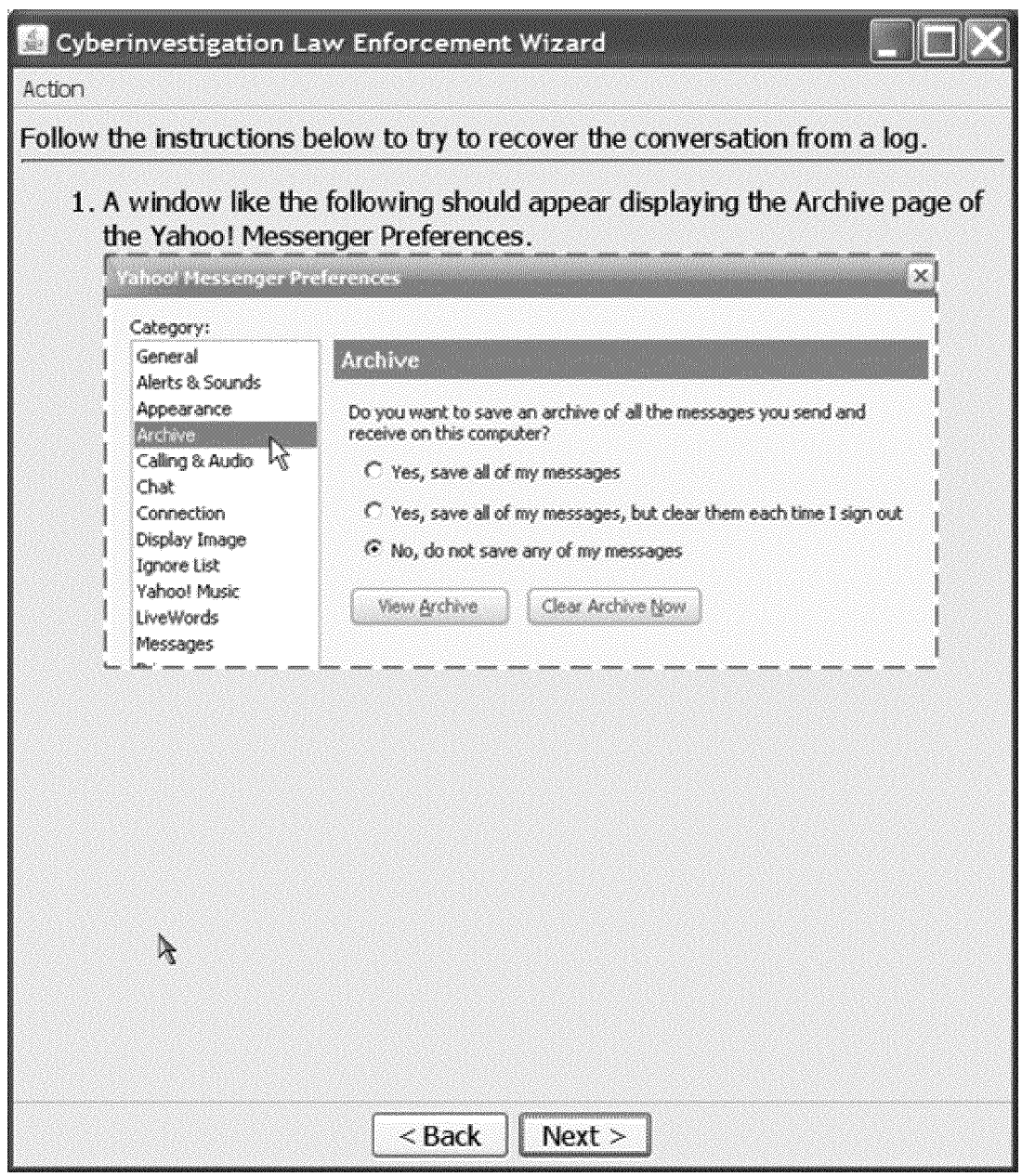
Figure 29:
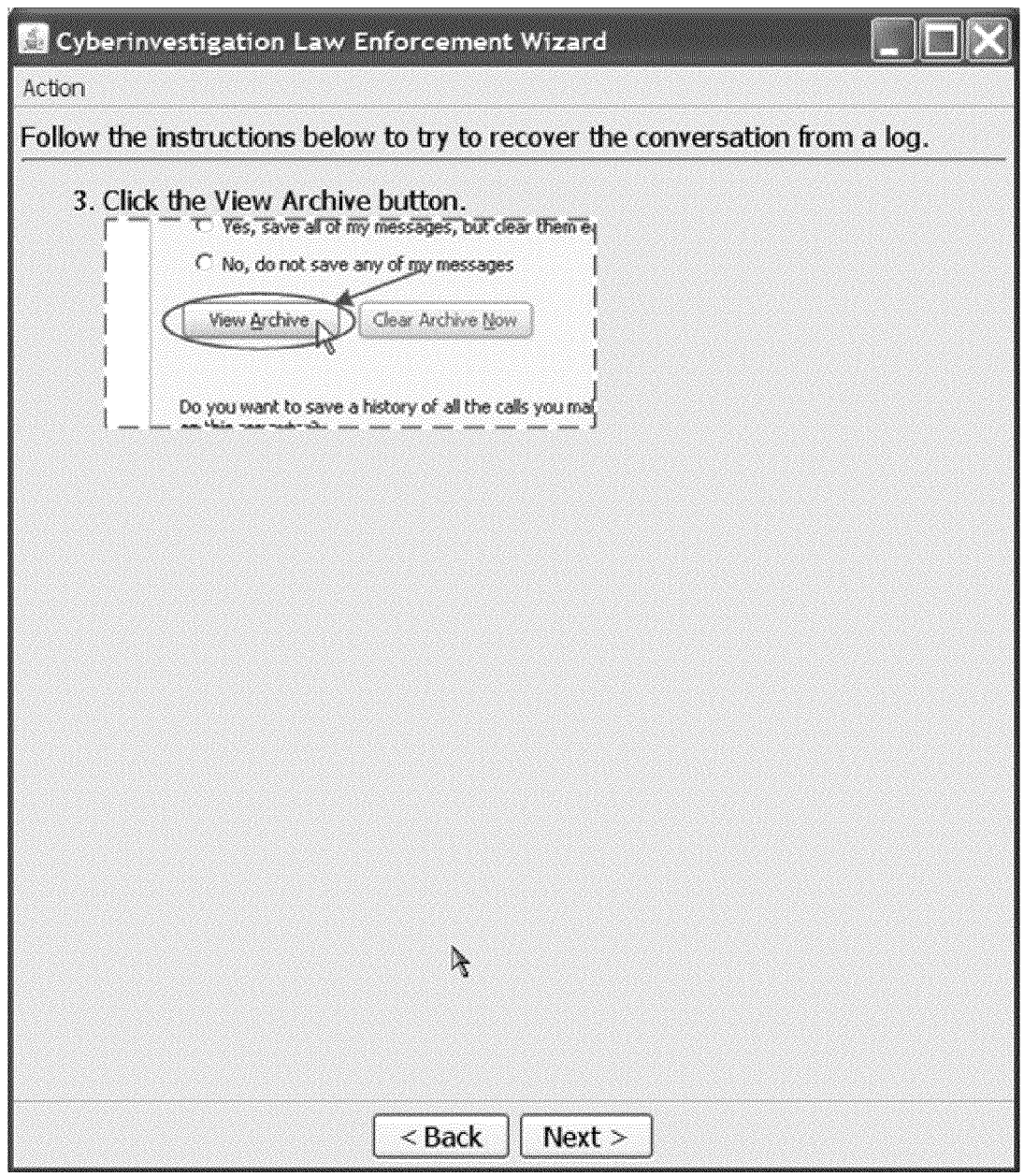
Figure 30:
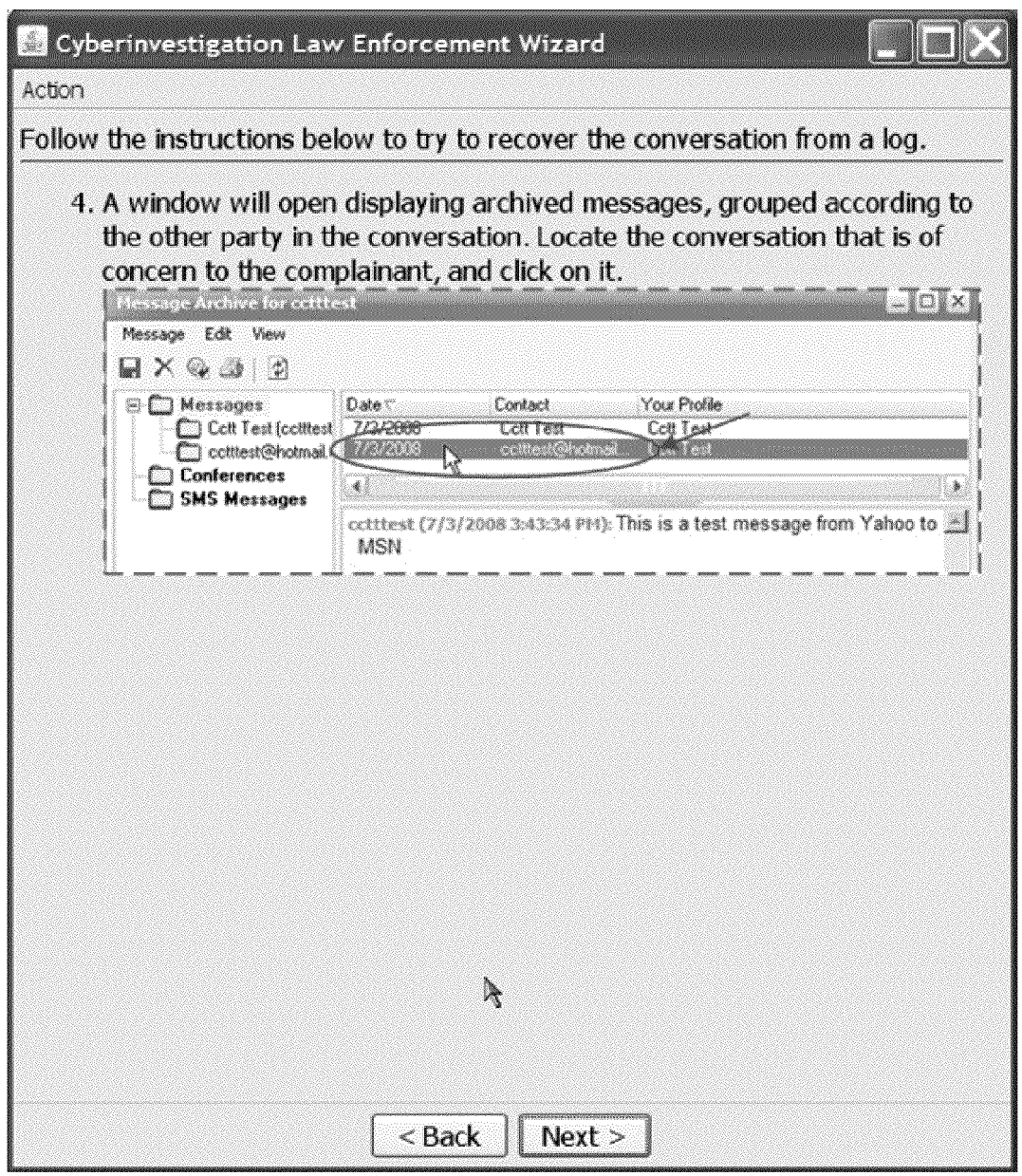
Figure 31:
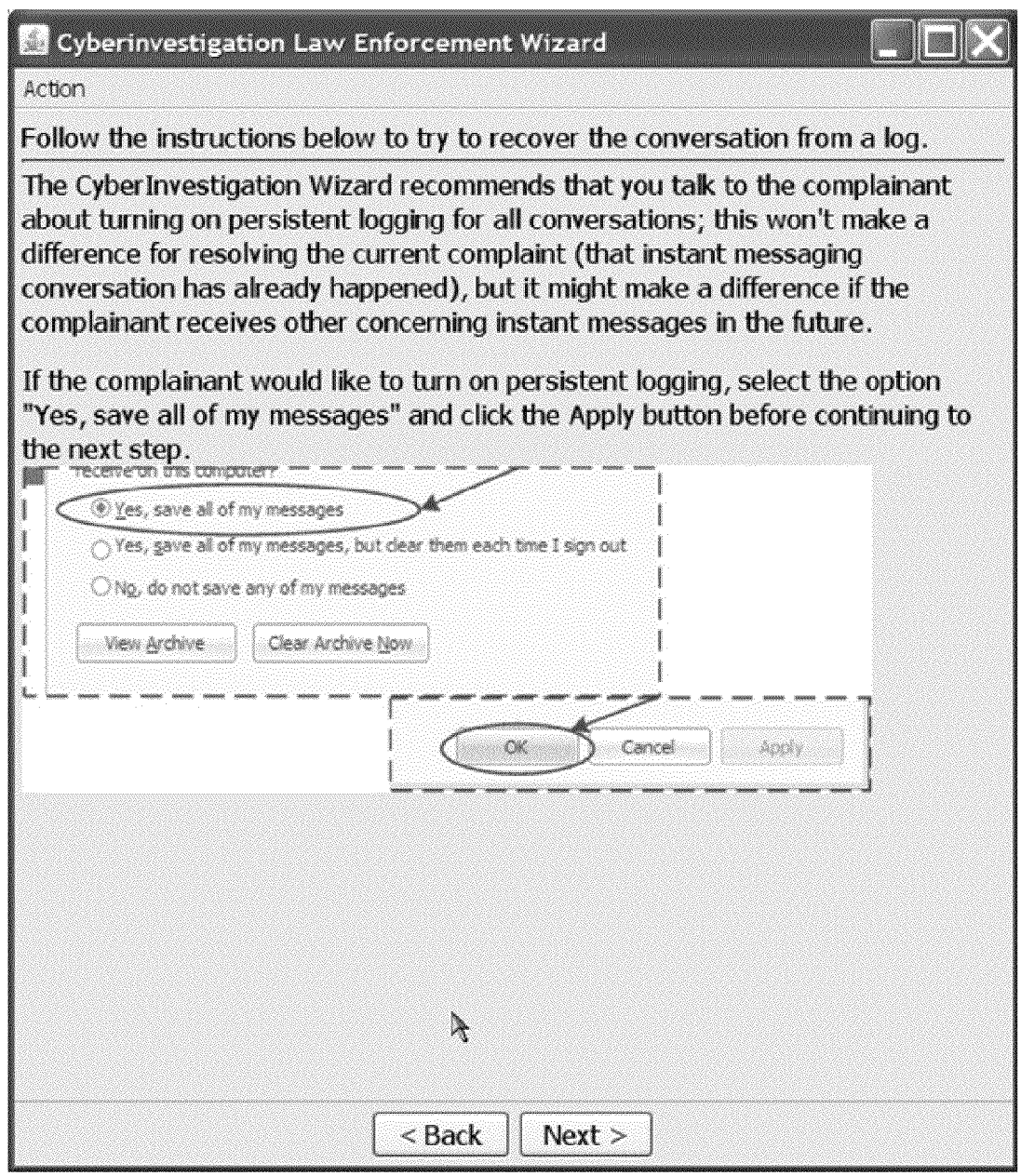

FIGS. 27-31 are a series of screens shots showing an example of how to step the user through capturing Yahoo! archived IM message logs, and if no logging is available, to prompt the user to turn on logging. FIG. 27 roughly corresponds to block 2508 of FIG. 25 in which the computer asks the status of the IM archive setting, but in this case, asks whether the user wants to search the logs for a conversation (IM message). Based on the affirmative response in FIG. 27, FIG. 28 shows an archive screen in which is displayed Yahoo! Messenger Preferences. These preferences include: (1) "Yes, save all of my messages"; (2) "Yes, save all of my message, but clear them each time I sign out"; and (3) "No, do not save any of my messages." In FIG. 29, the user has selected the first option, and selects "View Archive," to view what logs are available. FIG. 30 displays archived messages in the logs, grouped according to the other party in the conversation. The user may locate the conversation that is of concern and click on that IM message. FIG. 31 shows how the user may apply the setting to "save all of my messages" before moving on to the next step.

Figure 32:
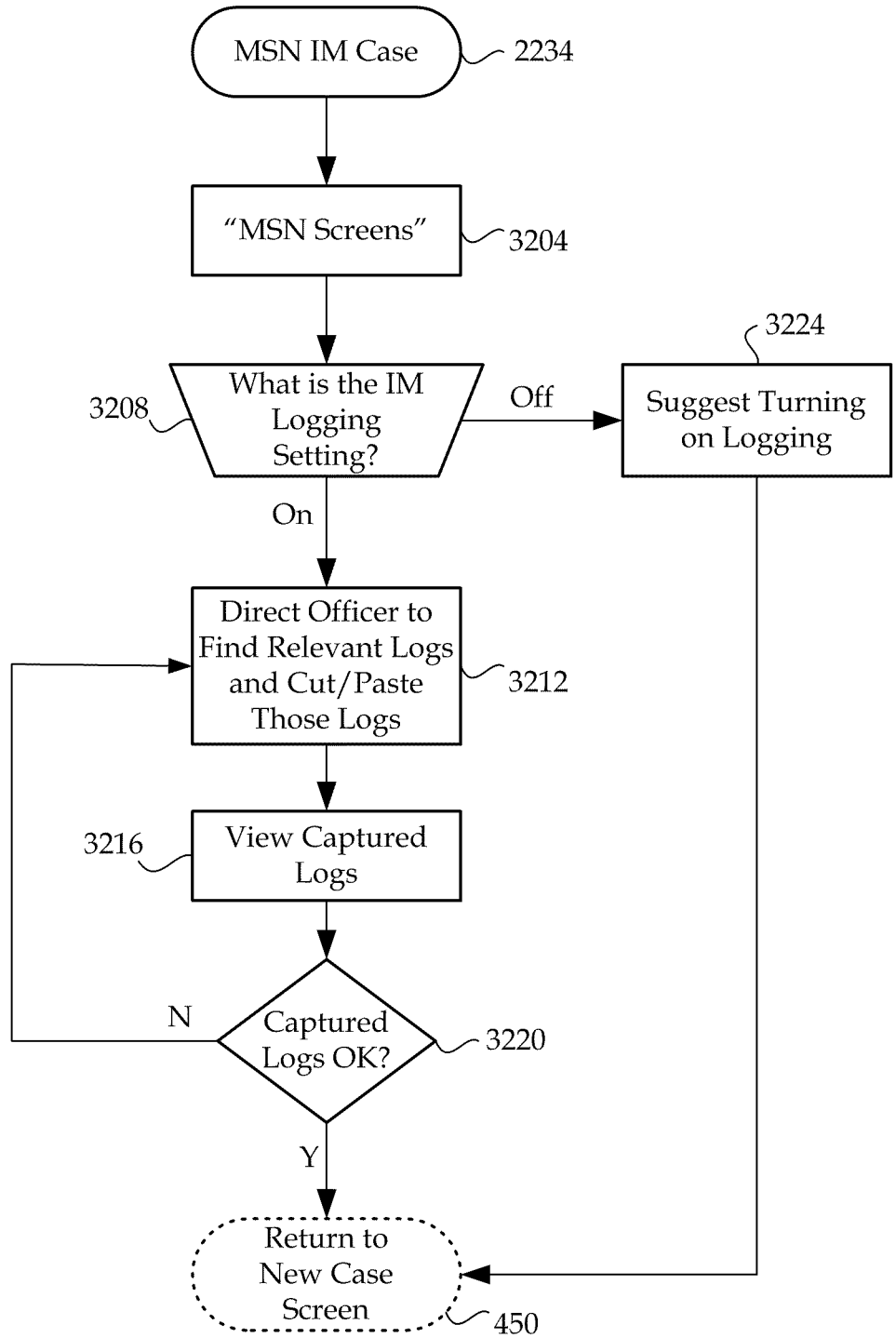
FIG. 32 is a flow chart for leading the user through capturing Microsoft Network (MSN) IM message logs.

FIG. 32 is a flow chart for leading the user through capturing Microsoft Network (MSN) IM message logs. If the user selected a MSN IM case at block 2234, the computer 102 may take the user to a "MSN Screen" window at block 3204 to direct the user through the rest of the MSN IM capture. At block 3208, the computer 102 may ask the user for the current IM logging setting. If the response is that IM logging is set to "on," then the computer 102 may, at block 3212, direct the user to find relevant logs and cut and paste those logs to the USB (or other storage) device, thus capturing the IM logs. When the logs are pasted, they may be pasted into a predetermined text window or screen in the display 224 that is automatically saved to the USB (or other storage) device. At block 3216, the computer 102 may allow the user to view the captured logs in the predetermined window or screen, and at block 3220, ask the user whether the logs were captured correctly. If the logs were correctly captured, the computer may return the user to the new case screen through block 450 (FIG. 4). If the logs were not correctly captured, the computer 102 may send the user back to block 3212 to try capturing the logs again.

If the user responds that the logging setting is set to "off," the computer 102 may suggest to the user at block 3224 to turn on logging, which is explained in more detail later with reference to FIGS. 34-35.

Figure 33:
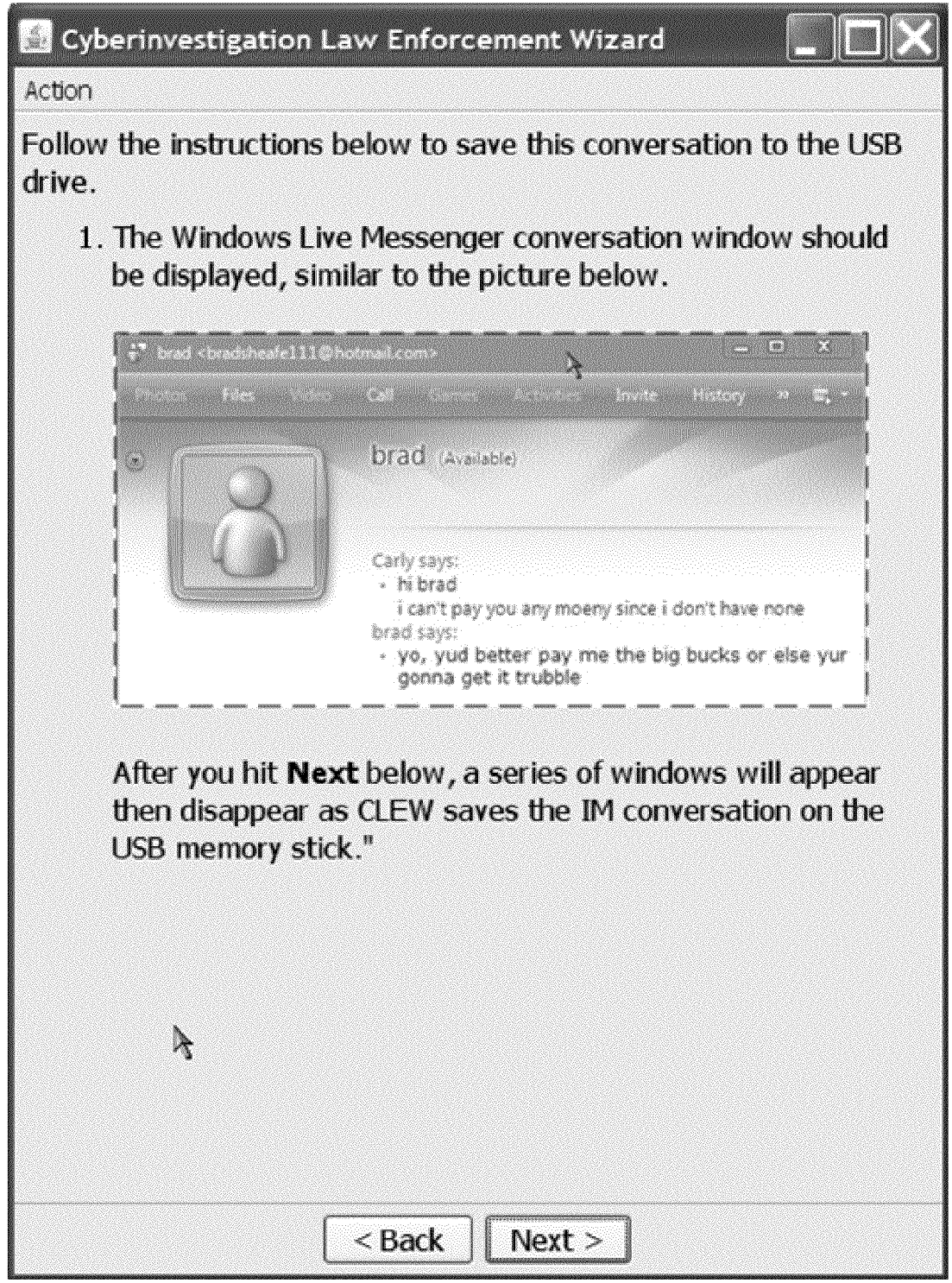
FIGS. 33-36 are a series of screen shots for stepping the user through capturing MSN archived IM message logs and selecting the option of automatically keeping a history of IM conversations.

FIGS. 33-36 are a series of screen shots for stepping the user through capturing MSN archived IM message logs and selecting the option of automatically keeping a history of IM conversations. In FIG. 33, the computer 102 through the CLEW prompts the user to capture a currently-displayed IM conversation which is stored at least in volatile memory of the computer 102. The screen shot shows how the computer 102 explains to the user that a series of windows will appear and then disappear as the CLEW saves the IM conversation on the USB (or other storage) device.

Figure 34:
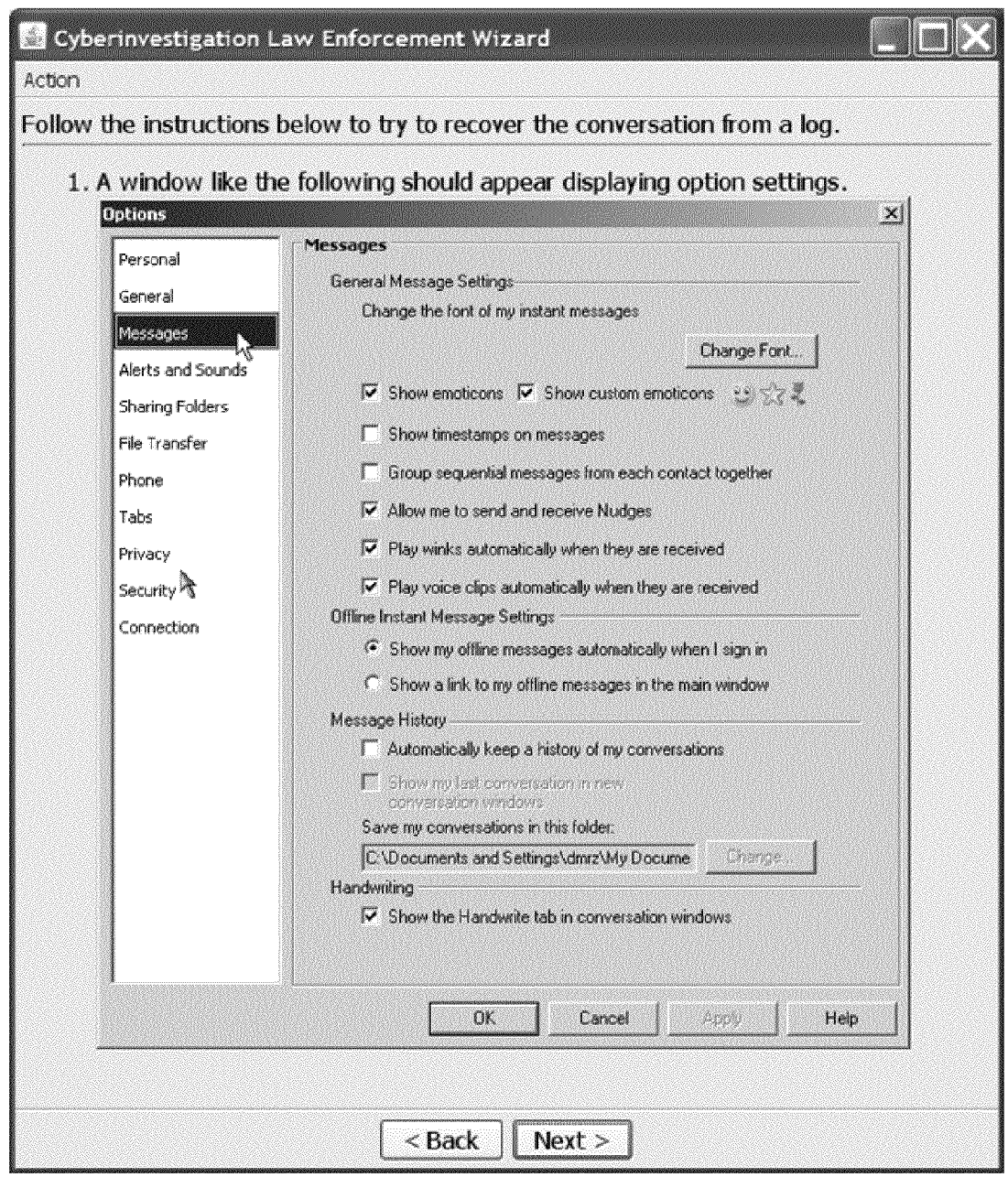
Figure 35:
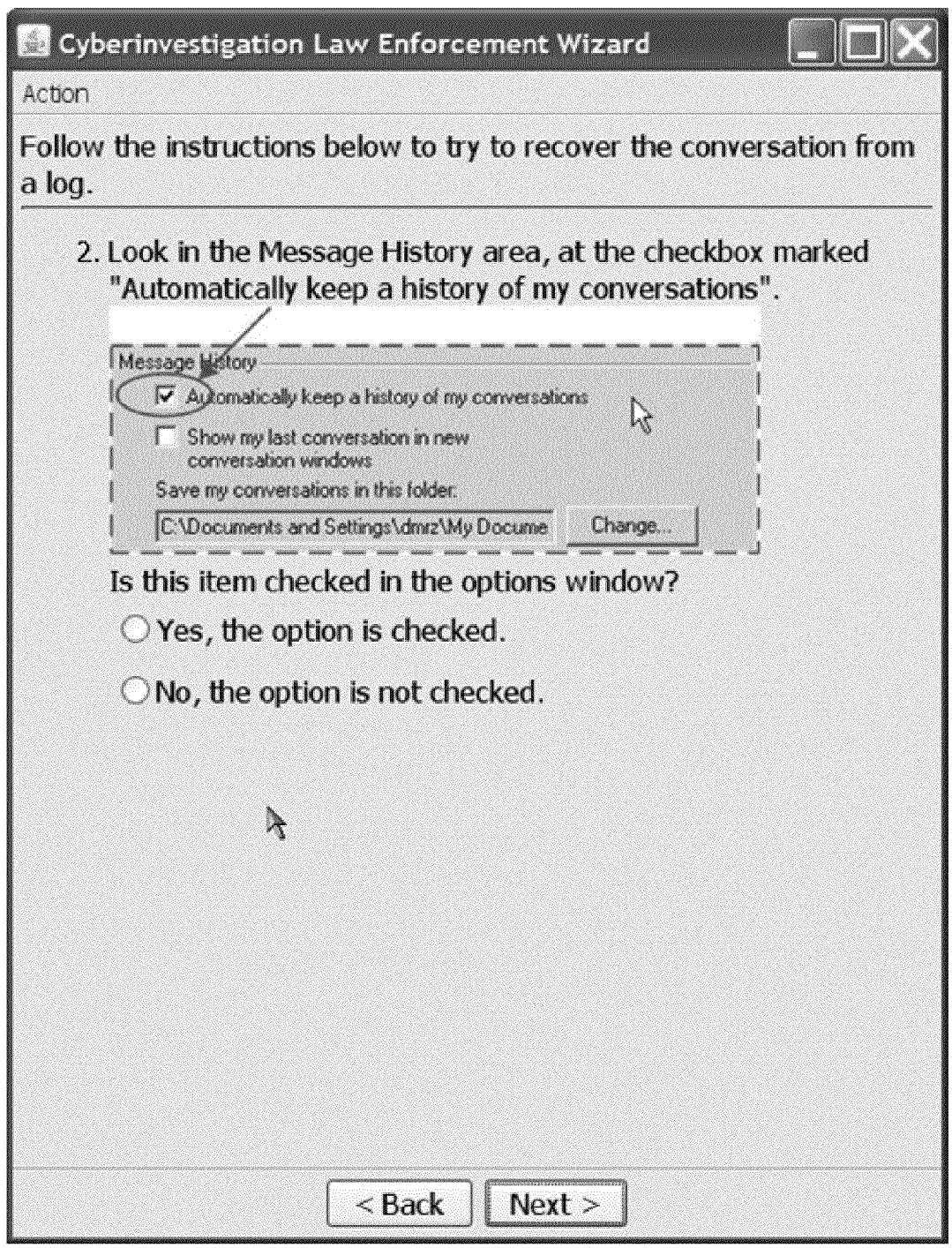
Figure 36:
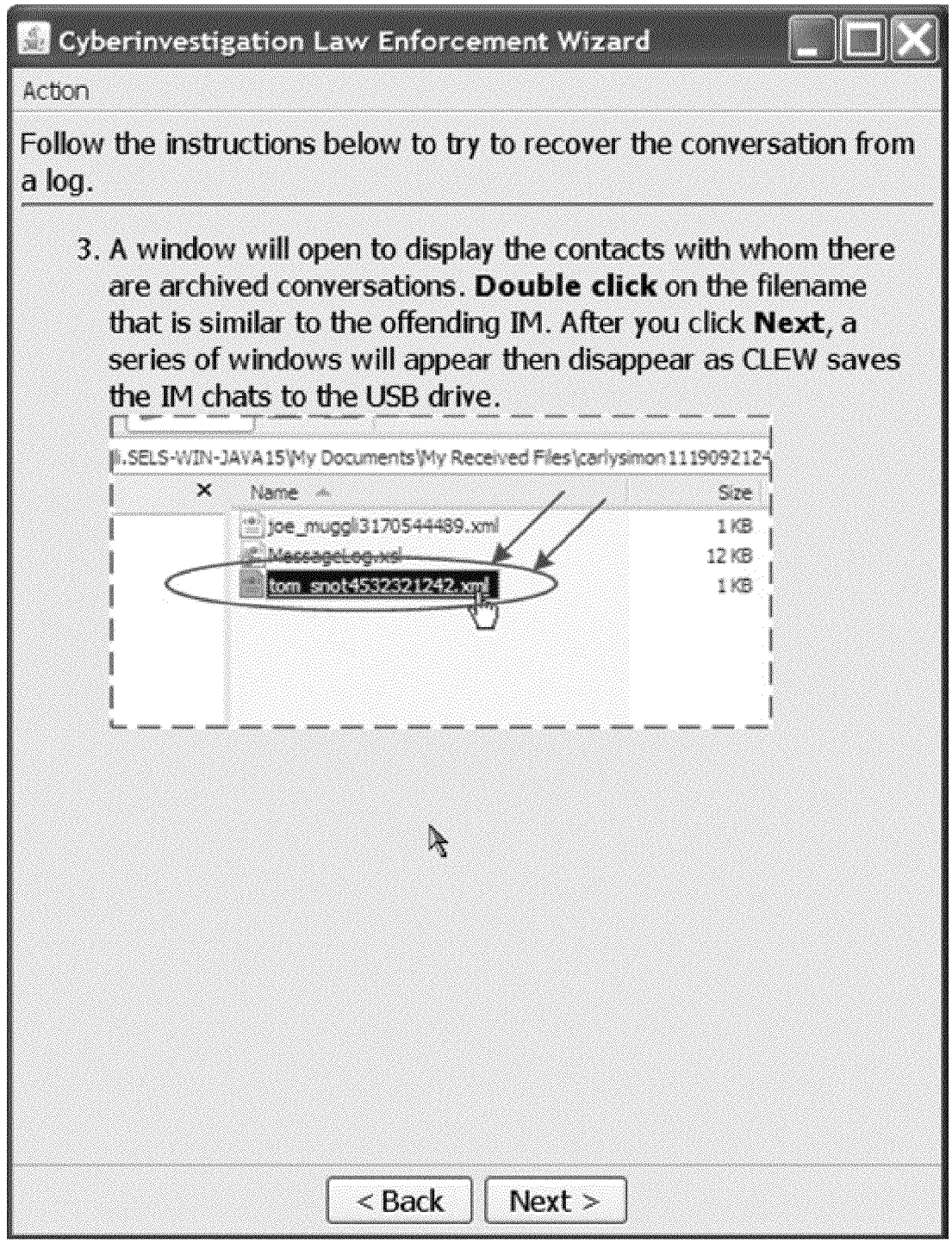

In FIG. 34, a settings screen is displayed, one of which includes Message History and whether the user wants to "Automatically keep a history of my conversations." This screen roughly corresponds to block 3208 of FIG. 32, which asks the user what is the current IM logging setting. In FIG. 35, the option to automatically keep a history of conversations is selected as displayed to the user, to suggest, as at block 3224, that the user turn on logging. In FIG. 36, the action screen provides a list of contacts with whom there are archived conversations. The user is directed to double click the file name that is similar to the offending IM conversation, and then once again warns the user that a series of windows will appear and then disappear as the computer 102 automatically saves the IM chats to the USB (or other storage) device.

Figure 37:
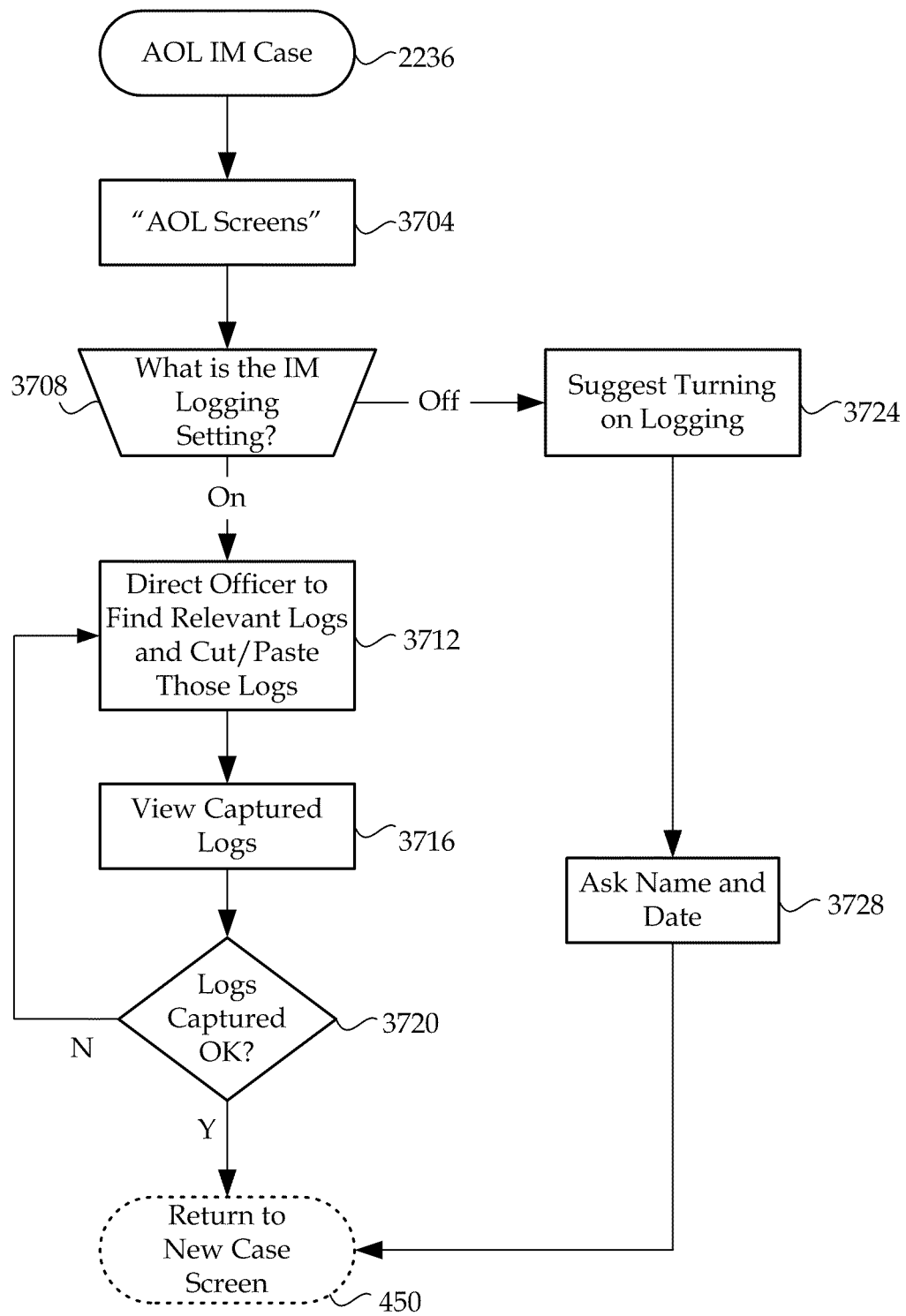
FIG. 37 is a flow chart for leading the user through capturing AOL IM chat logs.

FIG. 37 is a flow chart for leading the user through capturing AOL IM chat logs. If the user selected an AOL IM case at block 2236, the computer 102 may take the user to an "AOL Screen" window at block 3704 to direct the user through the rest of the AOL IM capture. At block 3708, the computer 102 may ask the user for the current IM logging setting. If the response is that IM logging is set to "on," then the computer 102 may, at block 3712, direct the user to find relevant logs and cut and paste those logs to the USB (or other storage) device, thus capturing the IM logs. When the logs are pasted, they may be pasted into a predetermined text window or screen in the display 224 that is automatically saved to the USB (or other storage) device. At block 3716, the computer 102 may allow the user to view the captured logs. At block 3720, the computer 102 may ask the user whether the logs were captured correctly. If the logs were correctly captured, the computer may return the user to the new case screen through block 450 (FIG. 4). The logs were not correctly captured, the computer 102 may return the user to block 3712 to try capturing the logs again.

If the user responds that the logging setting is set to "off," the computer 102 may suggest to the user at block 3724 to turn on logging, which is explained in more detail later with reference to FIGS. 40-41. At block 3728, the computer 102 may also ask the user to input the name and date of the IM message of concern that was likely not saved in the logs.

Figure 38:
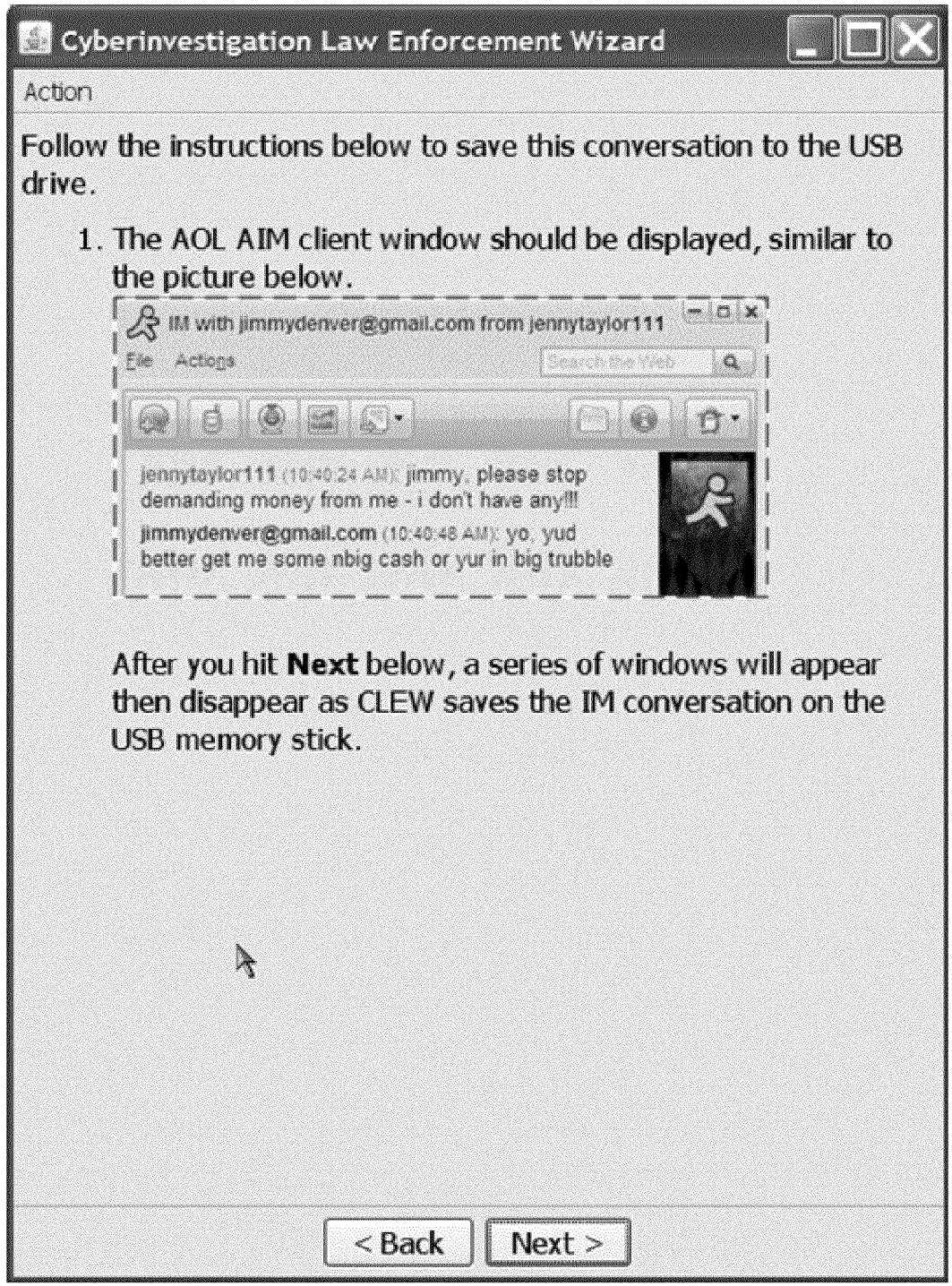
FIG. 38 displays a screen shot of an example AOL AIM client window with a currently-displayed IM message.

FIG. 38 displays a screen shot of an example AOL AIM client window with a currently-displayed IM message. This IM message may be directly saved to the USB (or other storage) device, as is explained and for which instructions are provided in the screen shot of FIG. 38.

Figure 39:
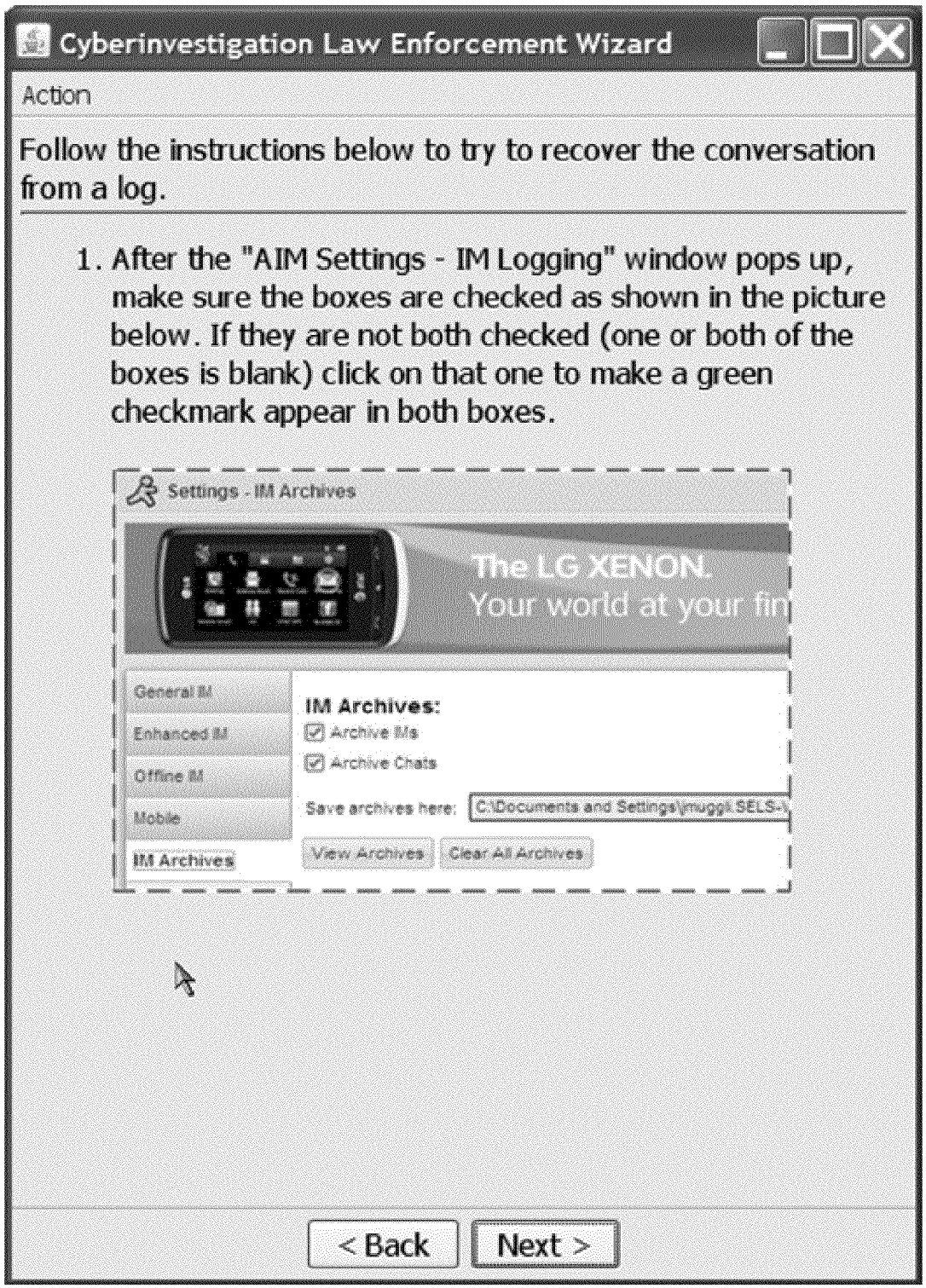
FIGS. 39-41 are a series of screen shots for stepping the user through capturing AOL archived IM message logs and for saving IM logging settings.
Figure 40:
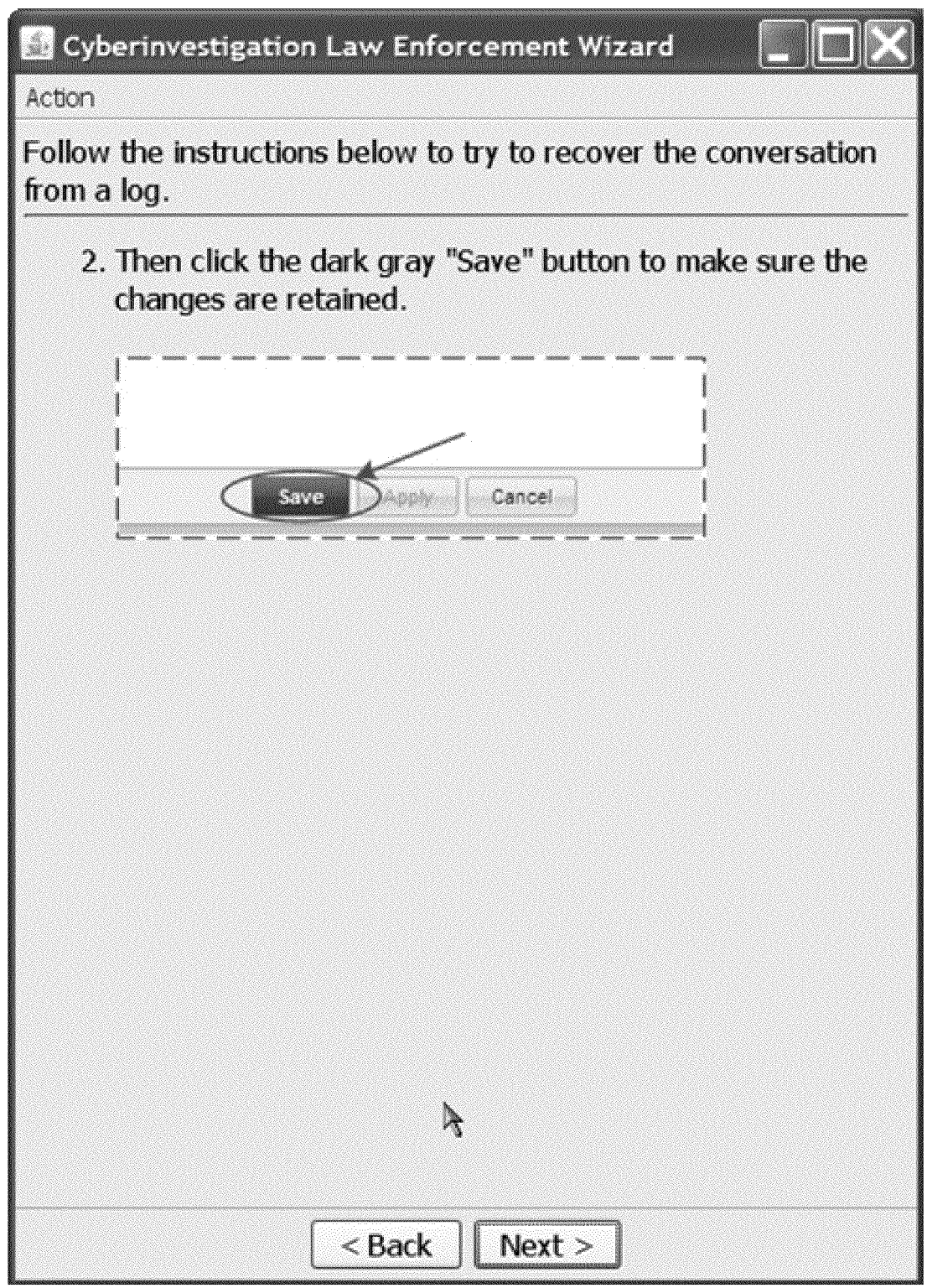
Figure 41:
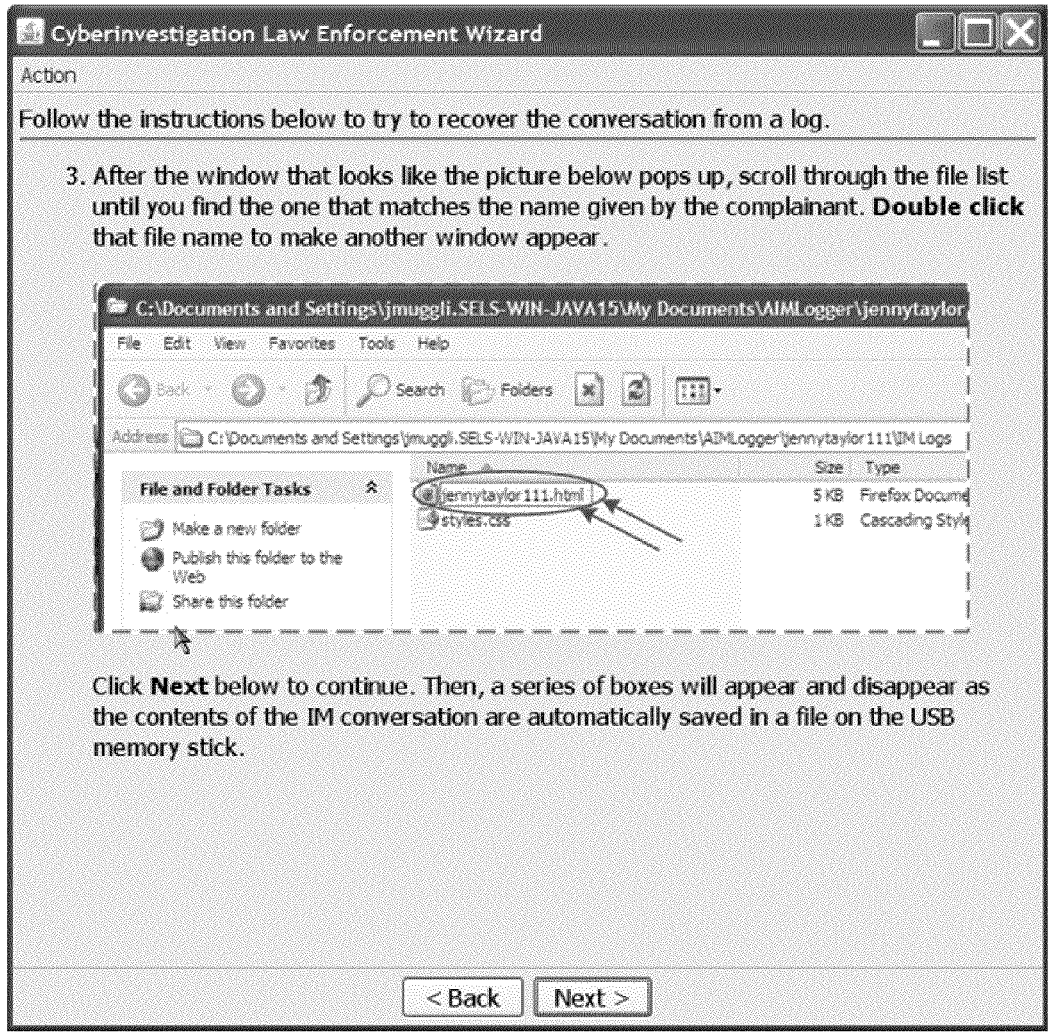

FIGS. 39-41 are a series of screen shots for stepping the user through capturing AOL archived IM message logs. In FIG. 39, the screen shot explains with reference to the "AIM Settings—IM Logging" window that the user should see, and from which the user may ensure IM conversations are being archived. This screen may lead to the screen shot displayed in FIG. 40, which provides for saving the IM logging settings. In FIG. 41, the screen shot displays how the computer 102 may display the pop-up windows including the AOL IM logs. The screen shot includes instructions to find the IM conversation that matches the name of the complainant, and then to double click that file. It also warns the user that a series of boxes may appear and disappear as the contents of the IM conversation(s) are automatically saved to the USB (or other storage) device.

Figure 42:
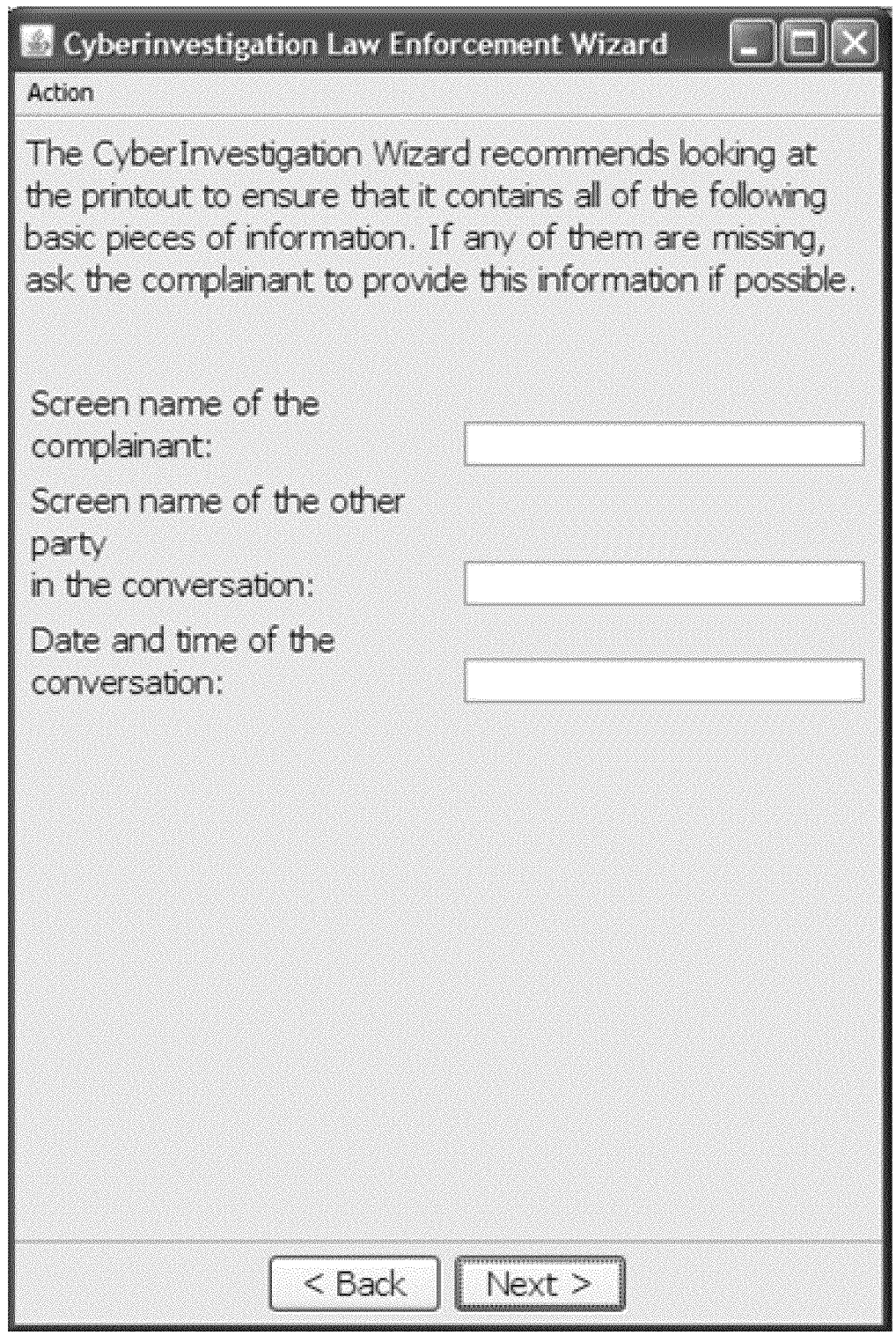
FIG. 42 is a screen shot of an information screen that may follow any attempt to retrieve and save an IM conversation, eliciting potentially missing information.

FIG. 42 is a screen shot of an information screen that may follow any attempt to retrieve and save an IM conversation, eliciting potentially missing information. If any of the information shown in FIG. 42 is missing—including the screen name of the complainant, the screen name of the other party, the date and time of the conversation—then the computer 102 will prompt the user to enter the missing information. This screen may follow any of the wizards subsections above after an IM conversation is saved, to make sure the user has a chance to manually insert such missing information.

Figure 43:
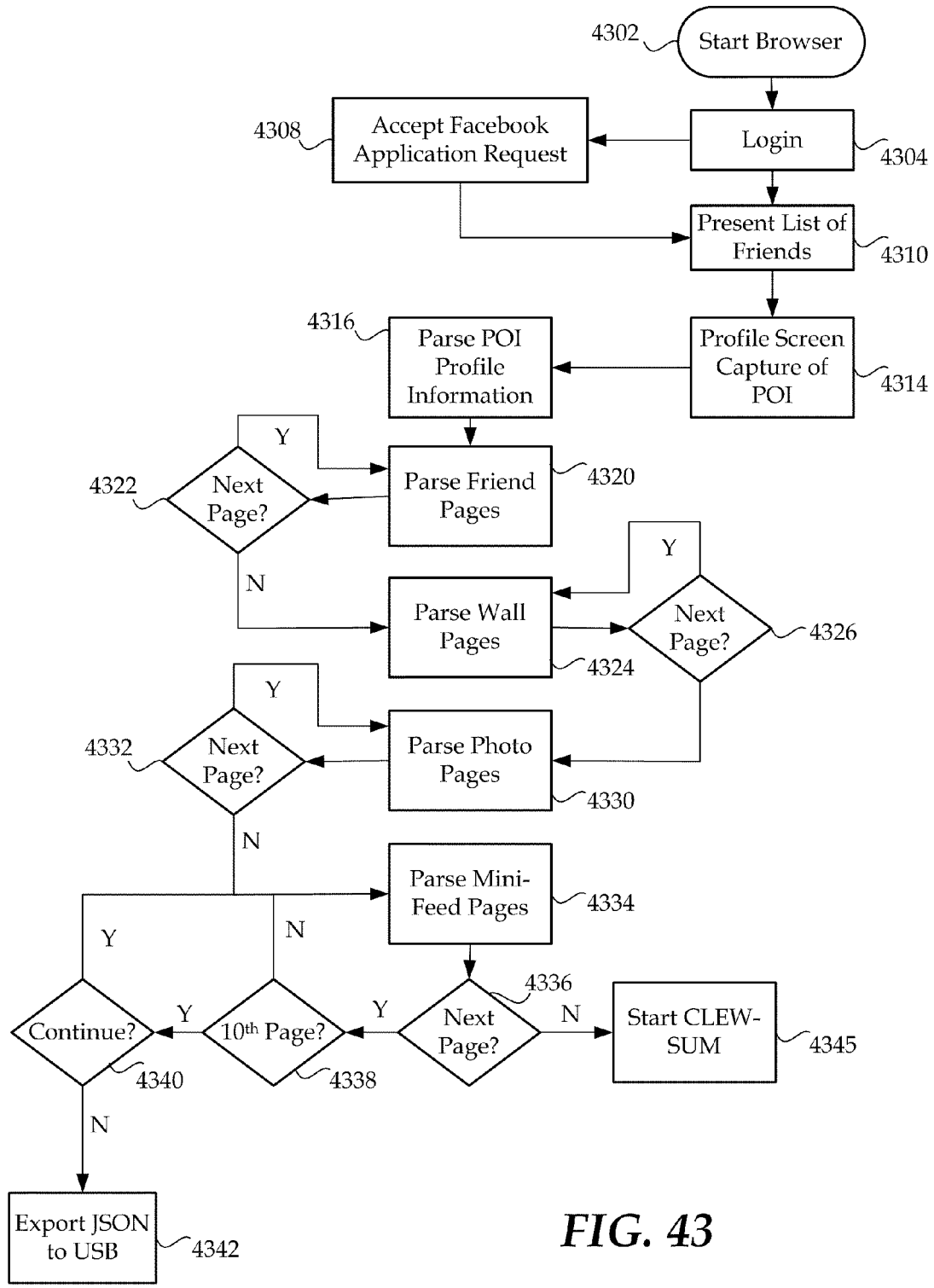
FIG. 43 is a flow chart for leading the user through capturing Facebook data related to the POI based on selecting Facebook in FIGS. 3 and 7.
Figure 45:
FIG. 45 is a screen shot of an exemplary Facebook login page.

FIG. 43 is a flow chart for leading the user through capturing Facebook data related to the POI based on selecting Facebook in FIGS. 3 and 7. After the user selects the capture Facebook data option at block 326 of FIG. 3, the computer 102 may execute the steps of FIG. 43 through the CLEW. At block 4302, the computer 102 will launch the imbedded CLEW browser 4302. At block 4304, the computer 102 may log into Facebook by, at block 4308, accepting a Facebook application request, if necessary, so that the CLEW Facebook application may be authorized to access the Facebook account data of the user. FIG. 45 is a screen shot of an exemplary Facebook login page. The email (or username) and password may be available or a POI may still be logged into Facebook on the target computer 102. These scenarios allow for easy access to the profile and account of the POI. Another option is to access the login URL for the POI, present a cached cookie obtained from the target computer 102, and gain access in this manner. If the cached cookie is valid, any computer will allow the user full access to the account of the POI.

More generally, the computer 102, by executing the CLEW application, may obtain email and social networking (including Facebook) data related to the POI from remote servers through the interne browser as well as from the local computer memory and data storages, as discussed earlier. The computer 102 can capture this data through a browser interface (IE, Firefox, and the like). The following are three scenarios for how the data may be (or fail to be) originally captured by the user.

(1) The username and password of the POI user is known, for instance, a parent may supply the username and password. Armed with the username and password, the account, profile, and associated Facebook and/or email data may be available by simply logging in through a browser, whether on the target computer 102 or another computer.

(2) The POI user was recently logged in and the cookies are still active so the account is currently accessible through the display 224 of the target computer 102, and the data may be pulled directly off the target computer 102 by accessing a remote server, such as the social networking server 114 (e.g., Facebook). The cookies may be stored in memory of the computer 102 in relation to the email client or Facebook website. The remote server may also be an email server.

(3) If no cookies are found, the session is not active, and the username and password is unknown, but the username and password of a friend of the POI (such as a parent) is known, then the computer 102 can access a large portion of the POI's Facebook data through the account of the friend. Other legal means may have to be pursued at a later date such as serving a subpoena on a social networking or email provider. In the case of Facebook, however, the LEFR on the target computer 102, or on another computer, may access the profile, wall, and other Facebook data through an account of a friend or family member.

With further reference to FIG. 43, the computer 102 may, at block 4310, present a list of friends of the person of interest (POI). At block 4314, the computer 102 may capture the profile screen of the POI. At block 4316, the computer 102 may parse the POI profile information as described in more detail with reference to FIG. 44.

At block 4320, the computer 102 may parse the friend pages, and at block 4322, continue to parse additional friend pages for as long as they are available. At block 4324, the computer 102 may parse wall pages (or any other data items within pages of a social networking website), and at block 4326, continue to parse wall pages (or other data items) for as long as they are available. At block 4334, the computer 102 may parse photo pages, and at block 4332, continue to parse photo pages for as long as they are available.

At block 4334, the computer 102 may parse mini-feed pages, and at block 4336, determine whether there are additional mini-feed pages to be parsed. If the response to block 4336 is yes, then the computer 102 may determine whether the tenth page has yet been parsed. If the tenth mini-feed page has not been parsed, the computer 102 may continue doing so at block 4334 until the tenth page has been parsed. The computer 102 may then ask the user whether the user wants to continue parsing mini-feed pages. If yes, then the computer 102 may return to block 4334 and continue parsing mini-feed pages. If no, then the computer 102 may export the JavaScript Object Notation (JSON) data from Facebook to be saved in the USB (or other data storage) device. Furthermore, when there are no more mini-feed pages to be parsed, at block 4345, the computer 102 may start the summary program (CLEW-SUM) discussed earlier. The CLEW-SUM may present reports and/or other graphs or screens that summarize the collected data, making it easier for the user to analyze the data and to make an action plan integrating the data in an effort to capture the POI or other perpetrator.

The data stored in Facebook is generally stored in the JSON format, which provides the highest level of information within the data. If a Facebook API is used, the JSON may be scraped instead of just HTML code. From time to time, Facebook changes their interface, which means that the API 222 and other software executed to scrape the Facebook data has to also be updated. Any target computer 102 may be adapted through the execution of an updated CLEW to capture Facebook data, including HTML and JSON scrapes, screen captures, client API, and Facebook graph API.

Figure 44:
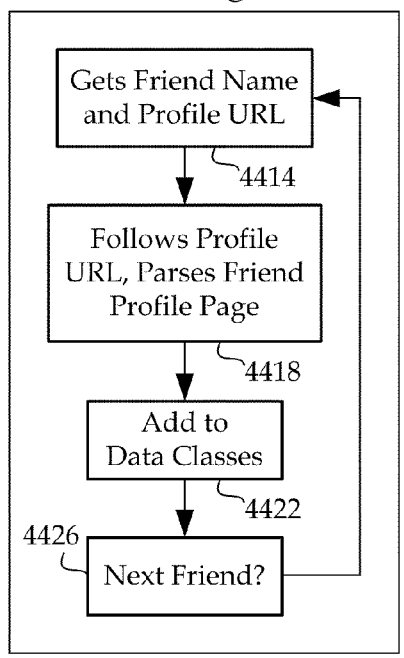
FIG. 44 is a series of flow charts with more detail for capturing Facebook data, including that related to friends, posted photos, wall posts, and mini-feed stories.
Figure 44:
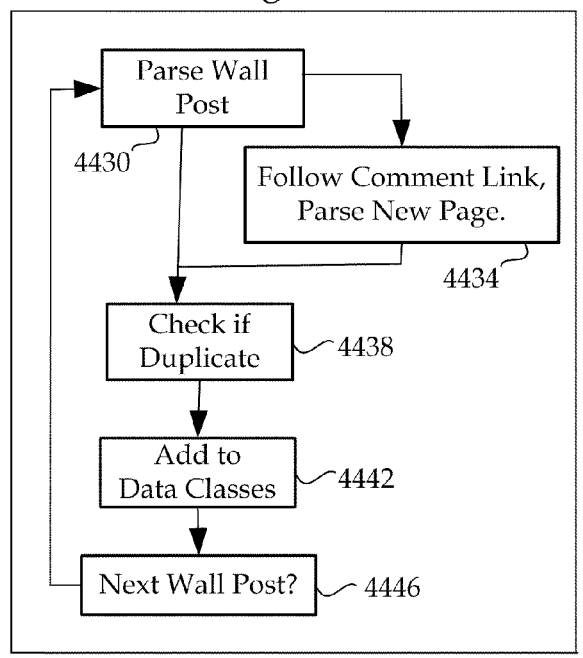
Figure 44:
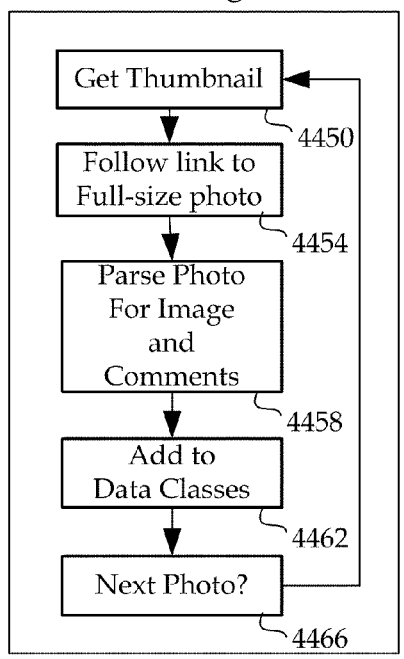
Figure 44:
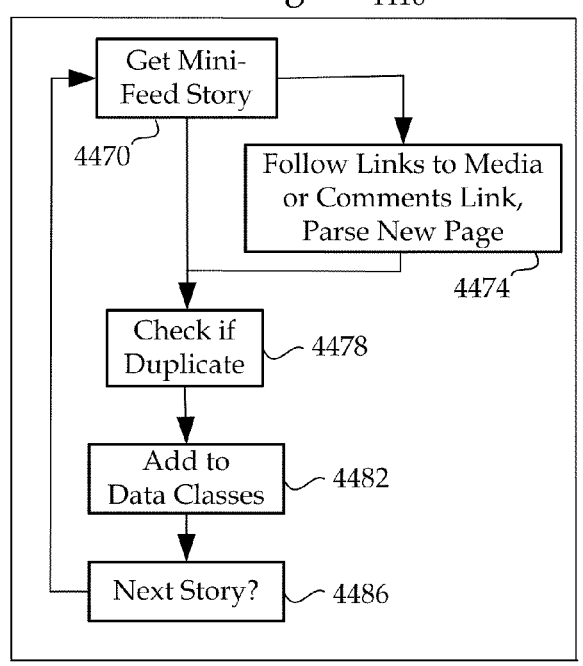
Figure 46:
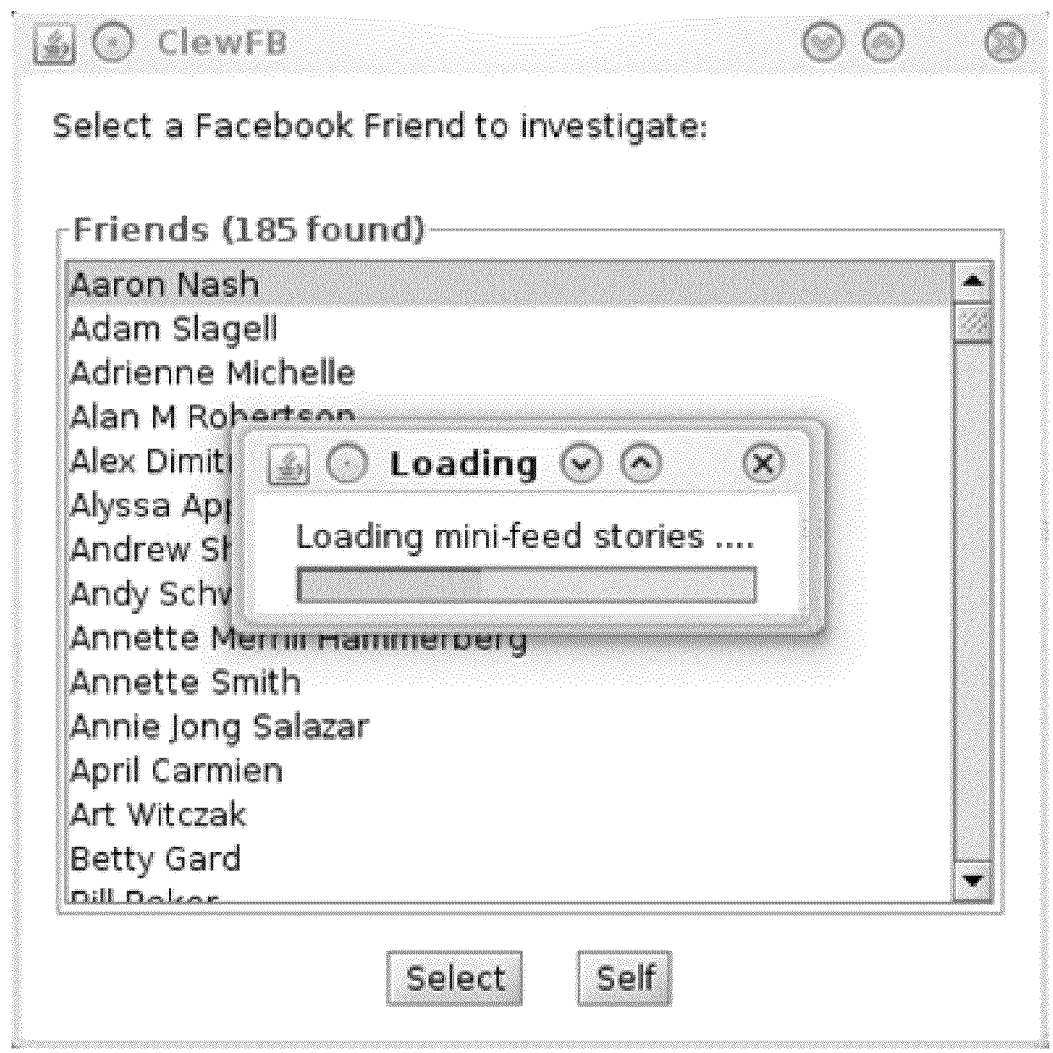
FIG. 46 is a screen shot of an exemplary Facebook friend page.

FIG. 44 is a series of flow charts with more detail for capturing Facebook data, including friend profiles, wall posts, photos, and mini-feeds available, respectively, at a friend page 4402, a wall page 4404, a photos page 4408, and a mini-feed page 4410. Facebook data may be captured from the friend page 4402 through the following non-exhaustive steps. At block 4414, the computer 102 may get a friend name and a corresponding profile URL, which may include the user pointing and clicking on the same. The profile URL may be obtained from a list of friends of the POI available to those having access to the account of the POI. At block 4418, the computer 102 may follow the profile URL, and parse the profile page of the friend. At block 4422, the computer 102 may add the Facebook data to data on the USB (or other storage) device classified as friend data for the POI. At block 4426, the computer 102 may ask the user whether the user wants to capture another friend. FIG. 46 is a screen shot of an exemplary Facebook friend page. Note that the screen shot shows how the computer 102 prompts the user to select a friend to investigate.

Facebook data may be captured from the wall page 4404 through the following non-exhaustive steps. At block 4430, the computer 102 may parse a wall post by, at block 4434, following a comment link and parsing the new page on which the users lands. At block 4438, the computer 102 may determine if the wall post is a duplicate. If the wall post is not a duplicate, at block 4442, the computer 102 may save the wall post to data on the USB (or other storage) device classified as wall posts for the POI. At block 4446, the computer 102 may ask the user whether the user wants to capture another wall post.

Facebook data may be captured from the photos page 4408 through the following non-exhaustive steps. At block 4450, the computer 102 may get a thumbnail of a photo. At block 4454, the computer may follow a link associated with the thumbnail to the full-size photo. At block 4458, the computer 102 may parse the photo for its image and other contents, which may include user informational tags. At block 4462, the computer 4462 may add the photo to data on the USB (or other storage) device classified as photos for the POI. At block 4466, the computer 102 may ask the user whether the user wants to capture another photo.

Facebook data may be captured from the mini-feed page 4410 through the following non-exhaustive steps. At block 4470, the computer 102 may get a mini-feed story, and at block 4474, follow links to media or follow a comment link to parse a new page with the mini-feed story. At block 4478, the computer 102 may check if the mini-feed story is a duplicate. If the mini-feed story is not a duplicate, at block 4482, the computer 102 may add the mini-feed story to data on the USB (or other storage) device classified as mini-feed stories for the POI. At block 4486, the computer 102 may ask the user whether the user wants to capture another mini-feed story.

Figure 47:
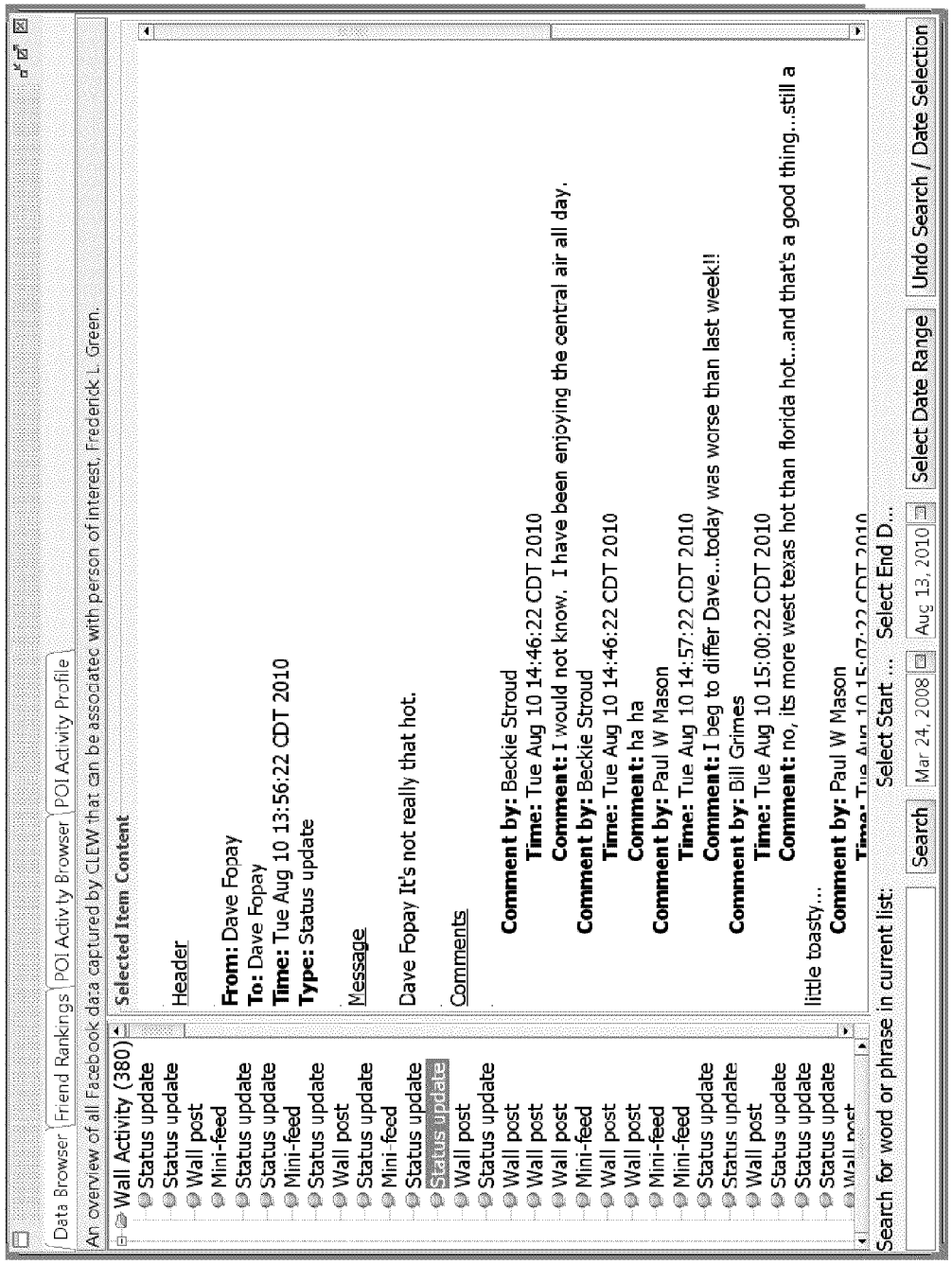
FIG. 47 is a screen shot of an exemplary data browser, showing the data captured on the POI through Facebook.

FIG. 47 is a screen shot of an exemplary data browser, showing the data captured on the POI through Facebook. The data browser allows for data parsed out of Facebook to be saved by class. In FIG. 47, the mini-feed pages class is highlighted in the "Data List" on the left. On the right is displayed the "Data Content." In this case, information about a selected wall post is displayed, including the to/from information, the date, time, and the message, any attached photos, and links that may be followed.

Figure 48:
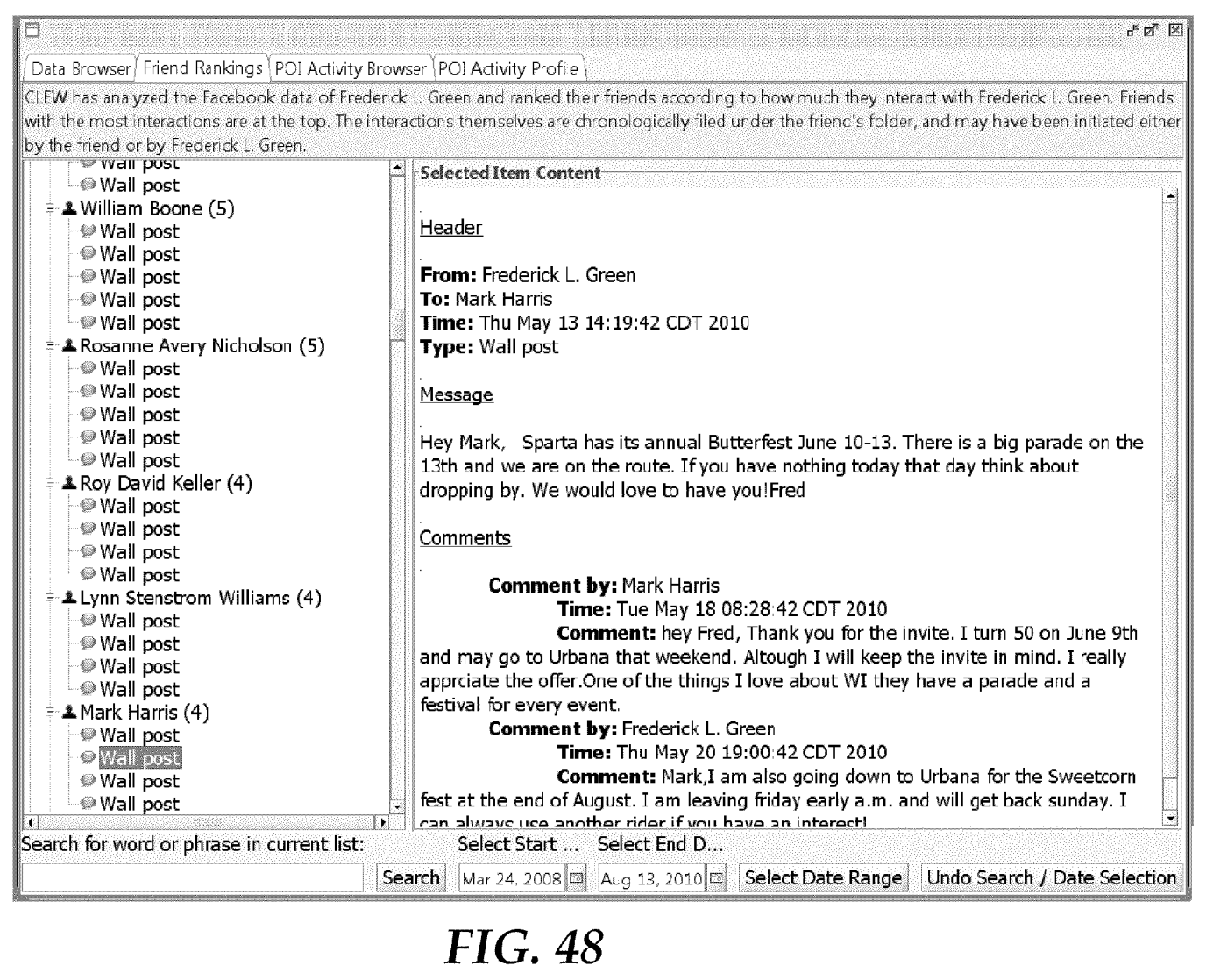

FIG. 48 is a screen of the exemplary data browser of FIG. 48, showing a list of friends ranked according to a level of interaction with the POI. After the Facebook data has been analyzed, the computer 102 may generate a report page such as shown in FIG. 48. On the left is a "Friend List" ranked according to level of interaction, with friends having less interaction being listed lower on the page. On the right, friend and interaction content may be displayed based on a selected piece of data, in this case a mini-feed posted by Walter Lundahl.

Figure 49:
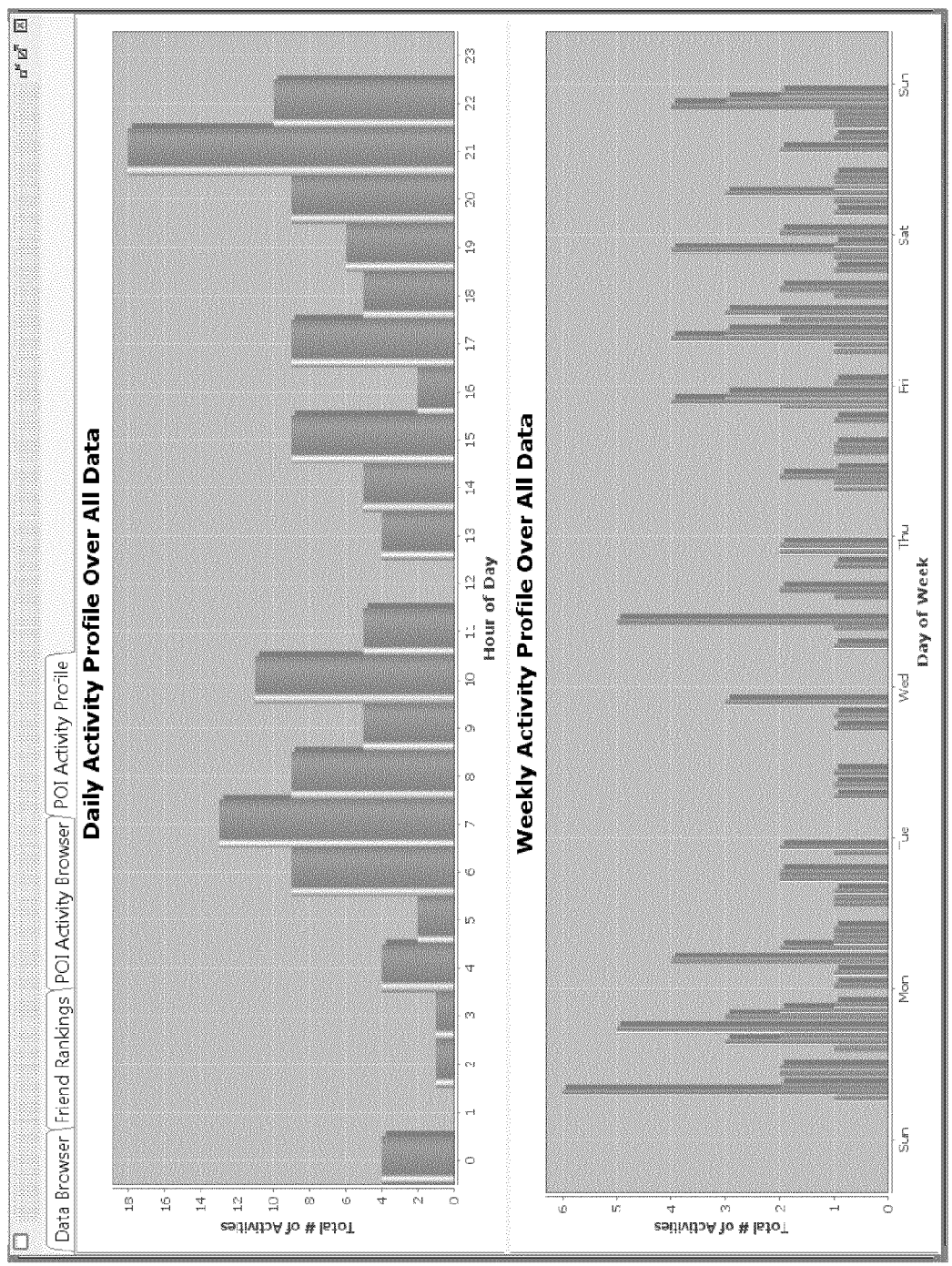
FIG. 49 is a screen shot of the exemplary data browser of FIG. 48, showing data graphs depicting a level of Facebook activity by the POI over days of the week and hours within the day.

FIG. 49 is a screen shot of the exemplary data browser of FIG. 48, showing data graphs depicting a level of Facebook activity by the POI over days of the week and hours within the day. The screen shown in FIG. 49 is accessible through the last tab to the right along the top of the data browser of FIGS. 47-48. While not shown in FIG. 49, the screen shot of FIG. 49 may include sub-windows above the data graphs, a left of which may show an activity list chronologically and a right of which may show detail of an activity selected in the left sub-window. The activity content appears in a right sub-window with scrolling capability while the daily and weekly activity profiles show up as bar graphs in the middle and bottom of the screen, respectively. While these are displayed as bar graphs, other graphs such as line graphs may be employed. FIG. 49, accordingly, provides a user-accessible snapshot of the activity for a POI over a period of time. Other periods of time, such as bi-week, month, or year, in lieu of or in addition to the daily and weekly activity profiles.

In summary, the system 100, including the CLEW application, is focused on supporting the non-expert first responder such as LEFR or employer in the capture and easy analysis of information found both on the system being investigated and on the network or Web-based data associated with the person being investigated. Specifically, the system 100 provides functionality, including, but not limited to the: 1) capture of volatile information found in the memory of the system; 2) capture of Web-based data associated with the person being investigated; 3) simple field analysis; 4) update and dissemination solutions; 5) data/evidence management; 5) cross platform support; 6) inexpensive and useable form factor; 7) report generation; and 8) investigator tools.

The CLEW application executed on the target computer targets specific kinds of information, including email headers, instant messaging conversation logs, cookies, Internet history, and web session data on a local computer (such as the target computer 102) or on remote web databases, such as the web storage 116, 126, 136 of the servers 114, 124, 134. The CLEW application thus performs a sort of informational triage, looking first for the most important type of evidence, or evidence most frequently encountered and found to be helpful.

FIGS. 50 through 55 disclose the particulars of the CLEW Investigator's Toolkit (CLEW-IT) capability of the system referred to earlier. CLEW-IT is a data management program for organizing large amounts of the data, which may be categorized into classes, as captured from CLEW in the field and for presenting that data in a user-accessible manner to make it useful for the investigator. Some examples of reports and screen graphs that CLEW-IT generates have already been discussed with reference to FIGS. 47-49, which may also be generated by CLEW in the field for the LEFR to analyze. CLEW-IT may be executed on a computer back at the police station, for instance, the computer operable by an investigator or other officer.

Figure 54:
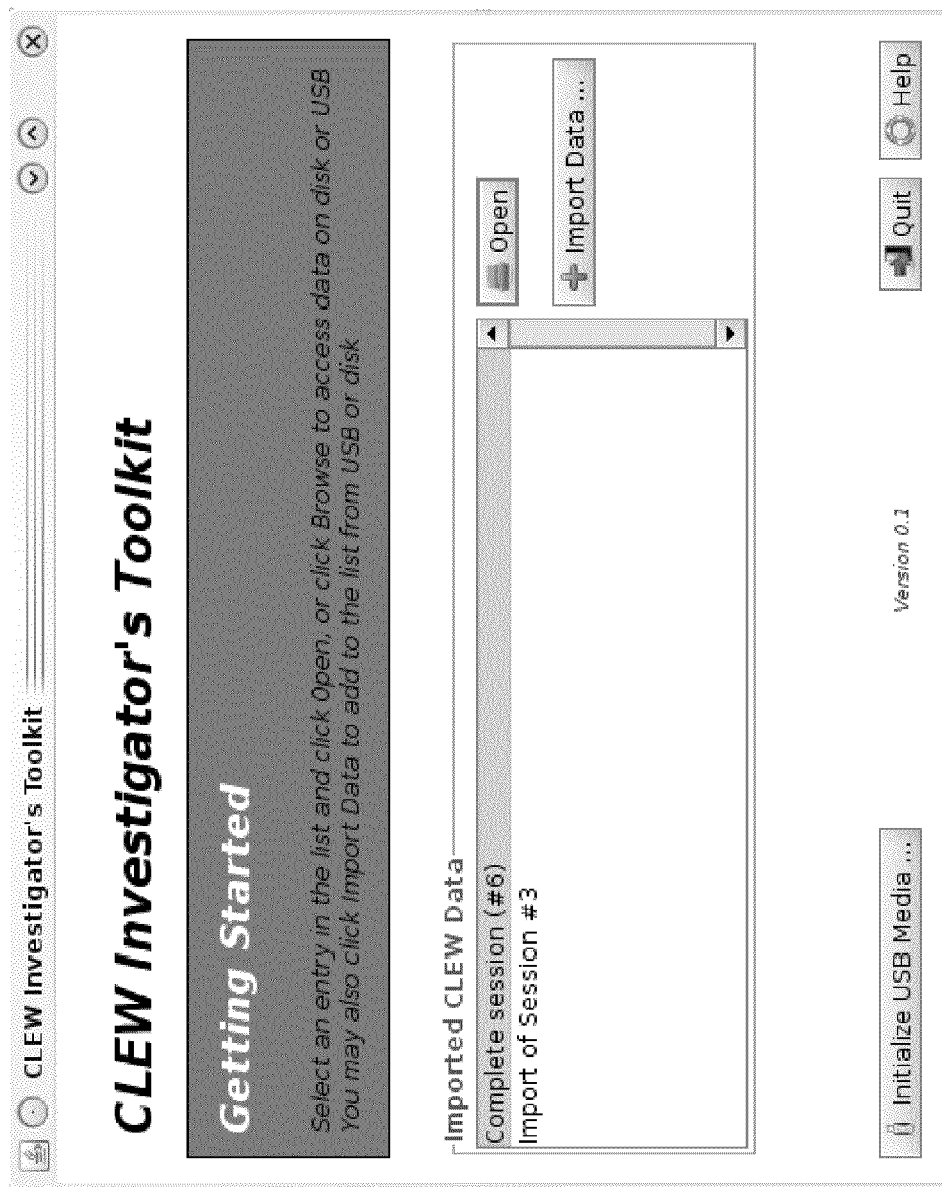
FIG. 54 is a screen shot of an exemplary CLEW-IT session initiation screen.
Figure 55:
FIG. 55 is a screen shot of an exemplary CLEW-IT session data interface screen.

FIG. 54 is a screen shot of an exemplary CLEW-IT session initiation screen. A user may select a complete session or to import data from a USB (or other storage) device, which will be discussed in detail later. FIG. 54 also indicates where a user may select an icon (lower left) to "initialize USB Media," which is discussed with reference to FIG. 50. FIG. 55 is a screen shot of an exemplary CLEW-IT session data interface screen, which allows a user, such as an investigator, to generate summaries of or to access archived data. Such summaries may include reports or screen shots of summarized data covering Facebook categories, email messages, and instant messages (IM), among others discussed herein. The screen displayed in FIG. 55 also shows the basic information for the case, including the officer's (LEFR's) name, badge number, case number, date, time, complainant name, and a suspect name. If another user besides a LEFR is working the CLEW, then some of this information may be left blank or replaced with different information.

Figure 50:
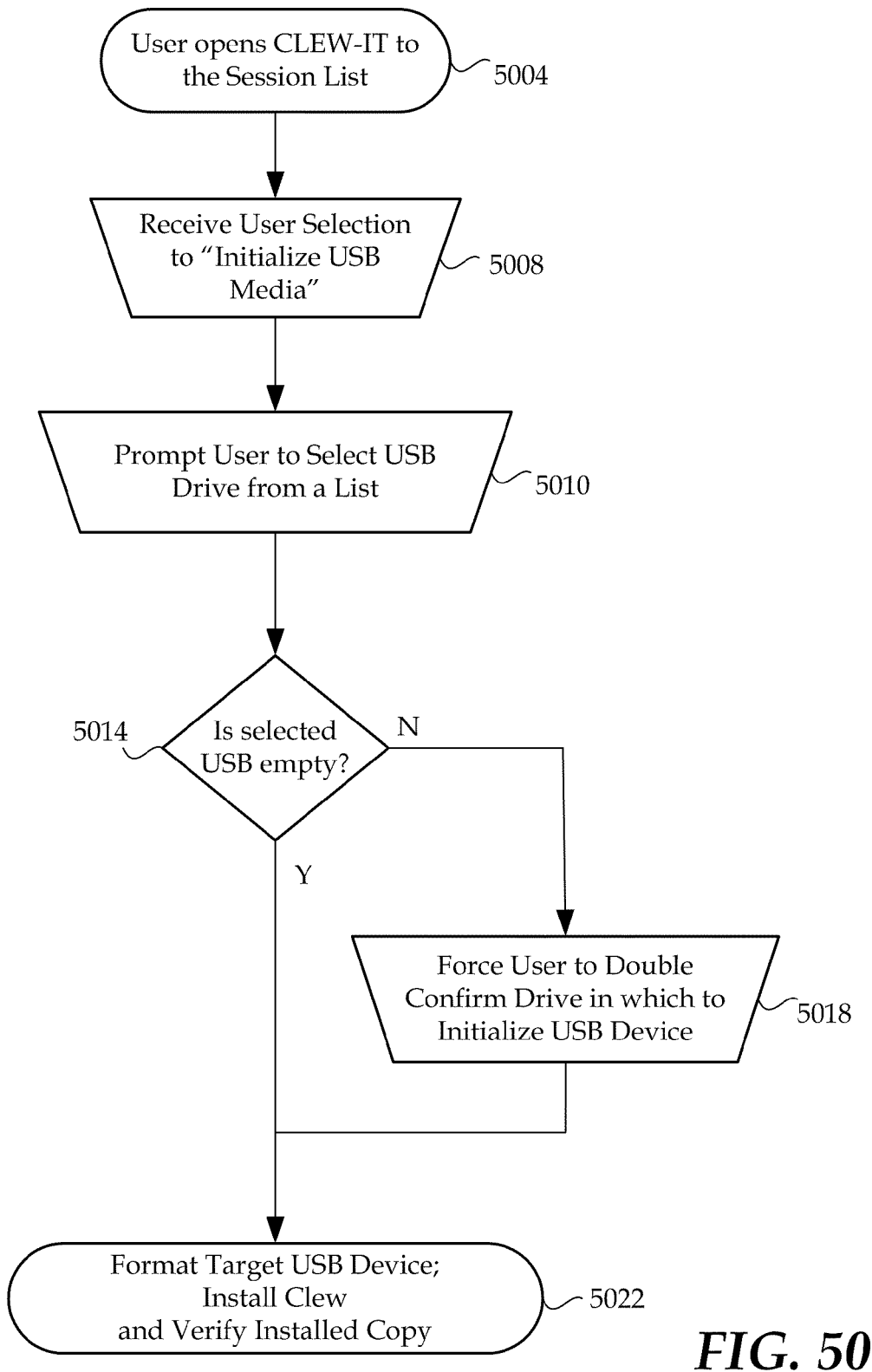
FIG. 50 is a flow chart for initialization of USB media and loading thereon CLEW by a data management application named CLEW Investigator's Toolkit (CLEW-IT), the USB media for use by the user.

FIG. 50 is a flow chart for initialization of USB media and loading thereon CLEW by a computer executing CLEW-IT, the USB media for use by the user. These steps ensure that the USB (or other storage) device to be used by the user will have a valid copy of an executable for CLEW that may be successfully installed and run on the target computer 102. The steps also ensure that CLEW, once installed, may run properly and save data from the target computer 102 in a format that CLEW-IT will recognize. At block 5004, a user such as an investigator may open CLEW-IT on a computer until coming to a session list. At block 5008, the computer may receive a user selection to "Initialize USB Media." At block 5010, the computer may prompt the user to select the USB drive from a list. At block 5014, the computer may ask whether the USB device is empty or determine by itself that it is free of data. If the USB device is not empty, at block 5018, the computer may force the user to confirm a second time that the drive selected is the USB drive. At block 5022, the computer running CLEW-IT may format the target USB device, install CLEW on the USB device, and verify the installed copy.

Figure 51:
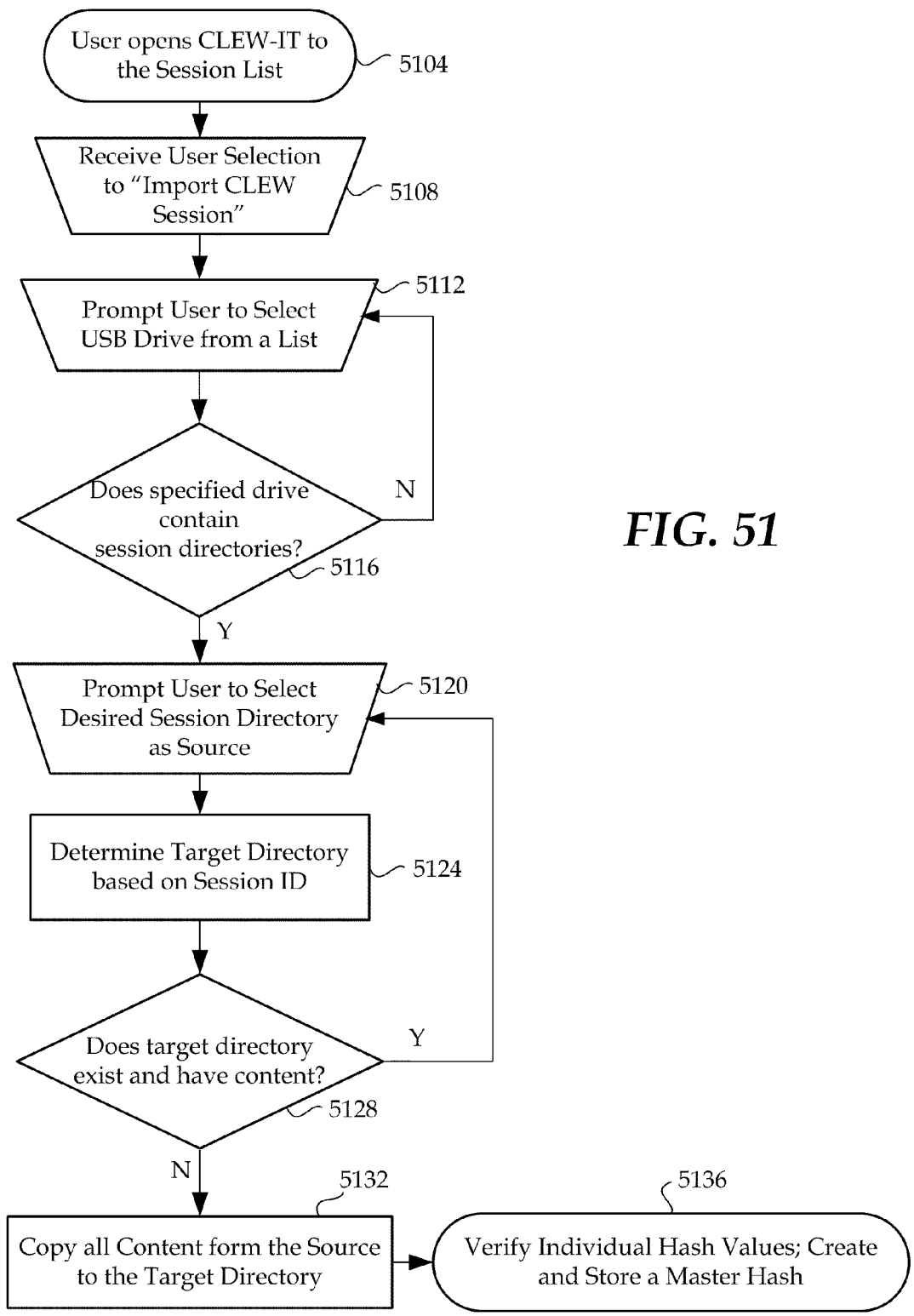
FIG. 51 is a flow chart for importing a CLEW session by CLEW-IT from a USB media device, to copy contents of the USB device to a target directory.

FIG. 51 is a flow chart for importing a CLEW session by CLEW-IT from a USB media (or other storage media) device, to copy contents of the USB device to a target directory. At block 5104, the user may open CLEW-IT on a computer and navigate to a session list. A "session" refers to an organized block of data captured during a session at the target computer 102 of a POI. At block 5108, the computer may receive a user selection to "Import CLEW Session" to download a session of data from the USB (or other storage) device. At block 5112, the computer may prompt the user to select a USB drive from a list. At block 5116, the computer may determine whether the specified drive contains session directories. If no, the computer may return to block 5112 to prompt the user to select a USB drive. If yes, the computer may, at block 5120, prompt the user to select a desired session directory as a source.

At block 5124, the computer through executing CLEW-IT may determine the target directory based on a session ID. At block 5128, the computer may determine whether the target directory exists and whether it has content. If the target directory exists and has content, then the computer, at block 5120, may prompt the user again to select the desired session directory as the source, and at block 5124, to again choose a target directory so as not to overwrite an existing target directory. If the target directory exists and does not have content, then the computer through CLEW-IT may copy all the content from the source USB (or other storage) device to the target directory. Note that when the data is saved by the LEFR or user to the USB (or other storage) device, the data may be processed through a cryptographic hash algorithm to create a hash or checksum value, which may be verified later by the computer running CLEW-IT. Accordingly, at block 5136, the computer may verify individual hash or checksum values to ensure the data was unaltered since being saved by the LEFR or user at the crime scene. The hash or checksum values may be created from individual items of data. Additionally, or in the alternative, the computer 102 may also create and store a master hash value, which serves as a mechanism to validate the integrity of all the stored data for a session, e.g., to determine if the originally-captured data for the session has been altered in any way.

Figure 52:
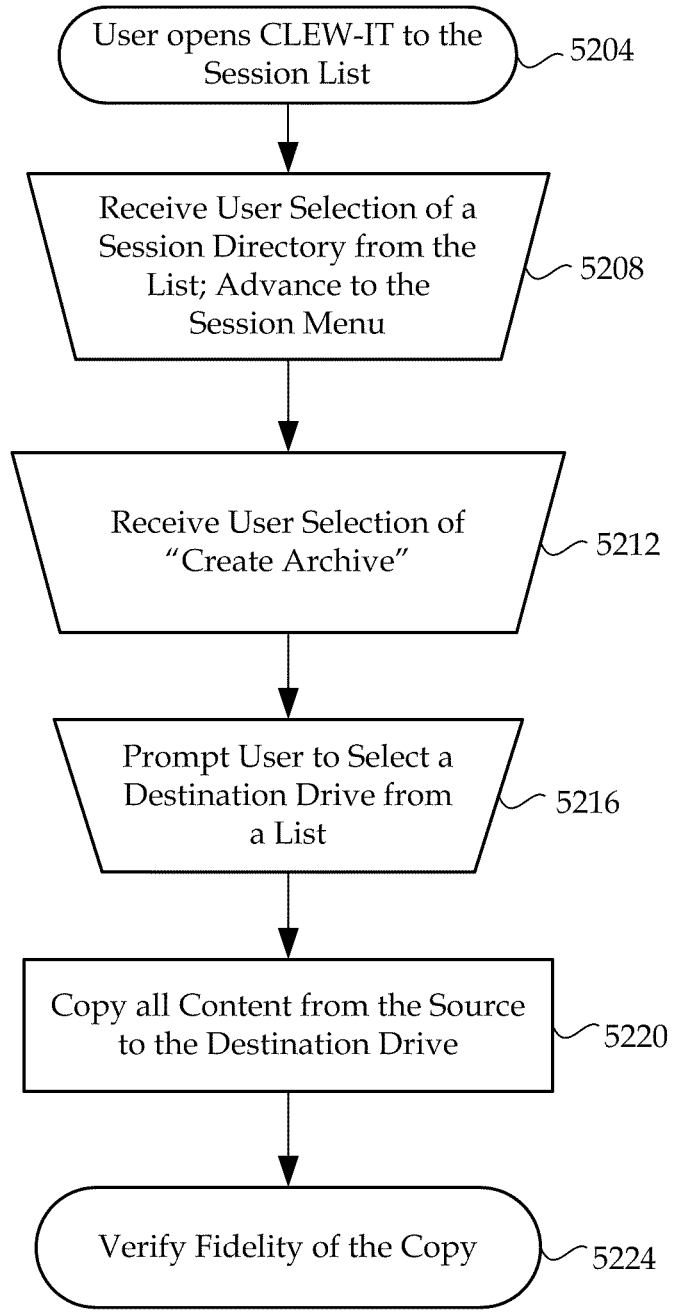
FIG. 52 is a flow chart for selecting a session within CLEW-IT and creating an archive for locally storing and managing data of the session.

FIG. 52 is a flow chart for selecting a session within CLEW-IT and creating an archive for locally storing and managing data of the session. At block 5204, the user may open CLEW-IT to the session list. At block 5208, the computer may provide to the user a selection of session directories from which the user may choose and may proceed to the "Session Menu" upon user selection of same. At block 5212, the computer may receive a user selection to "Create Archive." At block 5216, the computer may prompt the user to select a destination drive from a list to which to copy the data in the session. At block 5220, the computer may copy all the content from the source, which may include a USB device, to the destination, which may include a backup drive or the like on the computer of the investigator. At block 5224, the computer may verify the fidelity of the copy just saved to the destination drive.

Figure 53:
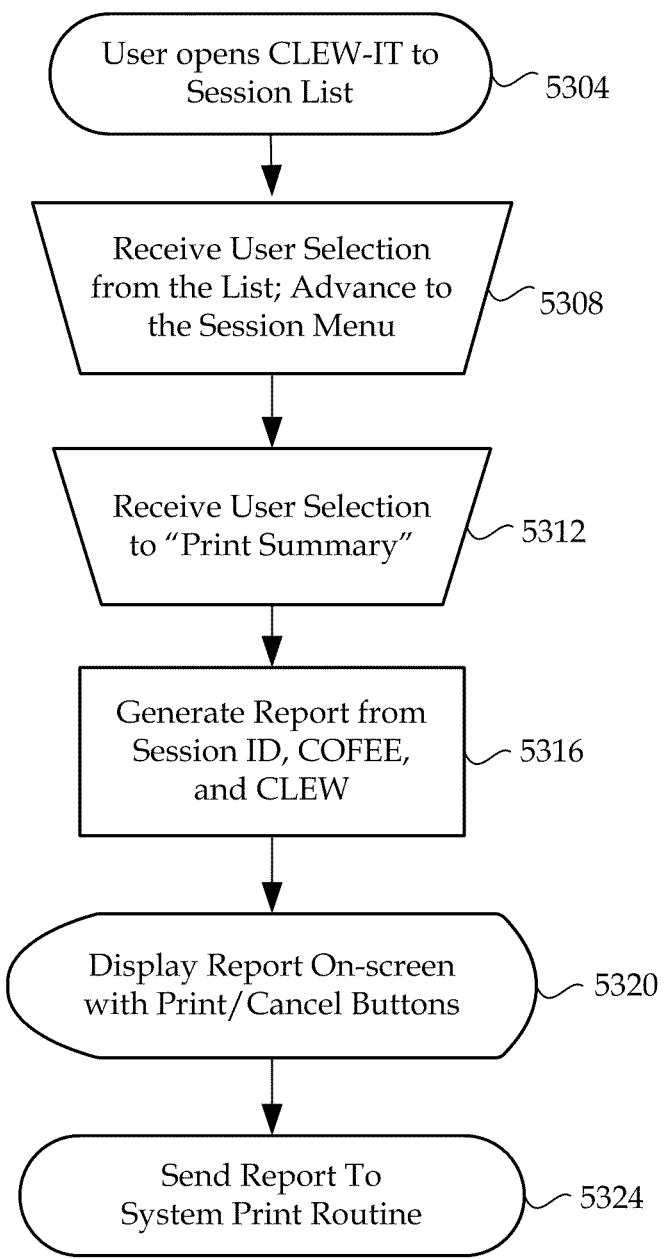
FIG. 53 is a flow chart for printing a summary from within CLEW-IT from a session identification (ID), computer online forensic evidence extractor (COFEE), and CLEW.

FIG. 53 is a flow chart for printing a summary from within CLEW-IT from a session identification (ID), computer online forensic evidence extractor (COFEE), and CLEW. At block 5304, the user may open CLEW-IT and browse to a session list. At block 5308, the computer may receive a user selection of a session from the list, and then advance to the "Session Menu." At block 5312, the computer may receive a user selection to "Print Summary," which may be any summary or report screen generated by CLEW-SUM. At block 5316, the computer may generate a report from the session ID, from COFEE, and/or from CLEW. At block 5320, the computer may display the report on the screen with print/cancel buttons. At block 5324, the computer may send the report to a system print routine to print the report.

Figure 56:
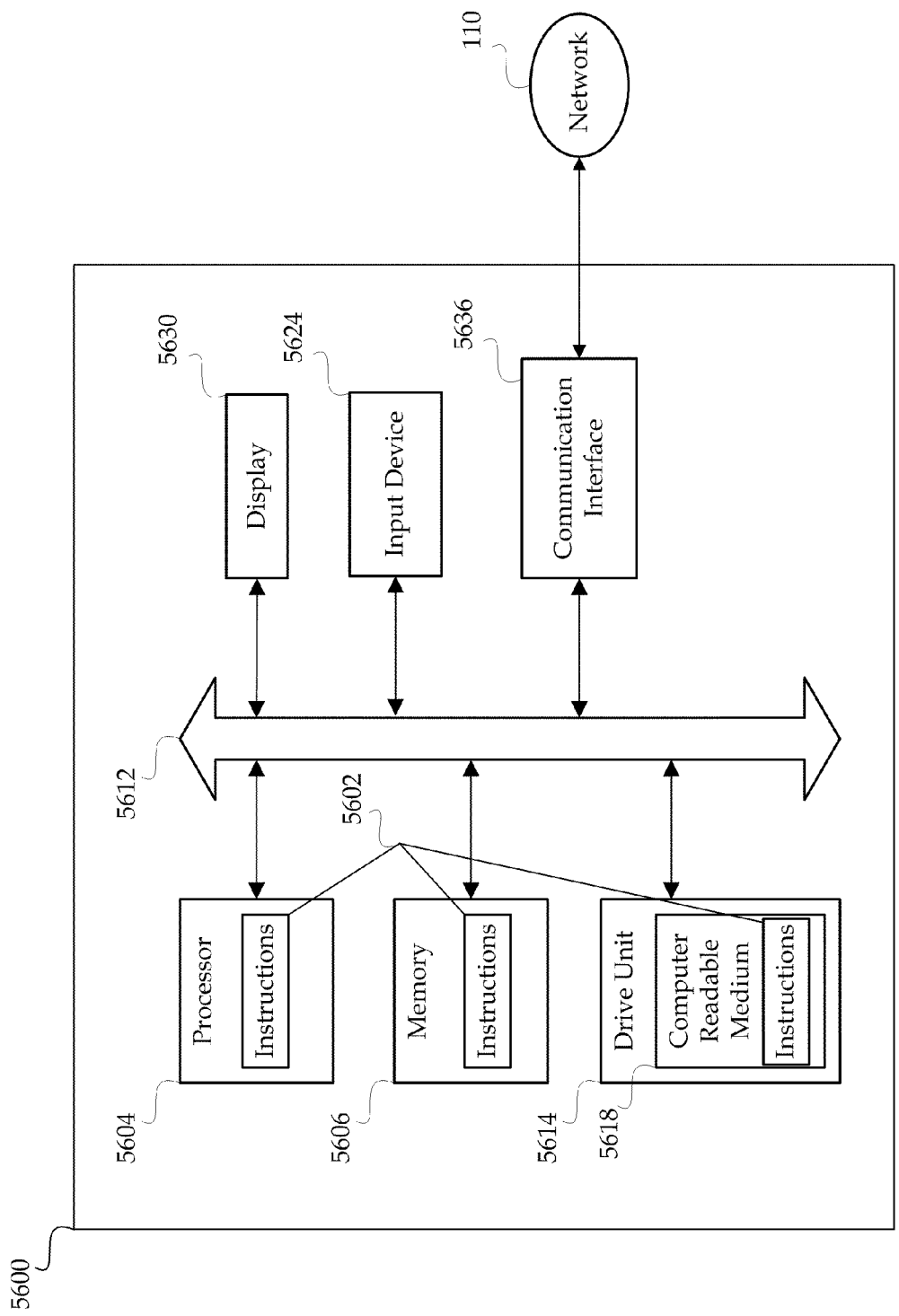
FIG. 56 is a general computer system, which may represent any of the computing devices referenced herein.

FIG. 56 is a general computer system 5600, which may represent any of the computing devices referenced herein. For instance, the general computer system 5600 may represent the target computer 102, the social networking server 114, ISP server 124, the Internet gaming server 134, the CAD system server 144, and the Police Station Central Dispatch computer 154, or any other computing devices referenced herein. The computer system 5600 may include an ordered listing of a set of instructions 5602 that may be executed to cause the computer system 5600 to perform any one or more of the methods or computer-based functions disclosed herein. The computer system 5600 may operate as a stand-alone device or may be connected, e.g., using the network 110, to other computer systems or peripheral devices.

In a networked deployment, the computer system 5600 may operate in the capacity of a server or as a client-user computer in a server-client user network environment, or as a peer computer system in a peer-to-peer (or distributed) network environment. The computer system 5600 may also be implemented as or incorporated into various devices, such as a personal computer or a mobile computing device capable of executing a set of instructions 5602 that specify actions to be taken by that machine, including and not limited to, accessing the network 110 through any form of browser. Further, each of the systems described may include any collection of subsystems that individually or jointly execute a set, or multiple sets, of instructions to perform one or more computer functions.

The computer system 5600 may include a processor 5604, such as a central processing unit (CPU) and/or a graphics processing unit (GPU). The processor 5604 may include one or more general processors, digital signal processors, application specific integrated circuits, field programmable gate arrays, digital circuits, optical circuits, analog circuits, combinations thereof, or other now known or later-developed devices for analyzing and processing data. The processor 5604 may implement the set of instructions 5602 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing or networked communication.

The computer system 5600 may include a memory 5606 on a bus 5612 for communicating information. Code operable to cause the computer system to perform any of the acts or operations described herein may be stored in the memory 5606. The memory 5606 may be a random-access memory, read-only memory, programmable memory, hard disk drive or any other type of volatile or non-volatile memory or storage device.

The computer system 5600 may also include a disk, solid-state drive optical drive unit 5614. The disk drive unit 5614 may include a computer-readable medium 5618 in which one or more sets of instructions 5602, e.g., software, can be embedded. Further, the instructions 5602 may perform one or more of the operations as described herein. The instructions 5602 may reside completely, or at least partially, within the memory 5606 and/or within the processor 5604 during execution by the computer system 5600. Accordingly, the databases (or storage) 104, 106, 116, 126, 136, and 156 described above may be stored in the memory 5606 and/or the disk unit 5614.

The memory 5606 and the processor 5604 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 5600 may include an input device 5624, such as a keyboard or mouse, configured for a user to interact with any of the components of system 5600, including user selections or menu entries of display menus. It may further include a display 5630, such as a liquid crystal display (LCD), a cathode ray tube (CRT), or any other display suitable for conveying information. The display 5630 may act as an interface for the user to see the functioning of the processor 5604, or specifically as an interface with the software stored in the memory 5606 or the drive unit 5614.

The computer system 5600 may include a communication interface 5636 that enables communications via the communications network 110, which may include or function similarly to the network interface 216 or 236. The network 110 may include wired networks, wireless networks, or combinations thereof. The communication interface 5636 network may enable communications via any number of communication standards, such as Ethernet AVB, 802.11, 802.17, 802.20, WiMax, or other communication standards.

Accordingly, the system may be realized in hardware, software, or a combination of hardware and software. The system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

As described herein, any modules or processing boxes are defined to include software, hardware or some combination thereof executable by the processor 5604. Software modules may include instructions stored in the memory 5606, or other memory device, that are executable by the processor 5604 or other processors. Hardware modules may include various devices, components, circuits, gates, circuit boards, and the like that are executable, directed, and/or controlled for performance by the processor 5604.

The system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A non-transitory computer-readable storage medium comprising a set of instructions for executing a cyber investigation to be completed by an investigator on a computer having a processor, a memory, and a display coupled with the computer, the computer-readable medium comprising:
   instructions to run a wizard application on the computer in response to execution of an executable file for the wizard application located on the computer-readable storage medium;
   instructions to receive, through the wizard application, a type of activity of a person of interest (POI) under investigation in response to inputs to select the activity type from a list of available activity types within the wizard application;
   instructions to direct the processor to guide the investigator through capturing data related to the selected activity type through one or more steps presented to the investigator through one or more screens of the wizard application shown in the display;
   instructions to receive inputs through at least one of the screens to obtain information needed to continue capturing the data related to the selected activity of the POI; and
   instructions to direct the processor to store the captured data in a removable data storage device or medium for analysis and use in the cyber investigation.

2. The computer-readable storage medium of claim 1, further comprising:
   instructions to receive case information, through the wizard application, related to an incident that prompted the cyber investigation in response to inputs from the investigator to insert the case information.

3. The computer-readable storage medium of claim 1, where the available activity types listed comprise email, instant messaging (IM), and social networking, further comprising:
   instructions to direct the processor to run a hash algorithm on the captured data before the data is stored in the removable data storage device or medium, to maintain the integrity of the captured data.

4. The computer-readable storage medium of claim 3, where the investigator selects email as the activity type, further comprising instructions to receive a type of email client in response to inputs in a screen presenting to the investigator available email client types.

5. The computer-readable storage medium of claim 4, where the investigator selects Web email for the type of email client, further comprising:
   instructions to receive a type of Web email client in response to inputs in a screen presenting to the investigator available Web email client types;
   instructions to receive selections to expand a header of an email in a website of the Web email client in a browser in response to selection of a link that, when selected, displays the header of the email;
   instructions to direct the processor to save the email to the removable storage device or medium; and
   instructions to direct the processor to ask the investigator whether the investigator wants to save another email.

6. The computer-readable medium of claim 5, further comprising:
   instructions to direct the processor to display a message to the investigator that directs the investigator to save the email;
   instructions to direct the processor to display a message that asks whether the investigator was able to save the email in the removable storage device or medium; and
   instructions to direct the processor to prompt the investigator to try saving the email again in response to a selection that the investigator was not able to save the email.

7. The computer-readable medium of claim 4, where the investigator selects Outlook email for the type of email client, further comprising:
   instructions to direct the investigator to open an email of concern;
   instructions to direct the processor to capture the email by saving the email in the removable storage device or medium in response to selection of the email; and
   instructions to request the investigator whether the investigator wants to save another Outlook email.

8. The computer-readable storage medium of claim 3, where the investigator selects IM as the activity type, further comprising:
   instructions to receive a type of format in which an IM conversation is found in response to inputs in a screen that asks whether the IM conversation is currently viewable or whether the IM conversation is not currently viewable through the display;
   instructions to direct the processor to display in a screen a plurality of available IM client types in response to inputs selecting that the IM conversation is viewable; and
   instructions to receive a type of IM client in response to inputs to select the IM client type in which the IM conversation is viewable.

9. The computer-readable medium of claim 8, further comprising:
   instructions to receive an indication that logging is turned on in the selected IM client in response to inputs to indicate that logging is activated;
   instructions to direct the processor to display a screen to direct the investigator to find one or more logs of concern and to cut and paste those logs into a predetermined screen of the display;
   instructions to receive the pasted IM conversations in the predetermined screen;
   instructions to direct the processor to display a message to ask the investigator whether the IM conversations was captured; and
   instructions to direct the processor to store the pasted logs in the removable storage device or medium.

10. The computer-readable medium of claim 8, further comprising:
  instructions to receive an indication that logging is turned off in the selected IM client in response to inputs to indicate that logging is not activated; and
  instructions to direct the processor to display in a screen a suggestion to turn on logging and to provide a link in the screen that, if selected by the investigator, takes the investigator to a window of the IM client having an option to turn on logging.

11. The computer-readable medium of claim 8, further comprising:
  instructions to direct the processor to capture a screen shot of the IM conversation currently being displayed in a screen of the selected IM client; and
  instructions to direct the processor to store the captured screen shot of the IM conversation in the removable device or medium.

12. The computer-readable medium of claim 3, where the investigator selects social networking as the activity type, further comprising:
  instructions to direct the processor to direct the investigator in a screen to open a browser and to browse to a URL of a social networking login page of a social networking website;
  instructions to direct the processor to direct the investigator in the screen to log into the social networking login page using one selected from the group consisting of: (i) inputting a username and password of the person of interest (POI) into the login page; and (ii) using cached cookies stored in relation to the browser left by the POI to gain access to the social networking website; and
  instructions to direct the processor to parse a profile and to save associated data of the profile of the POI to a removable data storage device or medium.

13. The computer-readable medium of claim 12, further comprising:
  (a) instructions to direct the processor to direct the investigator to select a friend of the POI;
  (b) instructions to direct the processor to parse and save data associated with a social networking profile of the POI utilizing a login of a friend of that profile; and
  (c) instructions to direct the processor to request the investigator to select another friend of the POI to repeat steps (a) and (b) as necessary.

14. The computer-readable medium of claim 12, further comprising:
  (a) instructions to direct the processor to direct the investigator to select a data item of the POI, where the data item comprises one selected from the group consisting of: a wall post, a photo, and a mini-feed story;
  (b) instructions to direct the processor to follow a link to the data item in response to selection thereof, to parse the data item to capture constituent data pieces of the data item, and to save the constituent data pieces; and
  (c) instructions to direct the processor to request the investigator to select another data item of the POI to repeat steps (a) and (b) as necessary.

15. The computer-readable medium of claim 3, where the investigator selects social networking as the activity type, further comprising:
  instructions to direct the processor to direct the investigator in a screen to open a browser and to browse to a URL of a social networking login page of a social networking website;
  instructions to direct the processor to direct the investigator in the screen to input a username and password of a friend of the POI into the social networking login page to log into an account of the friend;
  instructions to direct the processor to direct the investigator in the screen to select the POI among the friends listed for the friend of the POI within the account of the friend; and
  instructions to direct the processor to parse the profile and save associated data of the profile of the POI from within the account of the friend.

16. The computer-readable medium of claim 1, further comprising:
  instructions to direct the processor to organize the captured data according to class of data;
  instructions to present the organized data in a summarized format to the investigator through a screen in the display, a plurality of classes of data displayed as selectable links;
  instructions to display the organized data in a specific class of data in response to inputs to select the link to the specific class of data; and
  instructions to save a screen shot of the class-organized data to the removable data storage device or medium.

17. A non-transitory computer-readable storage medium comprising a set of instructions for executing a cyber investigation to be completed by an investigator on a computer having a processor and a memory, the computer capable of being coupled with one or more remote servers over a network, the computer-readable medium comprising:
  instructions to install and run a wizard application on the computer in response to execution of an executable file for the wizard application located on the computer-readable storage medium;
  instructions to receive, through the wizard application, a type of activity of a person of interest (POI) under investigation in response to inputs to select the activity type from a list of available activity types within the wizard application, including email;
  instructions to direct the processor to guide the investigator through the wizard application to open a browser in the computer and to access a login page of a Web email client website to access an email of concern, the email stored on a remote server;
  instructions to direct the processor to instruct the investigator to log into the Web email client website by one selected from the group consisting of: (i) inputting a username and password of the POI into the login page; and (ii) using cached cookies stored in relation to the browser for the email client website left by the POI to gain access to the Web email client website; and
  instructions to direct the processor to save the email to a removable data storage device or medium in response to inputs to select the email.

18. The computer-readable medium of claim 17, further comprising:
  instructions to receive a type of Web email client in response to inputs in a screen of the wizard application presenting to the investigator available Web email client types;
  instructions to receive selections to expand a header of the email in the Web email client website in response to a selection of a link that, when selected, displays the header of the email;
  instructions to direct the processor to save the email to the removable storage device or medium; and
  instructions to direct the processor to ask the investigator whether the investigator wants to save another email.

19. The computer-readable medium of claim 18, further comprising:
instructions to direct the processor to display a message to the investigator that directs the investigator to save the email;
instructions to direct the processor to display a message that asks whether the investigator was able to save the email in the removable storage device or medium; and
instructions to direct the processor to prompt the investigator to try saving the email again in response to a selection that the investigator was not able to save the email.

20. A non-transitory computer-readable storage medium comprising a set of instructions for executing a cyber investigation to be completed by an investigator on a computer having a processor and a memory, the computer capable of being coupled with one or more remote servers over a network, the computer-readable medium comprising:
instructions to install and run a wizard application on the computer in response to execution of an executable file for the wizard application located on the computer-readable storage medium;
instructions to receive, through the wizard application, a type of activity of a person of interest (POI) under investigation in response to inputs to select the activity type from a list of available activity types within the wizard application, including social networking;
instructions to direct the processor to guide the investigator through the wizard application to open a browser in the computer and to access a login page of a social networking website;
instructions to direct the processor to instruct the investigator to log into the social networking website by using cached cookies stored in relation to the browser for the social networking website left by the POI to gain access to the social networking website; and
instructions to direct the processor to parse a social networking profile of the POI and to save associated data of the profile of the POI located on a remote server to a removable data storage device or medium.

21. The computer-readable medium of claim 20, further comprising:
(a) instructions to direct the processor to direct the investigator to select a friend of the POI;
(b) instructions to direct the processor to follow a profile URL for the friend captured from a list of friends of the POI, to parse a profile and save associated data of the profile of the friend of the POI; and
(c) instructions to direct the processor to request the investigator to select another friend of the POI to repeat steps (a) and (b) as necessary.

22. The computer-readable medium of claim 20, further comprising:
(a) instructions to direct the processor to direct the investigator to select a data item of the POI, where the data item comprises one selected from the group consisting of: a wall post, a photo, and a mini-feed story;
(b) instructions to direct the processor to follow a link to the data item in response to selection thereof, to parse the data item to capture constituent data pieces of the data item, and to save the constituent data pieces; and
(c) instructions to direct the processor to request the investigator to select another data item of the POI to repeat steps (a) and (b) as necessary.

23. The computer-readable medium of claim 20, further comprising:
instructions to direct the processor to direct the investigator in the screen to input a username and password of a friend of the POI into the social networking login page to log into an account of the friend;
instructions to direct the processor to direct the investigator in the screen to select the POI among the friends listed for the friend of the POI within the account of the friend; and
instructions to direct the processor to parse the profile and save associated data of the profile of the POI from within the account of the friend.

24. A system for executing a cyber investigation to be completed by an investigator, the system comprising:
a computer having a processor, a memory, and a display coupled with the computer, the computer capable of being coupled with one or more remote servers over a network;
a computer-readable medium having stored thereon instructions for execution of a wizard application, the processor adapted to execute the instructions, the processor programmed to:
receive a type of activity of a person of interest (POI) under investigation in response to inputs to select the activity type from a list of available activity types within the wizard application;
guide the investigator through capturing data related to the selected activity type through one or more steps presented to the investigator through one or more screens shown in the display;
receive inputs through at least one of the screens to obtain information needed to continue capturing the data related to the selected activity of the POI; and
store the captured data in a removable data storage device or medium for analysis and use in the cyber investigation.

25. The system of claim 24, the processor further programmed to:
receive case information from the investigator related to an incident that prompted the cyber investigation in response to user inputs to insert the case information.

26. The system of claim 24, where the computer-readable medium comprises one selected from the group consisting of: a USB device, a CD-ROM, and a DVD.

27. The system of claim 24, where the available activity types listed comprise email, instant messaging (IM), and social networking, the processor further programmed to
run a hash algorithm on the captured data before the data is stored in the removable data storage device or medium, to maintain the integrity of the captured data.

28. A system for executing a cyber investigation to be completed by an investigator, the system comprising:
a computer having a processor, a memory, and a display coupled with the computer, the computer capable of being coupled with one or more remote servers over a network;
a computer-readable medium having stored thereon instructions for execution of a wizard application, the processor adapted to execute the instructions, the processor programmed to:
receive a type of activity of a person of interest (POI) under investigation in response to inputs to select the activity type from a list of available activity types within the wizard application, including email;
guide the investigator to open a browser in the computer and to access a login page of a Web email client website to access an email of concern, the email stored on a remote server;

instruct the investigator to log into the Web email client website by one selected from the group consisting of: (i) inputting a username and password of the POI into the login page; and (ii) using cached cookies stored in relation to the browser for the email client website left by the POI to gain access to the Web email client website; and save the email to a removable data storage device or medium in response to inputs to select the email.

29. The system of claim 28, where the computer-readable medium comprises one selected from the group consisting of: a USB device, a CD-ROM, and a DVD.

30. A system for executing a cyber investigation to be completed by an investigator, the system comprising:

a computer having a processor, a memory, and a display coupled with the computer, the computer capable of being coupled with one or more remote servers over a network;

a computer-readable medium having stored thereon instructions for execution of a wizard application, the processor adapted to execute the instructions, the processor programmed to:

receive a type of activity of a person of interest (POI) under investigation in response to investigator inputs to select the activity type from a list of available activity types within the wizard application, including social networking;

guide the investigator to open a browser in the computer and to access a login page of a social networking website;

instruct the investigator to log into the social networking website by using cached cookies stored in relation to the browser for the social networking website left by the POI to gain access to the social networking website; and parse a social networking profile of the POI and save associated data of the profile of the POI located on a remote server to a removable data storage device or medium.

31. The system of claim 30, where the computer-readable medium comprises one selected from the group consisting of: a USB device, a CD-ROM, and a DVD.

* * * * *